United States Patent
Imanaka et al.

[19]

[11] Patent Number: 5,880,947
[45] Date of Patent: Mar. 9, 1999

[54] CONTROL DEVICE FOR A PWM CONTROLLED CONVERTER HAVING A VOLTAGE CONTROLLER

[75] Inventors: Akira Imanaka; Taro Ando, both of Tokyo, Japan

[73] Assignee: Mitsubishi Denki Kabushiki Kaisha, Tokyo, Japan

[21] Appl. No.: 849,166

[22] PCT Filed: Sep. 24, 1996

[86] PCT No.: PCT/JP96/02742

§ 371 Date: Aug. 7, 1997

§ 102(e) Date: Aug. 7, 1997

[87] PCT Pub. No.: WO97/12437

PCT Pub. Date: Apr. 3, 1997

[30] Foreign Application Priority Data

Sep. 27, 1995 [JP] Japan .................................. 7-249733

[51] Int. Cl.⁶ ............................................... H02M 5/42
[52] U.S. Cl. .............................. 363/89; 363/127; 363/96
[58] Field of Search .................................. 363/45, 81, 87, 363/89, 127, 129, 96

[56] References Cited

U.S. PATENT DOCUMENTS 4,729,082  3/1988  Sato .......................................... 363/41
5,483,435  1/1996  Uchino ..................................... 363/81

FOREIGN PATENT DOCUMENTS 7-46906    2/1989  Japan ............................ H02M 7/537
3-212162   9/1991  Japan .............................. H02M 7/06

*Primary Examiner*—Shawn Riley
*Attorney, Agent, or Firm*—Sughrue, Mion, Zinn, Macpeak & Seas, PLLC

[57] ABSTRACT

A control device for a PWM controlled converter having a voltage control portion for comparing with a voltage set value a detected value of a DC voltage output from the PWM controlled converter, connected through reactors to a 3-phase AC power source, for controlling AC input currents supplied from the 3-phase AC power source, to thereby produce current reference signals; an AC reference signal generating portion for generating AC reference signals synchronized with the 3-phase AC power source; a current instruction portion for producing current instruction signals formed by varying the amplitudes of the AC reference signals output from the AC reference signal generating portion in accordance with the current reference signals, and a current control portion for producing control signals to the PWM controlled converter so that the AC input currents vary as instructed by the current instruction signals. The control device portion produces control signals based on a proportional control for a predetermined period after the control starts, and produces other control signals based on a proportional integration control after the predetermined period is terminated.

17 Claims, 30 Drawing Sheets

CONTROL DEVICE FOR A PWM CONTROLLED CONVERTER HAVING A VOLTAGE CONTROLLER

BACKGROUND OF THE INVENTION

1. Field of the Invention

The present invention relates to a control device for a PWM controlled converter which converts an AC power source voltage into a DC voltage.

2. Description of the Related Art

There are many devices which convert AC power to DC and the number of such devices is increasing. In this type of device, an AC power source voltage is converted into a DC voltage, and the converted DC voltage is used. In the AC to DC converting operation, reactive power and harmonics are generated, which causes some problems. To solve these problems, a PWM controlled converter has been proposed as a device for converting an AC power source voltage into a DC voltage.

FIG. 28 is a block diagram showing a conventional control device for a PWM controlled converter. The control device for a PWM controlled converter is as discussed in "Method for Controlling a P-phase Invertor not Using an Insulating Transformer", 1991 National Convention Record IEEE Japan, pp 5 to 80, or as disclosed in Japanese Patent Laid-Open Publication No. Hei. 3-212162.

In the figure, reference numeral 1 designates a 3-phase AC power source; numeral 2, a PWM controlled converter which converts AC power received from the 3-phase AC power source 1 into a DC voltage-by controlling the AC current of the received AC power, and outputs the converted DC voltage; numerals 201 to 206 designate switching elements which are transistors, IGBTs (insulated gate bipolar transistors) and the like; and 207 to 212 designate circulating diodes. Numeral 3 designates reactors connected between the 3-phase AC power source 1 and the PWM controlled converter 2; 4 designates a smoothing condenser for absorbing a pulsating component contained in an output current of the PWM controlled converter 2; 5 designates a load unit, such as an invertor or a resistive component; 6 designates a voltage setter for outputting a voltage setting signal for setting a DC voltage output from the PWM controlled converter 2; and 7b designates a voltage detecting circuit for detecting a DC voltage output from the PWM controlled converter 2.

Numeral 8 indicates a subtractor for calculating a deviation of a voltage detecting signal detected by and output from the voltage detecting circuit 7b from a voltage setting signal set by and output from the voltage setter 6; 9d designates a voltage controller which includes a proportional control calculating element and a proportional integration calculating element, and proportional integration (PI) controls a deviation of a voltage detecting signal output from the subtractor 8 from the voltage setting signal; 10 designates an AC voltage detector for detecting an AC voltage from the 3-phase AC power source 1; 11 designates a unit sine wave generator for generating R-phase and T-phase unit sine waves, which are synchronized with R-phase and T-phase voltages, from an AC voltage detecting signal detected by the AC voltage detector 10; 12 and 13 designate multipliers for multiplying a peak value instruction signal of an input current received from the voltage controller 9d by R-phase and T-phase unit sine wave signals received from the unit sine wave generator 11, and outputs R-phase and T-phase input current instruction signals.

Numerals 14 and 15 represent current detectors for detecting currents of R-phase and T-phase input to the PWM controlled converter 2; 16 and 17 represent subtractors for producing a deviation of an input current detecting signal of R-phase output from the current detector 14 from an input current instruction signal of R-phase output from the multiplier 12 and a deviation of an input current detecting signal of T-phase output from the current detector 15 from an input current instruction signal of T-phase output from the multiplier 13; 18b and 19b represent R- and T-phase current controllers which include proportional control calculating elements and proportional integration calculating elements, and proportional integration (PI) control the deviations of the T-phase input current detecting signals from the R-phase input current instruction signals, to thereby output an R-phase control signal and a T-phase control signal; 20 represents a subtractor for subtracting from zero the R- and T-phase control signals output from the R- and T-phase current controllers 18b and 19b; 21 represents a carrier wave oscillator; 22, 23 and 24 represent comparators for comparing the amplitudes of R-, S- and T-phase control signals with a carrier wave signal to output pulse-width modulated signals; 25 represents a gate circuit for outputting signals to turn on and off the switching elements 201 to 206 of the PWM controlled converter 2 in accordance with R-, S- and T-phase pulse-width modulated signals.

An operation of the conventional control device thus constructed will be described. A detecting value V DC^ of a DC voltage detected by the voltage detecting circuit 7b and a detecting value V DC* set by the voltage setter 6 are input to the subtractor 8 where the eV (deviation)=V DC^–V DC* is calculated. The obtained deviation eV is input to the voltage controller 9d where it is PI-controlled to produce a peak value instruction signal I PEAK* of the input current. The peak value instruction signal I PEAK is applied to the multipliers 12 and 13 where it is multiplied by the unit sine wave signals of R-phase and T-phase which are other signals input to the multipliers. The R- and T-phase unit sine wave signals are reference AC signals synchronized with the R- and T-phase voltages of the 3-phase AC power source 1, and are generated by a current reference signal generator constituting the unit sine wave generator 11, which receives an AC voltage of the 3-phase AC power source 1 detected by the AC voltage detector 10. The multipliers 12 and 13 produce an R-phase input current instruction signal iR* and a T-phase input current instruction signal iT*, respectively.

The R-phase input current instruction signal iR*, which is an output signal of the multiplier 12, and an R-phase input current detecting signal iR, which is an output signal of the current detector 14, are applied to the subtractor 16 which calculates eiR (deviation)=iR*–iR and outputs the result of the calculation. Similarly, the T-phase input current instruction signal iT*, which is an output signal of the multiplier 13, and a T-phase input current detecting signal iT, which is an output signal of the current detector 15, are applied to the subtractor 17 which calculates eiT (deviation)=iT*–iT and outputs the result of the calculation. The current deviations eiR and eiT are applied to the R-phase current controller 18b and the T-phase current controller 19b, respectively. These current controllers PI-control the current deviations and output S- and T-phase control signals SR* and ST*, respectively.

An S-phase control signal SS* is produced in a manner that the subtractor 20 subtracts the R- and T-phase control signals SR* and ST* from zero. The R-, S- and T-phase control signals SR*, SS* and ST* as the output signals of the R-, S- and T-phase current controllers 18b, 20 and 19b, are applied to the comparators 22, 23 and 24, respectively. Those comparators compare the amplitudes of the control signals SR*, SS* and ST* with the amplitude of a triangle wave carrier signal, and produce pulse width modulation (PWM) signals. The PWM signals are applied to the gate circuit 25. The gate circuit outputs control signals so that a detecting value V DC^ of a DC voltage of the PWM controlled converter 2 is equal to a detecting value V DC*, and so that the R-, S- and T-phase input currents iR, iS and iT are equal to the R-, S- and T-phase input current instruction signals iR*, iS* and iT* as sine wave signals. In the PWM controlled converter 2, the switching elements 201 to 206 are turned on and off in accordance with the control signals received from the gate circuit.

In the thus constructed control device for a PWM control converter, as described above, the R- and T-phase current controllers 18*b* and 19*b* form a current control loop in which the R- and T-phase input current instruction signals iR* and iT* output from the multipliers 12 and 13 are used as instruction signals, and the R- and T-phase input current detecting signals iR and iT output from the current detectors 14 and 15 are used as feedback signals. The R- and T-phase current controllers 18*b* and 19*b* may be realized by a digital control technique using a microprocessor, for example, or an analog control technique using operation amplifiers, for example. When the digital control technique is used, sampling delays entail time lags. Therefore, in designing the current controllers, it is impossible to increase a response in the control system of the digital control basis current controller in excess of that of the analog control basis current controller. Therefore, in the digital control basis current controller, the following disadvantageous phenomena inevitably take place: on and off delays of the switching elements 201 to 206 in the PWM controlled converter 2, a deviation of an actual voltage that is caused by an on voltage from the voltage instruction value V DC*, a waveform distortion of an AC input voltage of the 3-phase AC power source 1, and the like. Accordingly, an AC input current waveform is not sinusoidal and contains harmonics defined by the waveform distortion.

To make the input current waveform faithfully trace a sinusoidal waveform, the analog control system that has no sampling delays, for example, and enables the current control system to have a high response is preferably used for the current controllers. Similarly, to make a DC voltage value in the PWM controlled converter 2 follow the set value, it is preferable to construct the voltage controller 9*d* on the basis of the analog control system which is free from the sampling delays, for example, and allows the voltage control system to have a high response.

FIG. 29 is a circuit diagram showing in detail the R- or T-phase current controller. In the circuit diagram, the R-phase current controller 18*b* as an IP controller which performs an analog control of current, and is realized by using an operational amplifier.

In FIG. 29, reference numerals 101 to 103 designate fixed resistors; numeral 104, a capacitor; 105, an operational amplifier; 106 and 107, positive and negative voltage input terminals of a control power source for driving the operational amplifier 105; 108, an input terminal; and 109, an output terminal. In the thus constructed R-phase current controller 18*b*, when an input signal at the input terminal 108 that is positive or negative continues for a fixed period of time or longer, the voltage across the capacitor 104, which provides an integration term of a proportional integration operation, increases in the positive or negative direction. However, it is possible for the capacitor voltage to increase to be below a positive voltage or above a negative voltage of the control power source applied through the positive and negative voltage input terminals 106 and 107. Thus, the capacitor voltage is saturated while being limited within a fixed value. Also, when an input signal coming in through the input terminal 108 is large, a signal outputted from the operational amplifier 105 after a signal amplifying process by the amplifier cannot vary to be below a positive voltage or above a negative voltage of the control power source applied through the positive and negative voltage input terminals 106 and 107. The output signal of the operational amplifier is saturated within a limited value.

The T-phase current controller 19*b* is also similarly constructed and operates in a similar manner. The circuit constructed as stated above is a basic circuit, generally used for realizing a proportional integration operation by using an operational amplifier.

FIG. 30 is a circuit diagram showing a specific example of the voltage detecting circuit 7*b* for detecting a DC voltage V DC. In FIG. 30, reference numeral 701 designates an input terminal connected to a positive potential of the smoothing condenser 4; and 702 and 703 designate fixed resistors for dividing a DC voltage V DC. The fixed resistor 703 is connected to a negative potential of the smoothing condenser 4. Numeral 704 designates an insulated amplifier; 705 and 706, fixed resistors; 707, an operational amplifier; and 708 and 709 designate variable resistors for adjusting an offset and a gain of the voltage detecting value. The thus constructed circuit is a basic circuit, which is generally used for adjusting offset and gain errors by an operational amplifier, and includes variable resistors for adjusting the offset and the gain errors.

In the conventional control device for a PWM controlled converter thus constructed, an overcurrent problem arises particularly when the control device is started up in a state that electric power has been supplied from the 3-phase AC power source 1 to the load unit 5.

In a case where electric power has been supplied from the 3-phase AC power source 1 to the load unit 5 in a state that the switching elements 201 to 203 of the PWM controlled converter 2 are in an off state, viz., before the control by the PWM controlled converter 2 starts and the gate circuit 25 is closed, the power is supplied to the load unit 5, through the reactors 3 and the circulating diodes 207 to 212. In this case, the waveforms of the R-, S- and T-phase input currents are as shown in FIG. 31.

In this case, the current flows through the reactors 3. Because of this, an input voltage of each phase to the PWM controlled converter 2 is lower than the voltage of the 3-phase AC power source 1 by a voltage corresponding to a voltage drop across the corresponding reactor 3. As a result, a DC voltage, or a voltage across the smoothing condenser 4, of the PWM controlled converter 2 is lowered.

When the controlling operation of the control device is started up from this state, the R- and T-phase current controllers 18*b* and 19*b* operate so as to compensate for a lowering of the DC voltage V DC. The R- and T-phase control signals SR* and ST* output from those current controllers 18*b* and 19*b* increases substantially inversely proportional to the DC voltage V DC. In the conventional control device for a PWM controlled converter, the R- and T-control signals SR* and ST* are obtained through the calculations of the R- and T-phase current controllers 18*b* and 19*b* which perform PI operations, and the S-phase control signal SS* is obtained as SS*=(−SR*−ST*), which follows from a formula SR*+SS*+ST*=0. Since the current controllers operate so as to compensate for a lowering of the voltage V DC, when the R- and T-phase control signals SR* and ST* increase in the positive or negative direction and are saturated and fixed at a predetermined value, the S-phase control signal SS* is also fixed at a predetermined value. As a result, the control device fails to control the voltages of the three phases. Particularly, at the time of the above-mentioned starting up where the currents as shown in FIG. 31 flow, the current deviations as the input signals to the R- and T-phase current controllers 18b and 19b are connected to a positive or negative polarity for a fixed period of time. Therefore, a value of the integration term as a constituent element increases, so that the output signals of the R- and T-phase current controllers 18b and 19b are frequently saturated. As a result, the control device fails to control the voltages of three phases, an overcurrent flows in the control device and possibly drives an overcurrent protecting mechanism to trip. Incidentally, the overcurrent protecting mechanism is generally incorporated into the circuit for protecting circuit elements.

Also in a normal running state, when an electric power of the load unit 5 abruptly changes and the voltage V DC drops, the output signals of the R- and T-phase current controllers 18b and 19b are saturated as at the time of the above-mentioned starting up. The control device fails to control the voltages of three phases including the S-phase, an overcurrent flows in the control device, and possibly causes a trip of the protecting mechanism.

Also in a case where the voltage V DC is controlled as indicated by a set value, when the R- and T-current deviations eiR and eiT as the input signals to the R- and T-phase current controllers 18b and 19b become large as the result of an abrupt change of the current instruction signal, the proportional terms as the constituent elements of the R- and T-phase current controllers 18b and 19b become large, the output signals of the R- and T-phase current controllers 18b and 19b are saturated, and consequently the control device fails to control the voltages of three phases including the S-phase, an overcurrent flows in the control device, and possibly causes a trip of the mechanism.

In the control device for a PWM controlled converter, the analog control technique using the operational amplifier is widely used for constructing the voltage controller 9d since it is necessary to precisely control the DC voltage that appears at the output of the PWM controlled converter 2. The voltage controller 9d receives a deviation eV of a detecting value V DC^ detected by the voltage detecting circuit 7b from a set value V DC* set by the voltage setter 6; eV=V DC*−V DC^. Then, it PI controls the deviation eV to produce a peak value instruction signal I PEAK* of the input current. Therefore, the voltage detecting circuit 7b must contain a means for correcting and adjusting an offset error and a gain error of the voltage detecting circuit per se. To this end, variable resistors are used. It is difficult to automate the adjustment by the variable resistors. Therefore, intricate and troublesome work is essential at the time of manufacturing and adjusting.

Since the control device for a PWM controlled converter is thus constructed, particularly when the voltage of the 3-phase AC power source 1 drops or is interrupted for a short time by, for example, an instantaneous power interruption, an overcurrent problem arises when the power voltage is returned to the original one.

The problem stated above will be described hereunder.

FIG. 32 shows waveforms of an R-phase power source voltage eR, an R-phase input current instruction signal iR*, and an R-phase input current detecting signal iR. Those waveforms are correspondingly applied to the waveforms of S- and T-phase. Only the waveforms of those signals and voltage of R-phase will be typically described. The following relation holds among the R-phase power source voltage eR, the R-phase input voltage vR of the PWM controlled converter 2, and the R-phase input current detecting signal iR:

$$eR = L\ (diR/dt) \times VR$$

In the above expression, L indicates an inductance value of the reactor 3. The resistance value of the reactor 3 is negligible. Therefore, it is left out of consideration here. In a general PWM controlled converter, the voltage drop across the reactors 3 is several to several tens % of the power source voltage eR. Accordingly, the power source voltage eR and the input voltage vR of the PWM controlled converter 2 are substantially in phase.

In a normal operating condition, the R-phase current controller 18b operates so that the R-phase input current detecting signal iR follows the R-phase input current instruction signal iR*, and produces an R-phase control signal SR*. The R-phase current controller 18b PI controls a deviation of the R-phase input current detecting signal iR from the R-phase input current instruction signal iR*. A proportional gain and an integration gain are set at negative values so as to decrease the R-phase control signal SR* when the R-phase input current instruction signal iR* is larger than the R-phase input current detecting signal iR, viz., the current is increased in the positive direction. The amplitude of the R-phase control signal SR is compared with that of a triangle wave carrier signal output from the carrier wave oscillator 21, and the result of the comparison is output in the form of a pulse width modulation signal. The pulse width modulation signal reflects on the R-phase input voltage vR to PWM controlled converter 2.

When the 3-phase AC power source 1 is interrupted by, for example, an instantaneous power interruption, no input current flows. As a result, a difference is caused between the R-phase input current instruction signal iR and the R-phase input current detecting signal iR. An R-phase control signal SR*, which is opposite in direction to the R-phase input current instruction signal iR*, is caused as shown in FIG. 33. Usually, the R-phase input current instruction signal iR* is controlled to be substantially in phase with the R-phase power source voltage eR. When an instantaneous power interruption takes place, a voltage opposite in polarity to the R-phase power source voltage eR is output as the R-phase input voltage vR of the PWM controlled converter 2. Particularly, when the R-phase current controller 18b is designed using the analog control technique to have a high response in its control system, the accumulation of a value of the integrating element of the R-phase current controller 18b increases in the opposite polarity for a short time.

The phase of the output signal of the unit sine wave generator 11 is used as the reference phase of the R-phase input current instruction signal iR*. Usually, the unit sine wave generator 11 is constructed with a circuit having a fixed time constant, and the like. Therefore, even if the 3-phase AC power source 1 is interrupted for a short time, the phase of the power source voltage remains invariable.

When the power source voltage is returned to its original voltage, or the power source is restored from its interruption, a difference between the R-phase power source voltage eR and the R-phase input voltage vR to the PWM controlled converter 2 is large. The large difference of voltage is applied across the reactor 3, so that the R-phase input current detecting signal iR abruptly-increases. The abruptly increased current (referred to as a spike current) possibly causes an overcurrent protecting mechanism to trip. Incidentally, the overcurrent protecting mechanism is generally incorporated into the circuit for protecting the switching elements 201 to 206.

When the input current instruction signal is large, for example, when large power is supplied to the load unit 5, the R- and T-phase current deviations eiR and eiT as the input signals to the R- and T-phase current controllers 18b and 19b are large, and a value of the integration term as one of the component elements of each current controller becomes larger. And a difference between the voltage and the power source voltage of the related phase further grows. Consequently, the spike current caused at the time of the restoring of the power source further increases, which in turn drives the overcurrent protecting mechanism to trip.

The overcurrent problem description, which has been made about the R-phase AC input current control in the converter control device, is correspondingly applied to the same problem in the AC input current control of the other phases.

When the 3-phase AC power source 1 is interrupted for a long time, it is easy to detect such an interruption. When the supply of the power source is interrupted for a short time as when an instantaneous power failure takes place, particularly when the power interruption duration is approximately ½ as large as the period of the power source frequency or the power source voltage drop continues for such a short period, it is difficult to detect the power interruption. The conventional device cannot reduce or suppress the spike current, the overcurrent or the like caused when the power source recovers from a state that the voltage of the 3-phase AC power source 1 drops or the supply of the same is interrupted for a short time because of an instantaneous power failure, for example.

The present invention has been made to solve the above problems of the conventional art, and an object of the present invention is to provide a control device for a PWM controlled converter which can satisfactorily control an input current to the PWM controlled converter in a state that when the control device is started up or the power of the load unit abruptly changes, the DC voltage at the output side of the PWM controlled converter drops or a deviation of the actual input current from the input current instruction value as when the input current instruction value abruptly changes.

Another object of the present invention is to provide a control device for a PWM controlled converter which does not need variable resistors for compensating for the offset error and the gain error of the voltage detecting circuits, improves the operability at the time of manufacturing and adjusting, and can easily automate the adjusting operation of the offset and gain errors.

Yet another object of the present invention is to provide a control device for a PWM controlled converter which can satisfactorily control an input current to the PWM controlled converter without causing any spike current when an instantaneous power interruption, for example, takes place, the voltage of the power source drops or the supply of the power source is interrupted for a short time, and the power source is restored to its original state.

Still another object of the present invention is to provide a control device for a PWM controlled converter which can satisfactorily control an input current to the PWM controlled converter without causing any spike current also when the overcurrent protecting mechanism is easily tripped, for example, when the input current instruction value is large, the voltage of the power source drops or the supply of the power source is interrupted for a short time, and the power source is restored to its original state.

SUMMARY OF THE INVENTION

According to an aspect of the present invention, there is provided a control device for a PWM controlled converter having voltage control means for comparing with a voltage set value a detecting value of a DC voltage output from the PWM controlled converter, connected through reactors to a 3-phase AC power source, for controlling AC input currents supplied from the 3-phase AC power source, to thereby produce current reference signals, AC reference signal generating means for generating AC reference signals synchronized with the 3-phase AC power source, current instruction means for producing current instruction signals formed by varying the amplitudes of the AC reference signals output from the AC reference signal generating means in accordance with the current reference signals, and current control means for producing control signals to the PWM controlled converter so that the AC input currents vary as instructed by the current instruction signals, the improvement characterized in that the current control means produces control signals based on a proportional control for a predetermined period after the control starts, and produces other control signals based on a proportional integration control after the predetermined period is terminated.

In the control device, the current control means produces the control signals based on the proportional integration control at the instant that a detecting value of the DC voltage output from the PWM controlled converter exceeds a predetermined value.

According to another aspect of the invention, there is provided a control device for a PWM controlled converter having voltage control means for comparing with a voltage set value a detecting value of a DC voltage output from the PWM controlled converter, connected through reactors to a 3-phase AC power source, for controlling AC input currents supplied from the 3-phase AC power source, to thereby produce current reference signals, AC reference signal generating means for generating AC reference signals synchronized with the 3-phase AC power source, current instruction means for producing current instruction signals formed by varying the amplitudes of the AC reference signals output from the AC reference signal generating means in accordance with the current reference signals, and current control means for producing control signals to the PWM controlled converter so that the AC input currents vary as instructed by the current instruction signals, the improvement characterized in that the current control means multiplies the deviations of AC input currents from the current instruction signals of two of three phases output from the current instruction means by first coefficients, integrates the results of the multiplications, and outputs the results of the integrations in the form of first output signals of the two phases, adds together the sign inverse values of the first output signals of the two phases to form a first output signal of the remaining phase, multiplies the deviations of the AC input currents from the input current instruction signals by second coefficients to form second output signals of the respective phases, adds together the first and second output signals for each phase and outputs the sums in the form of control signals applied to the PWM controlled converter.

According to still another aspect of the invention, there is provided a control device for a PWM controlled converter having DC voltage detecting means for detecting a DC voltage output from the PWM controlled converter for controlling AC input currents supplied from a 3-phase AC power source, voltage instruction outputting means for outputting an instruction value of the DC voltage, voltage control means for comparing a voltage instruction value output from the voltage instruction outputting means with a voltage detecting value output from the DC voltage detecting means, to thereby produce current reference signals, and current control means for producing control signals to the PWM controlled converter so that the AC input currents vary as instructed by the current instruction signals obtained from the current reference signals, the improvement characterized in that the voltage instruction outputting means calculatingly corrects the detection errors to produce a voltage instruction value.

In the control device, the voltage instruction outputting means includes storing means for storing the relationships between the values of the known voltages applied to the DC voltage detecting means and the detecting voltage values, detected by the DC voltage detecting means, corresponding to the known voltages, and correcting means for calculatingly correcting a voltage instruction value by using the stored voltage relationships so that an actual DC voltage output from the PWM controlled converter is settled down at a desired value.

In the control device, the known voltages applied to the DC voltage detecting means are DC voltages output from the PWM controlled converter.

Also in the control device, the voltage instruction outputting means includes storing means for storing the relationships between the voltages output from a reference voltage generating means included in the DC voltage detecting means and the detecting voltage values, detected by the DC voltage detecting means, corresponding to the voltages output from the reference voltage generating means, and correcting means for calculatingly correcting a voltage instruction value by using the stored voltage relationships so that an actual DC voltage output from the PWM controlled converter is settled down at a desired value.

According to yet another aspect of the invention, there is provided a control device for a PWM controlled converter having voltage control means for comparing a voltage set value with a detecting value of a DC voltage output-from the PWM controlled converter, connected to an AC power source, for controlling AC input currents supplied form the AC power source, to thereby produce a current reference signal, AC reference signal outputting means for outputting AC reference signals synchronized with the AC power source, current instruction means for producing current instruction signals formed by varying the amplitudes of the AC reference signals output from the AC reference signal outputting means in accordance with the current reference signal, and current control means, including at least integrating elements, for producing control signals to the PWM controlled converter so that the AC input currents vary as instructed by the current instruction signals, the improvement characterized in that when an AC input current exceeds a predetermined limit value, the current control means abruptly reduces the integrating elements thereof.

In the control device, when an AC input current exceeds a predetermined limit value, the current control means resets the integrating elements thereof to zero (0).

Also in the control device, the limit value is set on the basis of the current reference signal output from the voltage control means.

In the control device, the limit value is set on the basis of the current instruction signals output from the current instruction means.

The current control means includes a current limit level-setter for setting a limit value of an AC input current and a current controller integration reset circuit connected for reception to the limit value set by the current limit level setter and AC input currents, when the AC input current exceeds the limit value, the current controller integration reset circuit producing a signal.

The current control means abruptly reduces the absolute values of the integrating elements when an AC input current exceeds a limit value, and when the integrating elements of the current control means are different in polarity from the AC reference signals whose phases correspond to those of the integrating elements and the electrical quantities of the input currents accumulated in the integrating elements are in excess of a predetermined value.

According to an additional aspect of the invention, there is provided a control device for a PWM controlled converter having voltage control means for comparing a voltage set value with a detecting value of a DC voltage output from the PWM controlled converter, connected to an AC power source, for controlling AC input currents supplied form the AC power source, to thereby produce a current reference signal, AC reference signal outputting means for outputting AC reference signals synchronized with the AC power source, current instruction means for producing current instruction signals formed by varying the amplitudes of the AC reference signals output from the AC reference signal outputting means in accordance with the current reference signal, and current control means for producing control signals to the PWM controlled converter so that the AC input currents vary as instructed by the current instruction signals, the improvement characterized in that when an AC input current exceeds a predetermined limit value, the current control means abruptly reduces the current reference signals.

In the control device, the current control means includes integrating elements, and when an AC input current exceeds a predetermined limit value, resets the integrating elements to zero (0).

Also in the control device, when an AC input current exceeds a predetermined limit value, the voltage control means varies a current reference signal as defined by a time function of which an initial value is the current reference signal smaller than the current reference signal at least at the time point where the input current exceeds the limit value.

When an AC input current exceeds a predetermined limit value, and when the integrating elements of the current control means are different in polarity from the AC reference signals whose phases correspond to those of the integrating elements and the electrical quantities of the input currents accumulated in the integrating elements are in excess of a predetermined value, the current control means reduces the current reference signal.

DETAILED DESCRIPTION OF THE PREFERRED EMBODIMENTS

The embodiments of the present invention will be described hereunder.

Embodiment 1

Figure 1:
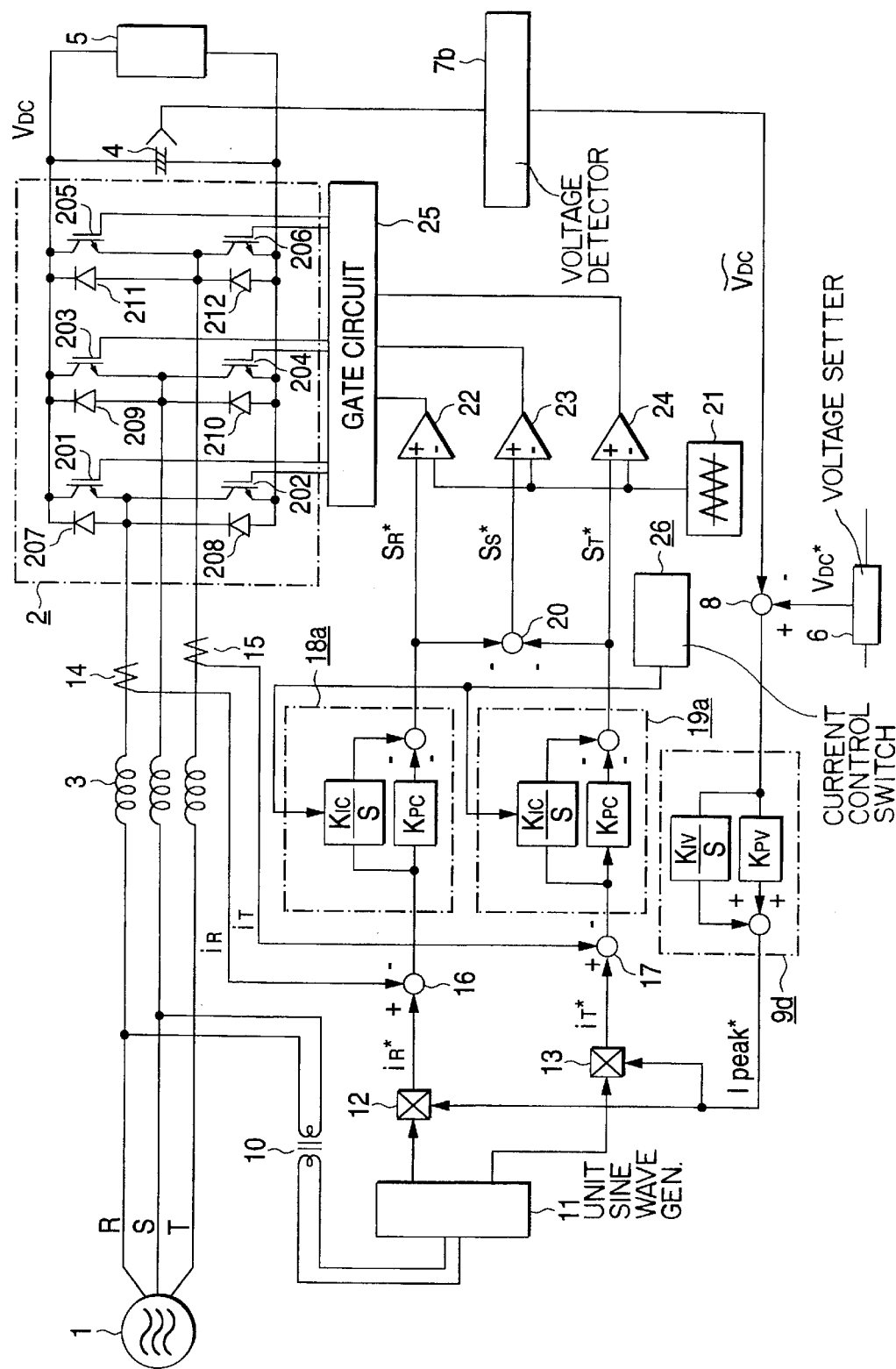
FIG. 1 is a diagram showing an arrangement of an embodiment 1 of a control device for a PWM controlled converter according to the present invention.

FIG. 1 is a diagram showing one of the embodiments of a control device for a PWM-controlled converter according to the present invention. In the figure, reference numeral 1 designates a 3-phase AC power source 1; 2, a PWM controlled converter which converts an AC power received from the 3-phase AC power source 1 into a DC voltage by controlling the AC current of the received AC power, and outputs the converted DC voltage; 201 to 206, switching elements which are transistors; and 207 to 212, circulating diodes.

Numeral 3 designates reactors connected between the 3-phase AC power source 1 and the PWM controlled converter 2; 4, a smoothing condenser for absorbing a pulsating component contained in an output current of the PWM controlled converter 2; 5, a load unit such as an invertor; 6, a voltage setter for outputting a voltage setting signal for setting a DC voltage output from the PWM controlled converter 2; and 7b, a voltage detecting circuit which detects a DC voltage output from the PWM controlled converter 2.

Numeral 8 indicates a subtractor for calculating a deviation of a voltage detecting signal detected by and output from the voltage detecting circuit 7b from a voltage setting signal set by and output from the voltage setter 6; 9d, a voltage controller which includes a proportional control calculating element and a proportional integration calculating element, and proportional integration (PI) controls a deviation of a voltage detecting signal output from the subtractor 8 from the voltage setting signal, and forms voltage control means, together with the subtractor 8; 10, an AC voltage detector for detecting an AC voltage from the 3-phase AC power source 1; 11, a unit sine wave generator for generating R-phase and T-phase unit sine waves, which are synchronized with R-phase and T-phase voltages, from an AC voltage detecting signal detected by the AC voltage detector 10, and forms reference AC signal outputting means, together with the AC voltage detector 10. Numerals 12 and 13 designate multipliers for multiplying a peak value instruction signal of an input current received from the voltage controller 9d by R-phase and T-phase unit sine wave signals received from the unit sine wave generator 11, and outputs R-phase and T-phase input current instruction signals. The multipliers form a current instruction means.

Numerals 14 and 15 represent current detectors for detecting currents of R-phase and T-phase input to the PWM controlled converter 2; 16 and 17, subtractors for producing a deviation of an input current detecting signal of R-phase output from the current detector 14 from an input current instruction signal of R-phase output from the multiplier 12 and a deviation of an input current detecting signal of T-phase output from the current detector 15 from an input current instruction signal of T-phase output from the multiplier 13; 18a and 19a, R- and T-phase current controllers which include proportional control calculating elements and proportional integration calculating elements, and control the deviations of the T-phase input current detecting signals from the R-phase input current instruction signals, to thereby output an R-phase control signal and a T-phase control signal; and 20, a subtractor for subtracting from zero the R- and T-phase control signals output from the R- and T-phase current controllers 18a and 19a.

Numeral 21 designates a carrier wave oscillator; 22, 23 and 24 designate comparators for comparing the amplitudes of R-, S- and T-phase control signals with a carrier wave signal to output pulse-width modulated signals; 25, a gate circuit for outputting signals to turn on and off the switching elements 201 to 206 of the PWM controlled converter 2 in accordance with R-, S- and T-phase pulse-width modulated signals; and 26, a current control switch device for controlling the integrating elements of the R- and T-phase current controllers 18a and 19a to be zero. Current control means is made up of the current detectors 14 and 15, the subtractors 16 and 17, R- and T-phase current controllers 18a and 19a, subtractor 20, carrier wave oscillator 21, comparators 22, 23 and 24, gate circuit 25, and the current control switch device 26. In the figure, the circuit components 1 to 17, and 20 to 25 are the same as the corresponding ones already stated in the prior art discussion.

Figure 2:
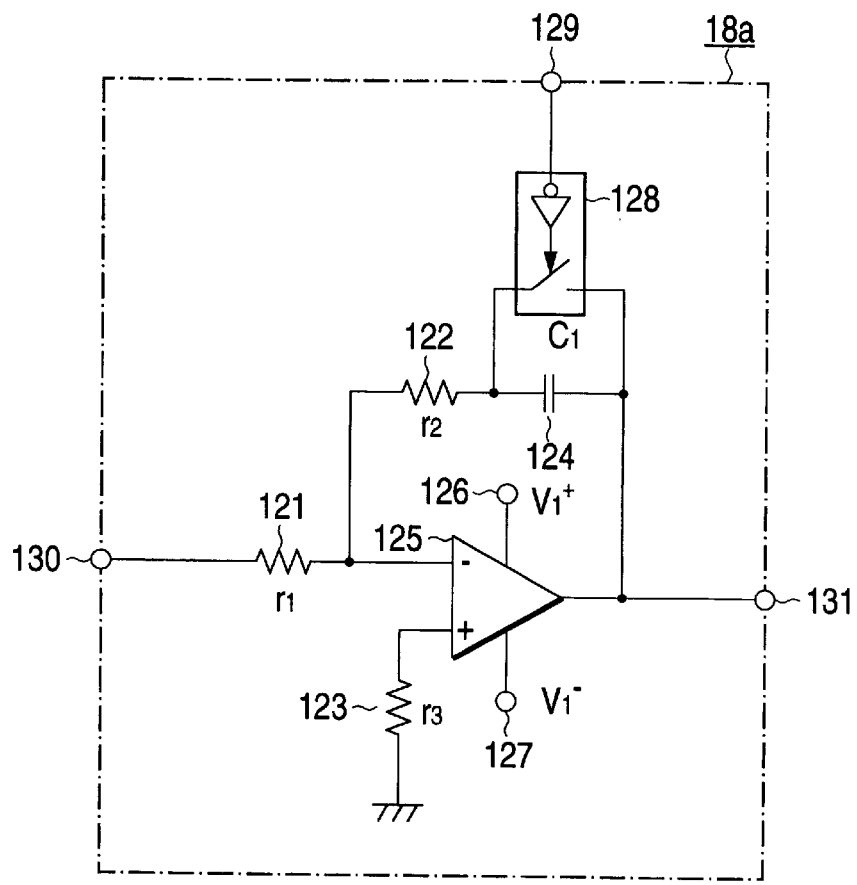
FIG. 2 is a diagram showing the details of an arrangement of an R-phase current controller shown in FIG. 1.

FIG. 2 is a diagram showing the detail of an arrangement of the R-phase current controller 18a shown in FIG. 1. In FIG. 2, reference numerals 121 to 123 designate fixed resistors of resistance values r1 to r3; 124, a capacitor of capacitance C1; 125, an operational amplifier; 126 and 127, positive and negative voltage input terminals of a control power source for driving the operational amplifier 125; 128, an analog switch connected across the capacitor 124; 129, a control input terminal for receiving a control signal for controlling a switching operation of the analog switch 128; 130, an input terminal of the R-phase current controller 18a for receiving a deviation signal from the subtractor 16; and 131, an output terminal of the R-phase current controller 18a for outputting an R-phase control signal to the comparator 22. The T-phase current controller 19a is similarly constructed.

Figure 3:
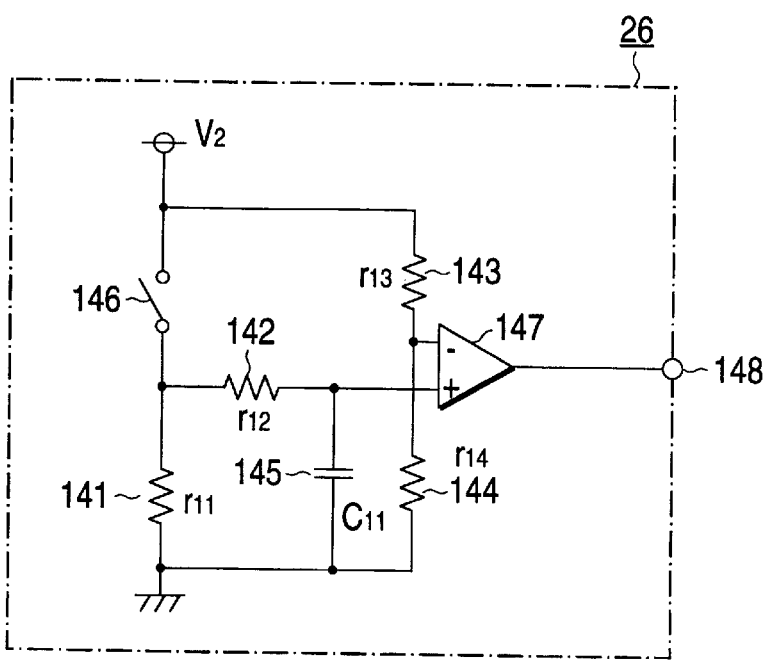
FIG. 3 is a diagram showing the details of an arrangement of a current control switch device shown in FIG. 1.

FIG. 3 is a diagram showing the detail of an arrangement of the current control switch device 26 shown in FIG. 1. In FIG. 3, reference numerals 141 to 144 indicate fixed resistors of resistance values r11 to r14; 145, a capacitor of capacitance C11; 146, a switch; 147, a comparator; and 148, an output terminal for outputting a signal for controlling the R- and T-phase current controllers 18a and 19a.

Figure 4:
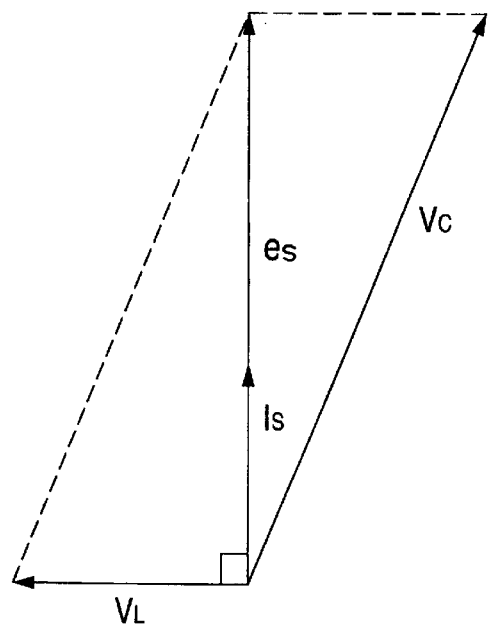
FIG. 4 is a vector diagram of voltage and current in the power source side of the device shown in FIG. 1.

Proceeding with the operation description of the embodiment 1, the operation principle will be described. FIG. 4 is a vector diagram of voltage and current in the power source side of the device shown in FIG. 1. eS represents a power source voltage vector of the 3-phase AC power source 1; VC, an AC side voltage vector of the PWM controlled converter 2, VL, a voltage vector VL of the reactor 3; and IS, a vector of an input current supplied from the power source. To control the input current IS so as to be in phase with the power source voltage (high power factor), the reactor voltage VL must lead the AC side voltage VC of the PWM controlled converter 2 by 90°. Therefore, the AC side voltage VC is always larger than the power source voltage eS.

Description will be given about a relationship between the DC side voltage V DC and an effective value (denoted as V RMS for ease of explanation) of an AC side line voltage as a magnitude of the AC side voltage vector. In case where the amplitudes of R-, S- and T-phase control signals SR*, SS* and ST* are smaller than the amplitude Tx of the carrier wave signal Tx, if the waveforms of the R-, S-and T-phase control signals SR*, SS* and ST* are sinusoidal, the waveforms of the voltage fundamental wave components of those phases are also sinusoidal. In case where ½ of the DC side voltage V DC of the PWM controlled converter 2 is the reference potential, ±(V DC/2) holds when the control signals SR*, SS* and ST* are equal in amplitude to the carrier wave signal Tx. Hence, in order that the control signals SR*, SS* and ST* are equal in amplitude to the carrier wave signal Tx, a relationship between the effective value V RMS of the line voltage and the DC side voltage V DC must satisfy the following condition given by an expression (1)

$$V\ RMS\ V\ DC/2/\ 2\times 3 \tag{1}$$

Rearranging the expression (1), we have $$V\ DC\ V\ RMS \times 2\ 2/3 = V\ RMS \times 1.64\ldots \tag{2}$$

From the above expressions, in order that the output voltages of those phases are output having the fundamental waveform components while being unsaturated, the DC side voltage V DC of the PWM controlled converter 2 must be at least 1.64 times as large as the AC side line voltage effective value V RMS. If the DC side voltage V DC is smaller than the value that is 1.64 times as large as the AC side line voltage effective value V RMS, viz., in a region where the amplitudes of the control signals SR*, SS* and ST* are larger than the amplitude of the carrier wave signal Tx, the output voltage is limited within ±(V DC/2) in a region where the control signals exceed the carrier wave signal Tx.

Figure 5:
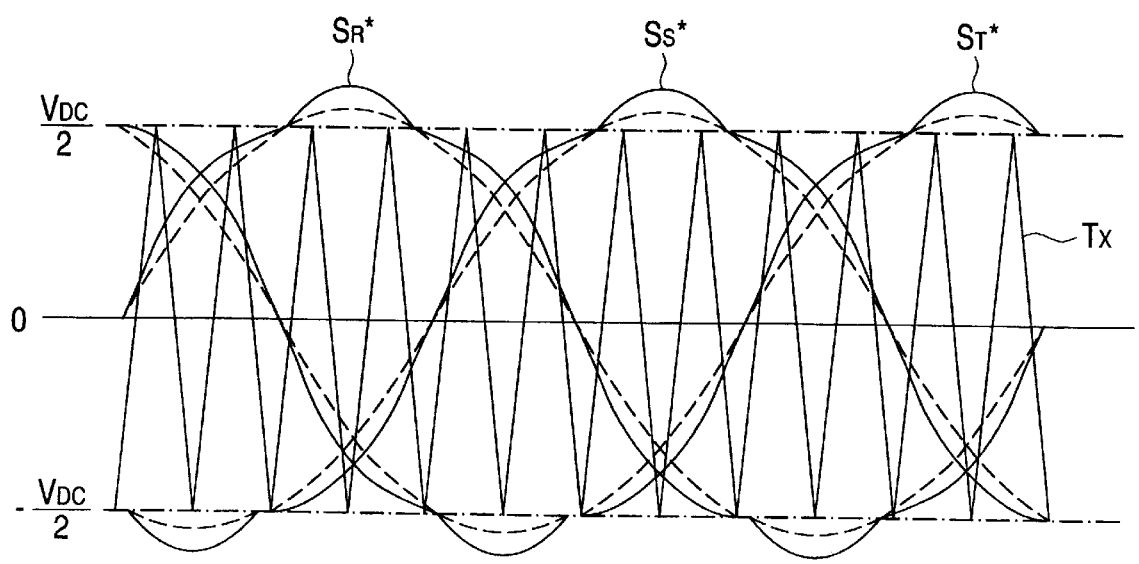
FIG. 5 is an explanatory diagram showing a relationship between control signals to the PWM controlled converter and a carrier wave signal.

In the conventional control device for a PWM controlled converter, the R- and T-phase control signals SR* and ST* are calculated by the PI current controllers, and the S-phase control signal SS* is obtained as SS*=(−SR*−ST*), which follows from a formula SR*+SS*+ST*=0. Therefore, when the amplitudes of the control signals exceed each amplitude of the carrier wave signal-Tx, as shown in FIG. 5, the control signals of the remaining phases automatically change, so that the line voltages are controlled as instructed by the instruction values. Accordingly, the input currents are satisfactorily controlled only when the control signals of the respective phases are within a 60° saturation, viz., a time duration where the amplitudes of the control signals exceed the amplitude of the carrier wave signal Tx is within 60°, the following condition for the AC side line voltage effective value V RMS and the DC side voltage V DC is expressed by an expression (3)

$$V\ RMS \leq V\ DC/2\times \tag{3}$$

Rearranging the expression (3), we have $$V\ DC \geq V\ RMS \times \ldots = V\ RMS \times 1.41\ldots \tag{4}$$

When the control device is started up in a state that the PWM controlled converter 2 is not controlled by the signals from the gate circuit 25, but the load unit 5 is operating, for example, in a load active state that the load unit 5 is operating, the DC side voltage V DC of the PWM controlled converter 2 is lower than the line voltage peak value (greater than the line voltage by the square root of 2) by the voltage drop across the reactor 3. The effective value V RMS of the AC side line voltage of the PWM controlled converter 2 must be larger than the effective value of the line voltage of the 3-phase AC power source 1 as described above. Therefore, the DC side voltage V DC is below the value given by the expression (4). In this case, an attempt to control the input currents so as to be in phase with the power source voltage (high power factor) as instructed by the instruction fails since the AC side line voltage of the PWM controlled converter 2 is insufficient in amplitude and a region in which control is not possible is present in the AC side line voltage of the PWM controlled converter 2. As a result, the actual current value is not coincident with the current instruction value.

For the R- and T-phase control signals SR* and ST*, produced through the PI controlling of the deviations output from the subtractors 16 and 17 by the R- and T-phase current controllers 18a and 19a, the deviations thereof are progressively accumulated in the integrators, and with the accumulation, grow in the positive or negative direction up to the saturation voltages of the operational amplifiers, and are fixed at the saturation voltages. Further, the S-phase control signal SS* is obtained as SS*=(−SR*−ST*), and hence the control signal is also fixed at a value when the control signals SR* and ST* are saturated. As a result, the control device cannot control the input currents of three phases.

If the proportional control is used for the control scheme of each of the current controllers 18a and 19a, if the DC side voltage V DC drops and the current instruction value is coincident with the actual current value, the R- and T-phase control signals SR* and ST* have values obtained by proportionally multiplying the deviations. Therefore, the operational amplifiers are not saturated, and the voltage of at least one phase is controllable. In the R- and T-phase current controllers 18a and 19a based on the proportional control, a steady deviation is caused between the current instruction value and the actual current value.

Accordingly, the embodiment 1 proposes a control device for a PWM controlled converter which operates in a proportional control mode only at the time of starting where the control device is apt to fail in controlling the voltages of three phases since the proportional integration control saturates the operational amplifiers.

An operation of the embodiment 1 shown in FIGS. 1 through 3 will be described. A detecting value V DC^ of a DC voltage detected by the voltage detecting circuit 7b and a set value V DC* set by the voltage setter 6 are input to the subtractor 8 where the eV (deviation)=V DC^−V DC* is calculated. The obtained deviation eV is input to the voltage controller 9d where it is PI-controlled so as to reduce the deviation to zero and produces a peak value instruction signal I PEAK* of the input current. The peak value instruction signal I PEAK* is applied to the multipliers 12 and 13 where it is multiplied by the unit sine wave signals of R-phase and T-phase derived from the unit sine wave generator 11. The R- and T-phase unit sine wave signals are unit sine wave signals, i.e., reference AC signals, synchronized with the R- and T-phase voltages of the 3-phase AC power source 1, and are generated by a current reference signal generator constituting the unit sine wave generator 11, which receives an AC voltage of the 3-phase AC power source 1 detected by the AC voltage detector 10. The multipliers 12 and 13 produce an R-phase input current instruction signal iR* and a T-phase input current instruction signal iT*, respectively.

The R-phase input current instruction signal iR* as an output signal of the multiplier 12 and an R-phase input current detecting signal iR as an output signal of the current detector 14 are applied to the subtractor 16 which calculates eiR (deviation)=iR* −iR and outputs the result of the calculation. Similarly, the T-phase input current instruction signal iT* as an output signal of the multiplier 13 and a T-phase input current detecting signal iT as an output signal of the current detector 15 are applied to the subtractor 17 which calculates eiT (deviation) =iT*−iT and deviations eiR and eiT are applied to the R-phase current controller 18a and the T-phase current controller 19a, respectively. In each of the controllers 18a and 19a, a proportional control mode or a proportional integration mode is selected by the current control switch device 26.

In the current control switch device 26, constructed as shown in FIG. 3, the switch 146 is turned on upon receipt of a control start signal or a drive signal. Then, a voltage at the positive input terminal of the comparator 147 rises at a time constant determined by the fixed resistor 142 and the capacitor 145. The output of the comparator 147 is at an "L" level during a period that the voltage at the positive input terminal of the comparator 147 is smaller than the voltage at the negative input terminal. When the voltage at the positive input terminal of the comparator gently rises through the fixed resistor 142 and the capacitor 145, and exceeds the voltage at the negative input terminal of the comparator, which is set by the fixed resistors 143 and 144, the output of the comparator is at an "H" level.

The output signal of the comparator 147 is applied as the output signal of the current control switch device 26 to the R- and T-phase current controllers 18a and 19a, through the output terminal 148. In the R-phase current controller 18a constructed as shown in FIG. 2, when an input signal at the control input terminal 129 is at an "L" level, the analog switch 128 is placed in an on state, so that the capacitor 124 is shorted. In this state, an R-phase current deviation eiR that comes in through the input terminal 130 of the R-phase current controller 18a undergoes only a proportional control as given by expression (5), and the result of the proportional control is output as an R-phase control signal SR from the output terminal 131.

$$SR^{*}=-K1\times eiR \qquad (5)$$

where K1=r2/r1.

When the input signal on the control input terminal 129 is at an "H" level, the analog switch 128 is placed in an on state. An R-phase current deviation eiR, which comes in through the input terminal 130 of the R-phase current controller 18a, is PI controlled according to the following expression (6) and the result of the PI controlling is output as an R-phase control signal SR* through the output terminal 131 of the R-phase current controller.

$$SR^{*}=-K1\times(1+1/(S\times T))\times eiR \qquad (6)$$

where K1=r2/r1

T=C1×C2

S=differential operator

The T-phase current controller 19a operates in a similar way. When an input signal on the control input terminal 129 is at an "L" level, the current deviation eiT undergoes a proportional control. When it is at an "H" level, the current deviation undergoes a proportional integration control, and the resultant signal is output as a T-phase control signal ST* from the T-phase current controller. An S-phase control signal SS is formed by the subtractor 20 in a manner that the R- and T-phase control signals SR* and ST* are reduced from 0. The control signals SR*, SS* and ST* as the output signals of the R-phase current controller 18a, the subtractor 20 and the T-phase current controller 19a are applied to the comparators 22, 23 and 24, respectively. In the comparators, those signals are each compared in amplitude with a carrier wave signal of triangle waves output from the carrier wave oscillator 21. The resultant signals are output in the form of pulse width modulated (PWM) signals.

These PWM signals are input to the gate circuit 25 which in turn outputs control signals to the PWM controlled converter 2. In the converter, under control of the control signals, the switching elements 201 to 206 are controlled so that the DC voltage detecting value V DC^ of the PWM controlled converter 2 is equal to the set value V DC* set by the voltage setter 6. Further, the input currents iR, iS and iT of R-, S- and T-phase are equal to their instruction signals iR*, iS* and iT*.

In the embodiment 1, the R- and T-phase currents are detected for the converter control. Any other combinations of those three phase currents may be used for the same purposes.

In the control device for a PWM controlled converter according to the embodiment 1, the current control means produces control signals based on a proportional control for a predetermined period after the control starts, and produces other control signals based on a proportional integration control after the predetermined period is terminated. Specifically, at starting the proportional-control basis control signals are used for controlling the PWM controlled converter for a predetermined period, and after the predetermined period terminates, the proportional-integration-control basis control signals are used for controlling the PWM controlled converter. Therefore, no overcurrent problem arises, and a good control of the input currents is secured.

Embodiment 2

Figure 6:
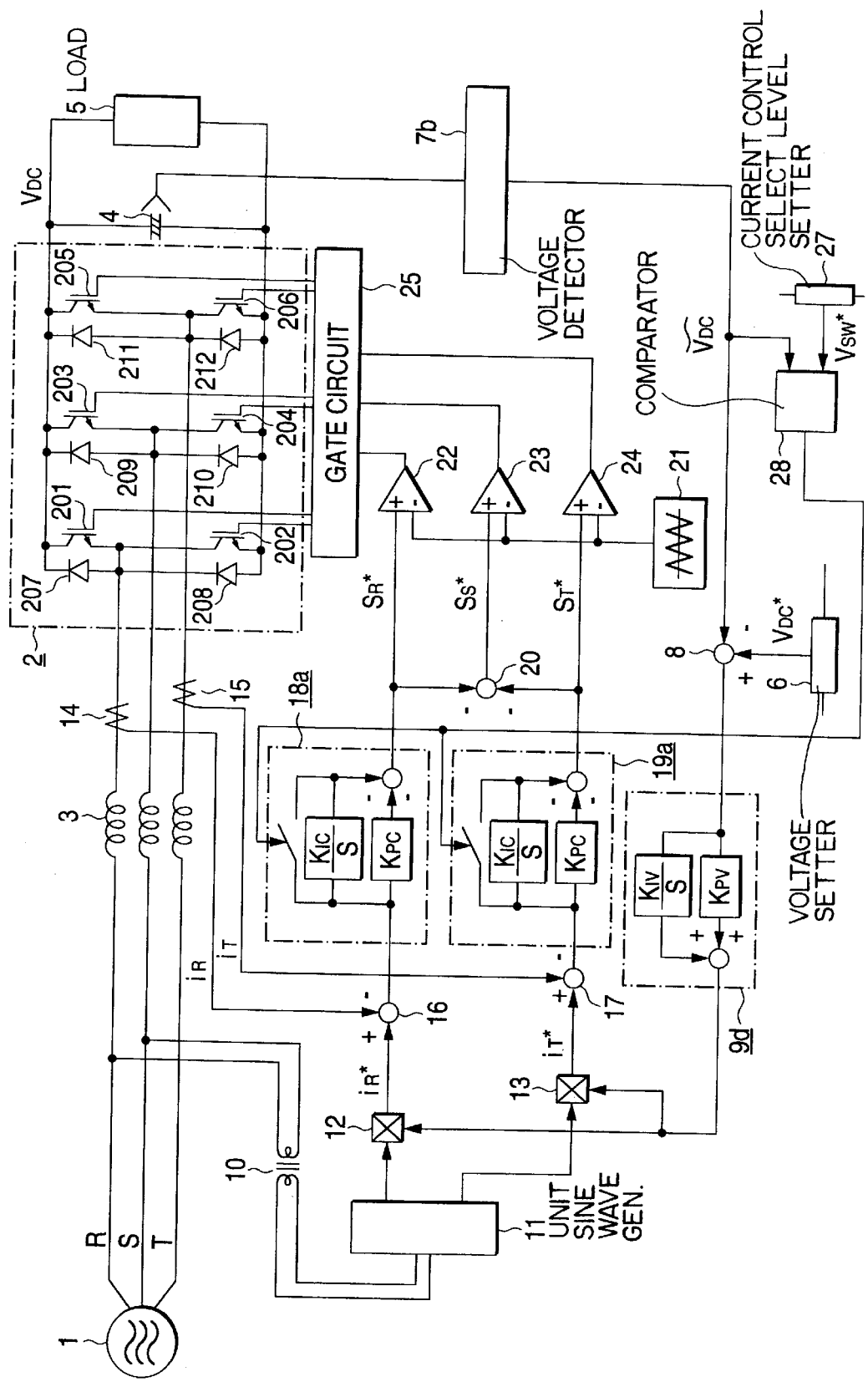
FIG. 6 is a diagram showing an arrangement of an embodiment 2 of a control device for a PWM controlled converter according to the present invention.

FIG. 6 is a diagram showing an arrangement of another embodiment of a control device for a PWM controlled converter according to the present invention. In FIG. 6, reference numeral 27 designates a current control select-level setter, and numeral 28, a comparator. The comparator compares a set value V SW. detected by the current control select-level setter 27 with a DC voltage detecting value V DC^ detected by the voltage detecting circuit 7b, and produces signals for controlling the R- and T-phase current controllers 18a and 19a. The remaining construction of the control device is substantially the same as of the embodiment shown in FIG. 1.

In the embodiment shown in shown in FIG. 1, the R- and T-phase current controllers 18a and 19a each produce a control signal based on a proportional control for a predetermined period set by the current control switch device 26 after a controlling operation starts, viz., during a period determined by a time constant determined by the fixed resistor 142 and the capacitor 145, and produce a control signal based on a proportional integration control after the predetermined period terminates. The embodiment shown in FIG. 6 includes the combination of the current control select-level setter 27 and the comparator 28, which performs the following signal selective operation. When a DC voltage detecting value V DC^ detected by the voltage detecting circuit 7b is below a set value V SW* preset by the current control select-level setter 27, the R- and T-phase current controllers 18a and 19a produce proportional-control basis control signals. When the value V DC^ is above the set value V SW*, the R- and T-phase current controllers 18a and 19a produce proportional-integration-control basis control signals.

More specifically, a set value V SW* as an output signal of the current control select-level setter 27 and a DC voltage detecting value V DC^ detected through the voltage detecting circuit 7b are applied to the comparator 28. Before the DC voltage V DC^ exceeds the set value V SW*, the R- and T-phase current controllers 18a and 19a each produce an "L" level signal as a control signal for the proportional control. After the DC voltage V DC exceeds the set value V SW*, the R- and T-phase current controllers 18a and 19a each produce an "H" level signal as a control signal for the proportional integration control. The R-phase current controller 18a performs a proportional control on the R-phase current deviation eiR applied thereto when the input signal on the control input-terminal 129 shown in FIG. 2 is at an "L" level, and performs a proportional integration control on the same when the input signal is at an "H" level, and produces an R-phase control signal SR at the input terminal 130 thereof. The T-phase current controller 19a also performs a proportional control on the R-phase current deviation eiT applied thereto when the input signal on the control input terminal is at an "L" level, and performs a proportional integration control on the same when the input signal is at an "H" level, and produces a T-phase control signal TR* at the input terminal 130.

Figure 7:
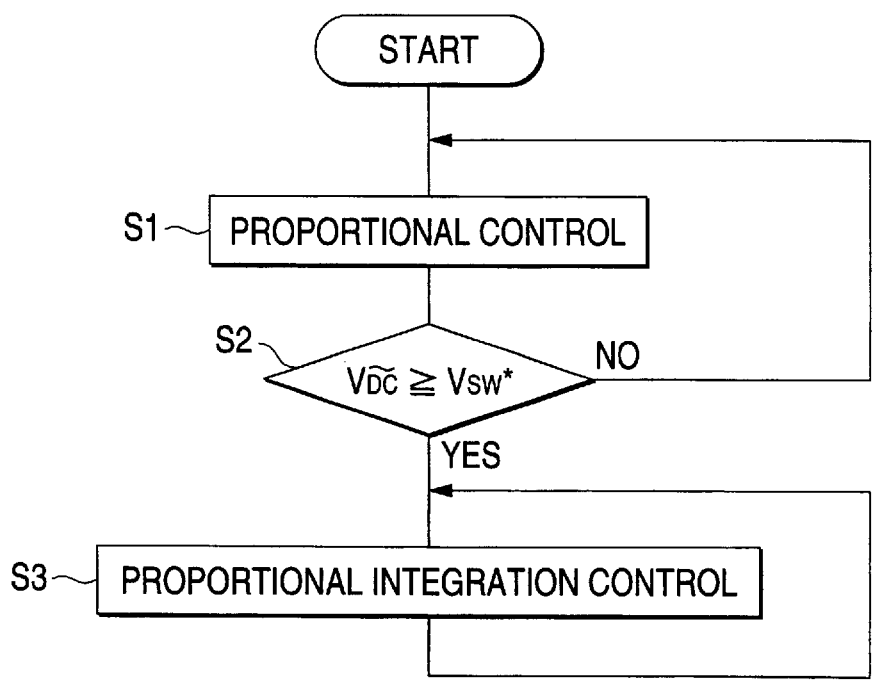
FIG. 7 is a flow chart useful in explaining an operation of the embodiment 2 shown in FIG. 6.

The operation of the embodiment shown in FIG. 6 will be described with reference to a flow chart shown in FIG. 7. When the control device is started up, or the control operation starts, the R- and T-phase current controllers 18a and 19-a are set in a proportional control mode in a step S1. In the next step S2, a set-value V SW* as an output signal of the current control select-level setter 27 and a DC voltage detecting value V DC^ detected through the voltage detecting circuit 7b are compared by the comparator 28. If V DC^<V SW*, the current controllers holds the proportional control mode set in the step S1. If the step S2 determines that V DC^>V SW*, a step S3 is executed to place the R- and T-phase current controllers 18a and 19a in a proportional integration control. As already described referring to the expression (4), when the DC side voltage V DC is at least approximately 1.41 times as large as the AC side line voltage effective value V RMS, the voltage control can be performed as instructed by an instruction value. Therefore, the setting of the set value V SW* within the range of the values above that value but below the set value V DC* of the voltage setter 6 will do.

In the control device for a PWM controlled converter of the embodiment 2, current control means produces control signals based on a proportional control before a detecting value of the DC voltage of the PWM controlled converter exceeds a predetermined value, and produces other control signals based on a proportional integration control after a detecting value of the DC voltage of the PWM controlled converter exceeds a predetermined value. Therefore, a proportional control mode is switched to a proportional integration control mode and vice versa at an optimum switching timing. Particularly at starting, a good input current control can be carried out without causing the overcurrent problem, for example. Additionally, the proportional control period possibly causing a steady deviation may easily be minimized in consideration of the overall circuit arrangement.

Embodiment 3

Figure 8:
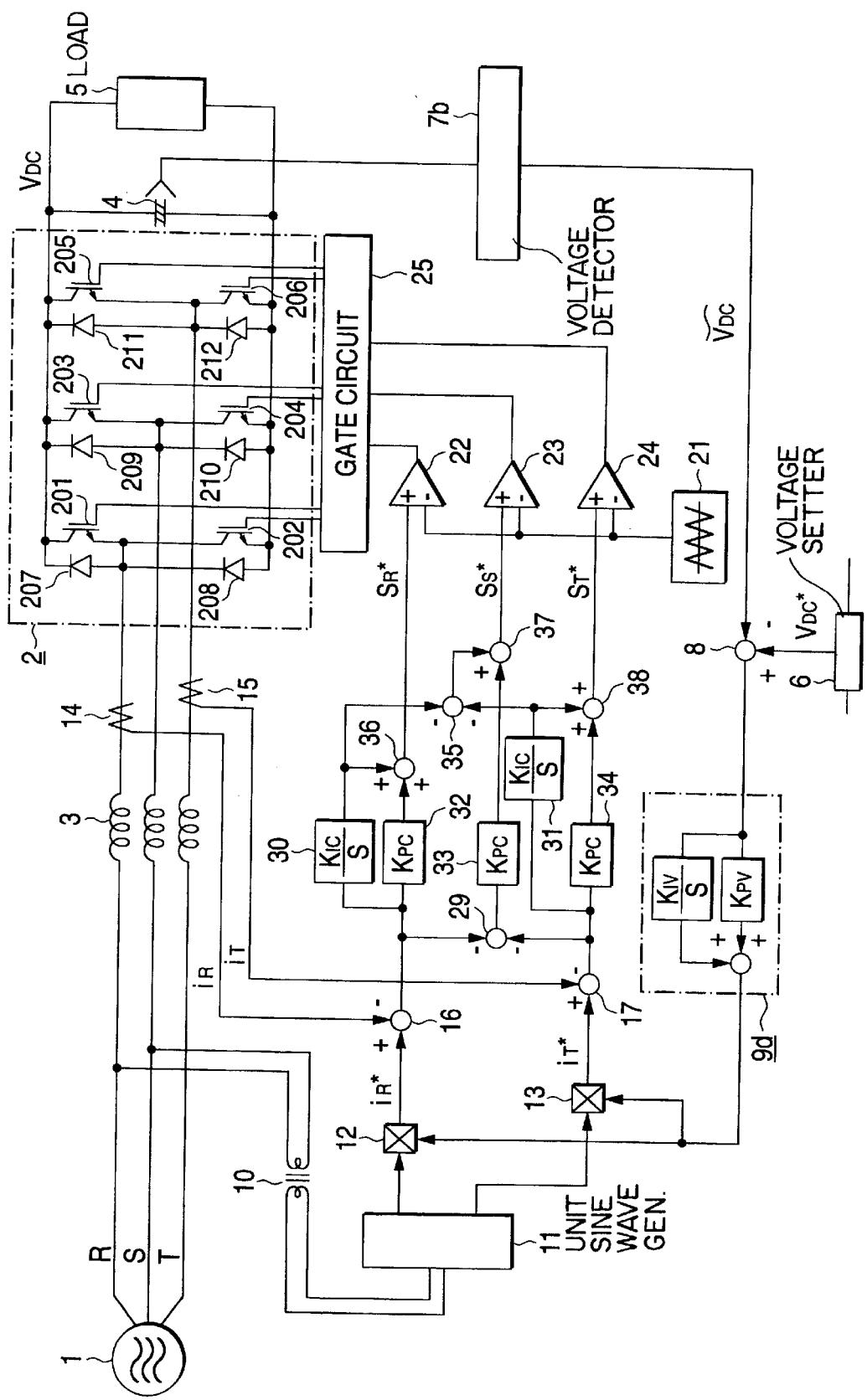
FIG. 8 is a diagram showing an arrangement of an embodiment 3 of a control device for a PWM controlled converter according to the present invention.

FIG. 8 is a diagram showing an arrangement of an embodiment 3 of a control device for a PWM controlled converter according to the present invention. In FIG. 8, reference numeral 29 designates a subtractor which subtracts from 0 a deviation of an R-phase input current detecting signal iR from an R-phase input current instruction signal iR* that is output from the subtractor 16, and a deviation from a R-phase input current detecting signal iT from a T-phase input current instruction signal iT* that is output from the subtractor 17, and outputs the result of the subtraction in the form of a deviation of an input current detecting signal from an S-phase input current instruction signal. Numerals 30 and 31 indicate integrators. The integrator 30 integrates the product of multiplying by a coefficient a deviation of an R-phase input current detecting signal iR from an R-phase input current instruction signal iR* that is output from the subtractor 16, and outputs the result of the integration. The integrator 31 integrates the product of multiplying a coefficient by a deviation from a R-phase input current detecting signal iT* from a T-phase input current instruction signal iT that is output from the subtractor 17, and outputs the result of the integration. Numerals 32 to 34 represent coefficient multipliers for multiplying by coefficients the deviations of current detecting signals from the R-, S- and T-phase input current instruction signals output from the subtractors 16, 29 and 17, respectively.

Reference numeral 35 designates a subtractor which receives the integrating values of the R- and T-phase current deviations output from the integrators 30 and 31, and subtracts these integrating values from zero (0). Numerals 36, 37 and 38 designate adders. The adder 36 adds together the output signals of the coefficient multiplier 32 and the integrator 30 to produce an R-phase control signal SR*. The adder 37 adds together the output signals of the coefficient multiplier 33 and the subtractor 35 to produce an S-phase control signal SS*. The adder 38 adds together the coefficient multiplier 34 and the integrator 31 to produce a T-phase control signal ST*. The remaining arrangement of the present embodiment is substantially the same as the arrangement of FIG. 1 or 6. Like reference numerals are used for designating like equivalent portions in those embodiments already described.

In the embodiment of FIG. 1 or 6, the R- and T-phase current control means of R- and T-phase produce control signals for transmission to the PWM controlled converter while switching its operation mode from the proportional control mode to the proportional integration control mode. In the embodiment shown in FIG. 8, the product of multiplying a deviation of the R-phase AC input current from the R-phase input current instruction signal output from the multiplier 12 constituting the current control means by coefficients is integrated, and the product of multiplying a deviation of the T-phase input current from the T-phase input current instruction signal output from the multiplier 13 also constituting the current control means is integrated, and the results of the integrations are output as first R- and T-phase output signals. The sign inverse values of those first R- and T-phase output signals are added together to form a first S-phase output signal. Further, the products of multiplying the deviations of the AC input currents from the input current instruction signals by the coefficients are output as second output signals of the respective phases. The sums of the first and second output signals of the respective phases are output in the form of control signals for the PWM controlled converter.

An operation of the embodiment shown in FIG. 8 will be described. A DC voltage detecting value V DC^ detected through the voltage detecting circuit 7b and a set value V DC* set by the voltage setter 6 are input to the subtractor 8 where a deviation eV therebetween is calculated; eV=V DC*−V DC^. The deviation eV is input to the voltage controller 9d. The controller PI controls the deviation so that it approaches zero (0), and produces a peak value instruction signal I PEAK* of the AC input current. The peak-value instruction signal I PEAK* is input to the multipliers 12 and 13 which in turn multiply the peak value instruction signal I PEAK* by the R- and T-phase unit sine wave signals derived from the unit sine wave generator 11. The R- and T-phase unit sine wave signals are unit sine wave signals, i.e., reference AC signals, synchronized with the R- and T-phase voltages of the 3-phase AC power source 1, and are generated by a current reference signal generator constituting the unit sine wave generator 11, which receives an AC voltage of the 3-phase AC power source 1 detected by the AC voltage detector 10.

An R-phase input current instruction signal iR* as an output signal of the multiplier 12 and an R-phase input current detecting signal iR as an output signal of the current detector 14 are input to the subtractor 16. In turn, the subtractor calculates a deviation eiR by eiR=iR*−iR, and outputs the result of the calculation. Similarly, a T-phase input current instruction signal iT* as an output signal of the multiplier 13 and an R-phase input current detecting signal iT as an output signal of the current detector 15 are input to the subtractor 17. The subtractor calculates a deviation eiT by the formula eiT=iT*−iT. Further, an S-phase current deviation eiS is calculated by the formula eiR+eiS+eiT=0. The current deviations eiR and eiT are input to the subtractor 29. In turn, the subtractor subtracts these deviations from zero (0) and produces the result of the calculation as an S-phase current deviation eiS.

The R-phase current deviation eiR is input to the integrator 30 and the coefficient multiplier 32. A proportional term and an integration term of the R-phase current control as the outputs of the integrator 30 and the multiplier 32 are added together, by the adder 36, into an R-phase control signal SR. The T-phase current deviation eiT is input to the integrator 31 and the coefficient multiplier 34. A proportional term and an integration term of the T-phase current control as the outputs of the integrator 31 and the multiplier 34 are added together, by the adder 38, into a T-phase control signal ST*. The output signal of the integrator 30 as the integration term of the R-phase current control and the output signal of the integrator 31 as the integration term of the T-phase current control are input to the subtractor 35. The subtractor 35 subtracts those output signals from zero (0) to form an S-phase integration term. The output signal of the subtractor 35 and an S-phase proportional term, which is formed by multiplying an S-phase current deviation eiS as the output signal of the subtractor 29 by the coefficient multiplier 33, are input to the adder 37. The adder adds together the S-phase integration term and the S-phase proportional term to generate an S-phase control signal SS*.

The R-, S- and T-phase control signals SR*, SS* and ST* as the output signals of the adders 36, 37 and 38 are applied to the comparators 22, 23 and 24. By the comparators, those control signals are compared in amplitude with a carrier wave signal of a triangle wave that is output from the carrier wave oscillator 21, and the results of the comparisons are output in the form of pulse width modulation signals. These PWM signals are input to the gate circuit 25 which in turn outputs control signals to the PWM controlled converter 2. In the converter, under control of the control signals, the switching elements 201 to 206 are controlled so that the DC voltage detecting value V DC^ of the PWM controlled converter 2 is equal to the set value V DC* set by the voltage setter 6, and further the input currents iR, iS and iT of R-, S- and T-phase are equal to their instruction signals iR*, iS* and iT*.

As described above, in the PWM controlled converter according to the embodiment 3, the current control means multiplies the deviations of the AC input currents from the R- and T-phase current instruction signals output from the multipliers 12 and 13, which form current instruction means, by the coefficients, integrates the results of the multiplications, and outputs the results of the integrations in the form of first R- and T-phase output signals. The sign inverse values of those first R- and T-phase output signals are added together to form a first S-phase output signal. Further, the products of multiplying the deviations of the AC input currents from the input current instruction signals are output as second output signals of the respective phases. The sums of the first and second output signals of the respective phases are output in the form of control signals for the PWM controlled converter. In such a construction, the proportional control is performed on the S-phase. Therefore, at starting no overcurrent problem arises. Even when the DC side voltage V DC drops by a load variation, no overcurrent problem arises, and good current control is secured.

Embodiment 4

Figure 9:
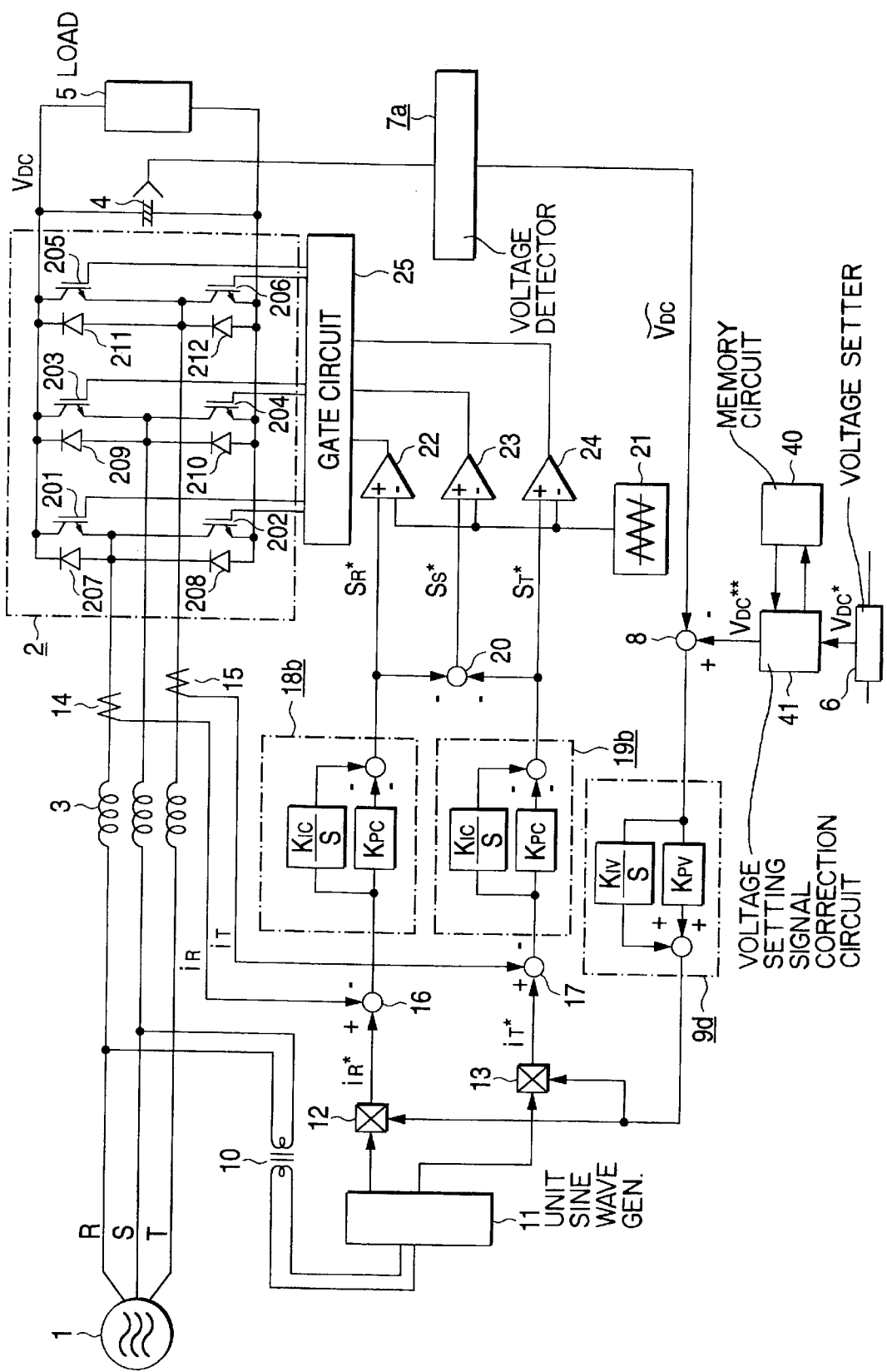
FIG. 9 is a diagram showing an arrangement of an embodiment 4 of a control device for a PWM controlled converter according to the present invention.

FIG. 9 is a diagram showing an arrangement of an additional embodiment of a control device for a PWM controlled converter according to the present invention. In FIG. 9, reference numeral 7a is representative of a voltage detecting circuit 7a for detecting a DC voltage output from the PWM controlled converter 2, and it forms a DC voltage detecting means. Numeral 40 represents a memory circuit for storing relationships between the known values of voltages applied to the voltage detecting circuit 7a and the voltage values detected by the voltage detecting circuit 7a; and numeral 41, a voltage-setting-signal correction circuit which corrects a voltage setting signal set and output by the voltage setter 6 while referring to the relationships stored in the memory circuit 40, and outputs the corrected one to the subtractor 8. The memory circuit 40, the voltage setting-signal correction circuit 41, and the voltage setter 6 form voltage instruction outputting means. For the remaining construction, like or equivalent portions are designated by like reference numerals in FIG. 1 showing the embodiment 1, for simplicity.

Figure 10:
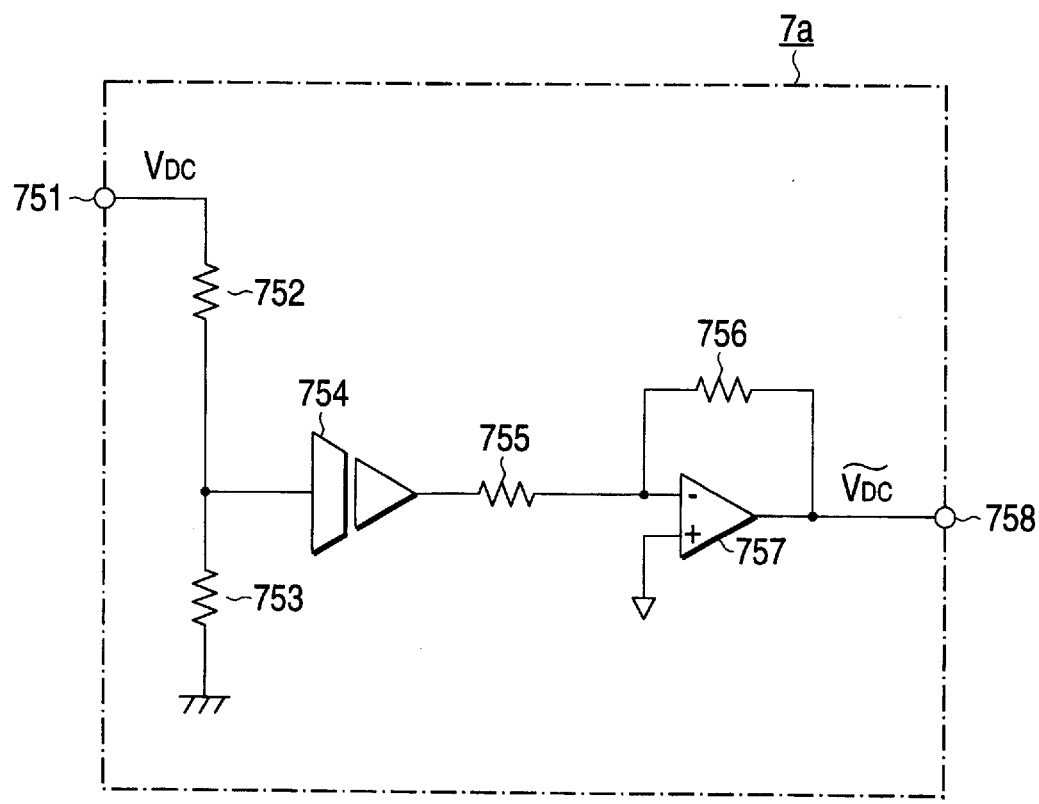
FIG. 10 is a circuit diagram showing an arrangement of a voltage detecting circuit shown in FIG. 9.

FIG. 10 is a circuit diagram showing a detailed arrangement of a voltage detecting circuit 7a for detecting a DC voltage V DC in the control device shown in FIG. 9. In FIG. 10, reference numeral 751 indicates an input terminal connected to the positive potential of the smoothing condenser 4; and 752 and 753 indicate fixed resistors for dividing the DC voltage V DC, one end of the fixed resistor 753 being connected to the negative potential of the smoothing condenser 4. Reference numeral 754 designates an insulating amplifier; 755 to 756, fixed resistors; 757, an operational amplifier; and 758, an output terminal for outputting a DC voltage detecting value V DC^ to the subtractor 8.

Figure 28:
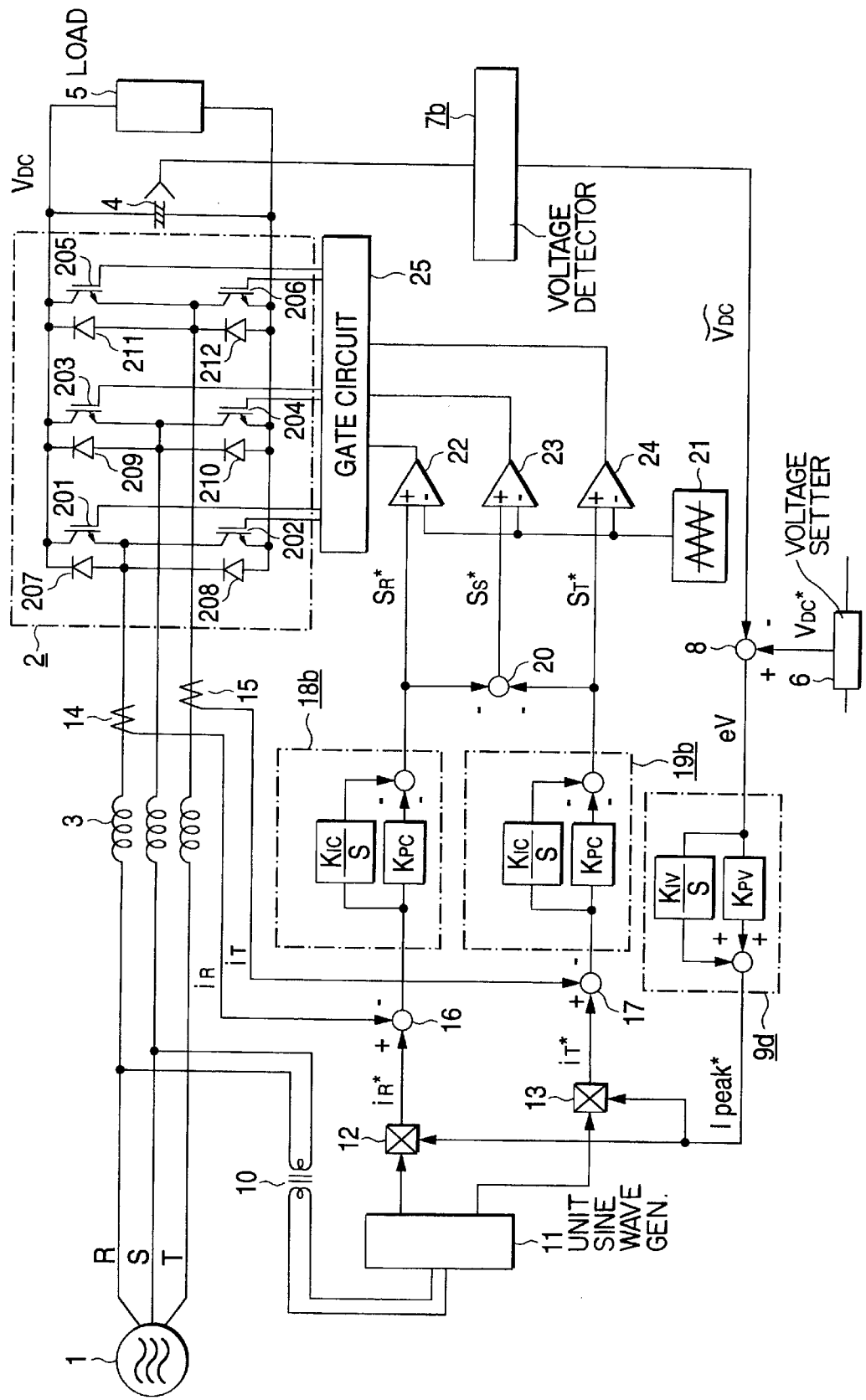
FIG. 28 is a diagram showing an arrangement of a conventional control device for a PWM controlled converter.
Figure 29:
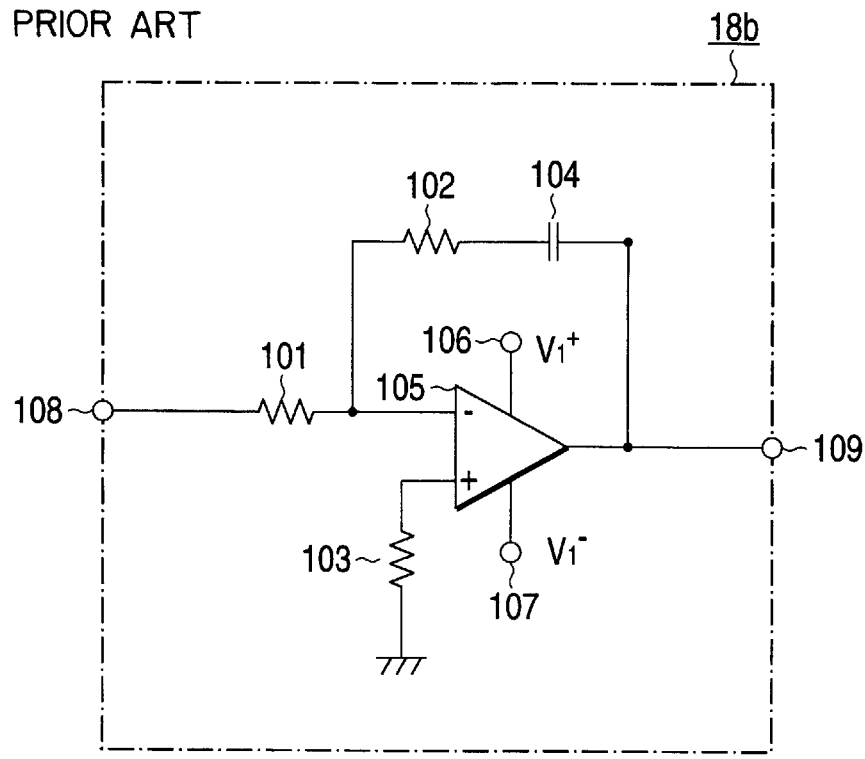
FIG. 29 is a diagram showing the detail of an arrangement of a conventional R-phase current controller.
Figure 30:
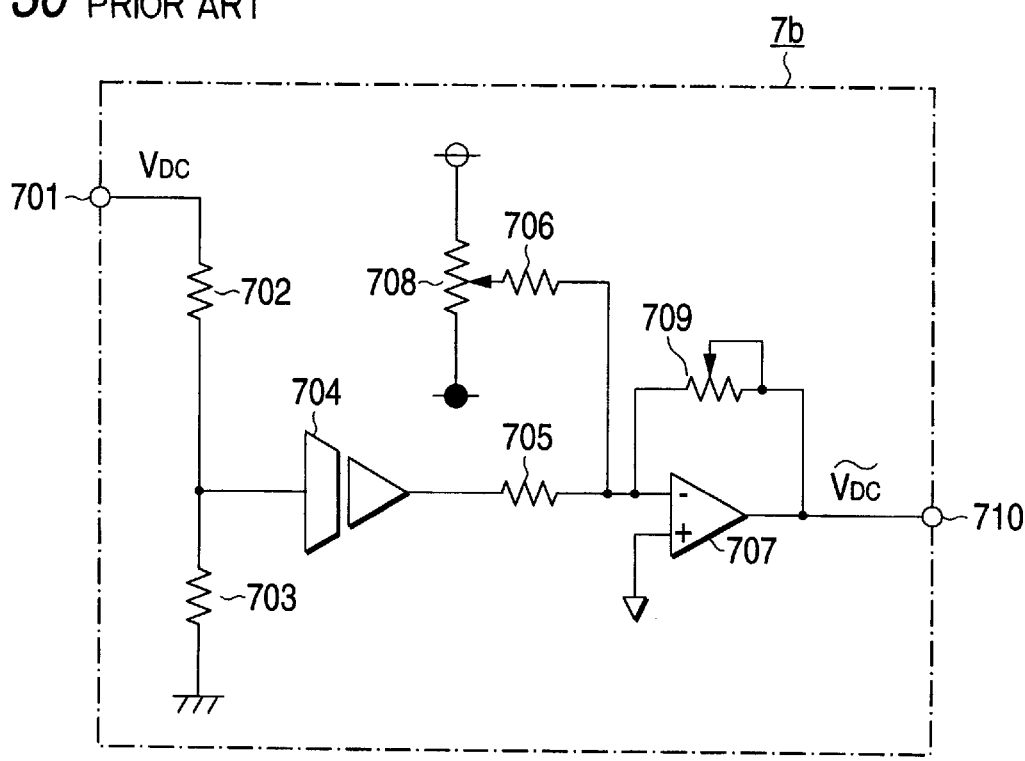
FIG. 30 is a diagram showing the detail of an arrangement of a conventional voltage detecting circuit.
Figure 31:
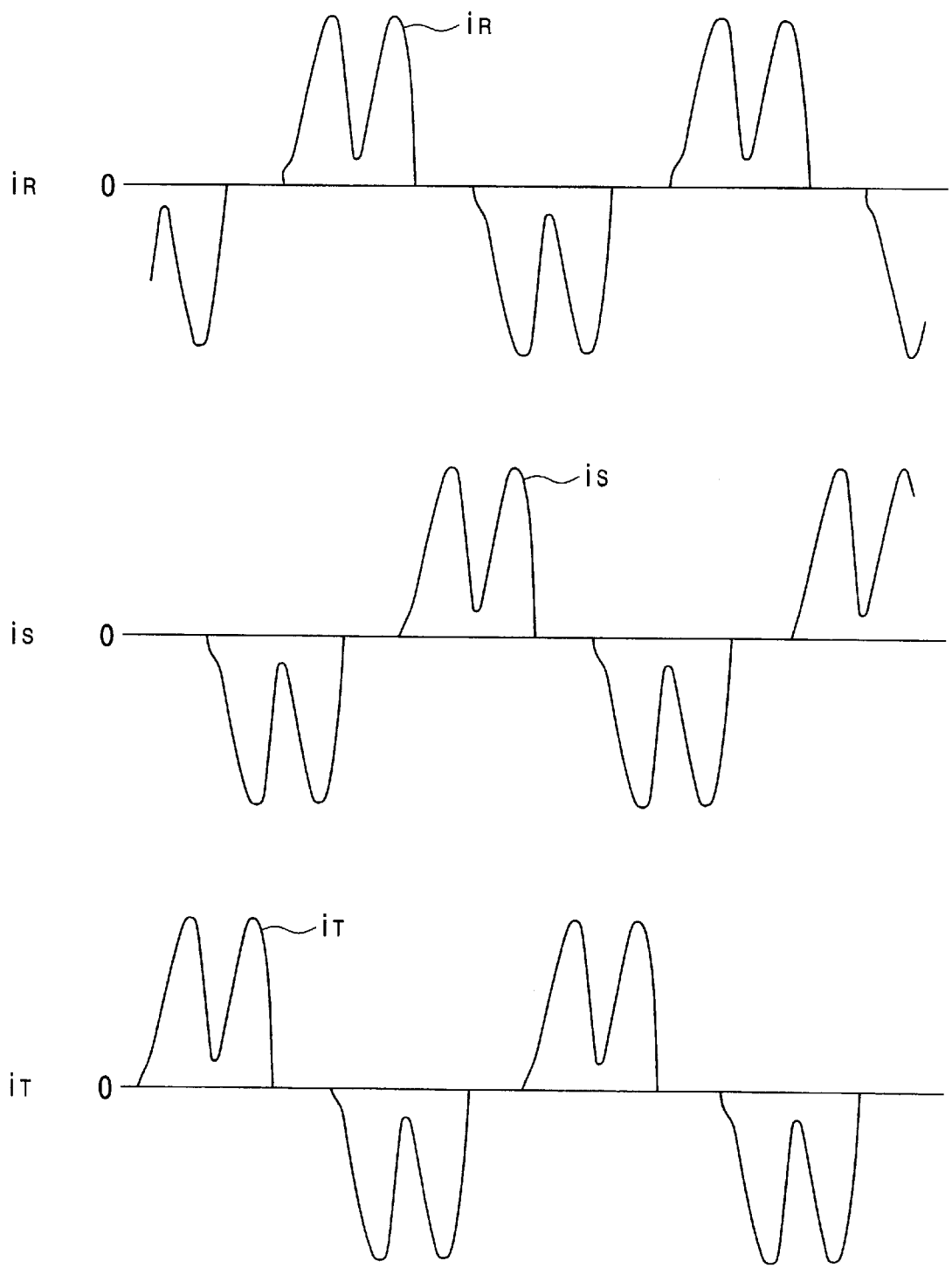
FIG. 31 is a waveform diagram showing the waveforms of input currents to the PWM controlled converter before the converter starts its control operation.
Figure 32:
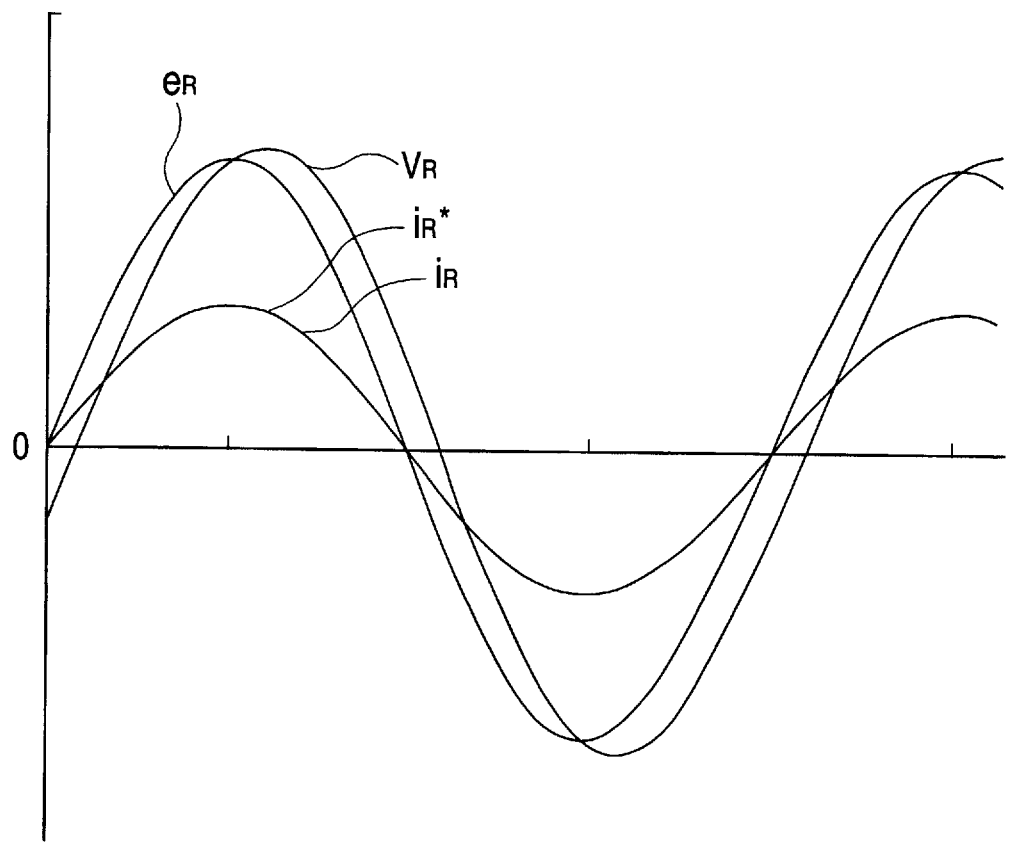
FIG. 32 is a waveform diagram showing the waveforms of the power source voltage and currents of a control device for a PWM controlled converter, and a voltage of the PWM controlled converter.
Figure 33:
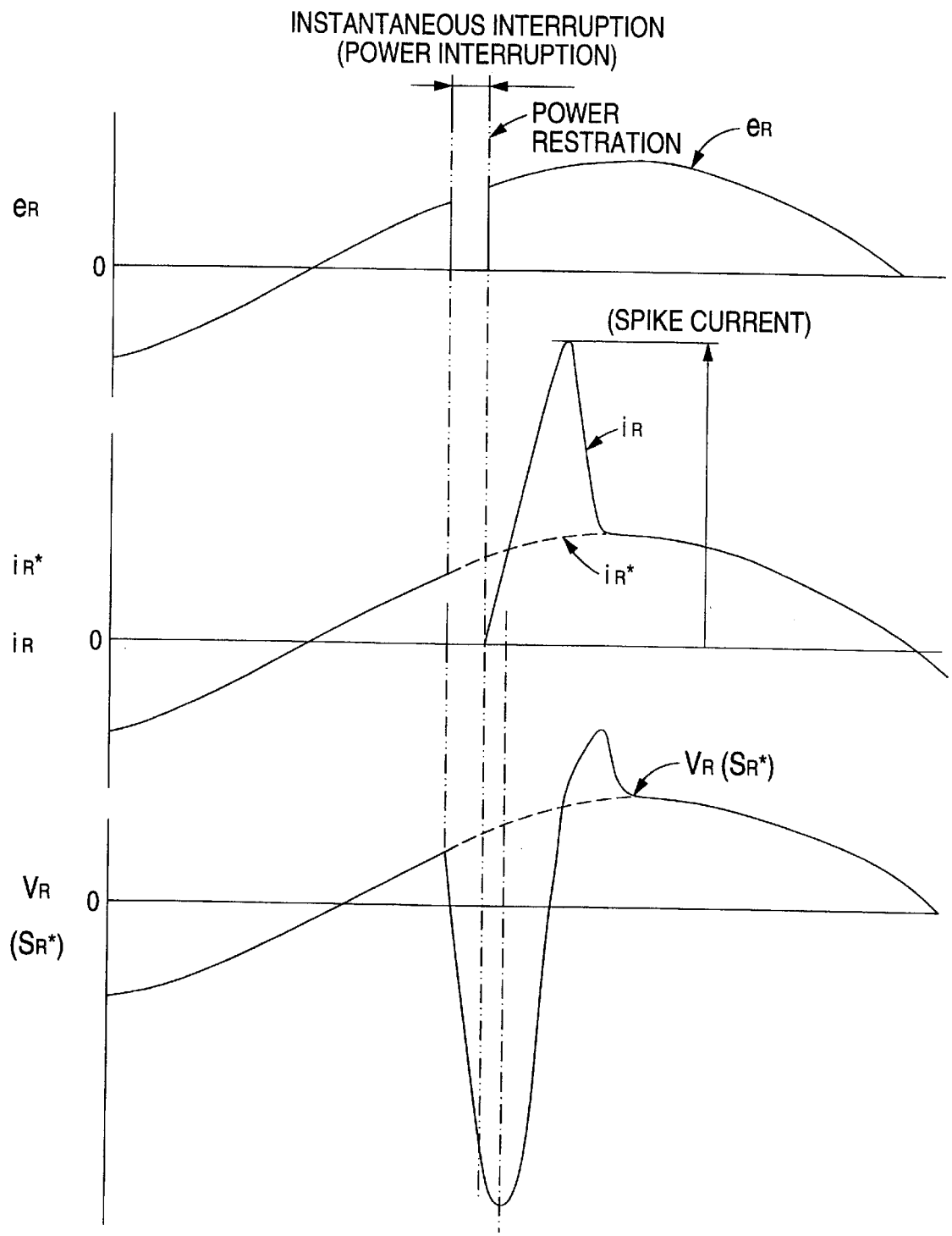
FIG. 33 is a waveform diagram showing the waveforms of the voltages and currents at key portions when an instantaneous power interrupt takes place in a conventional control device for a PWM controlled converter.

In the thus arranged voltage detecting circuit 7a, a DC voltage V DC is divided, by the fixed resistors 752 and 753, into a voltage within a range of voltage values that can be accepted by the insulating amplifier 754. The insulating amplifier 754 detects the divided voltage in an insulating manner. The operational amplifier 757 amplifies the detected voltage to a proper level of the voltage, and outputs it from the output terminal 758. The circuit thus arranged is a basic circuit generally used for adjusting an offset and a gain of the voltage detecting circuit by an operational amplifier. The present voltage detecting circuit is different from the voltage detecting circuit 7b shown in FIG. 28 in that the former does not include a variable resistor for adjusting the offset and gain errors of the voltage detecting value.

Figure 11:
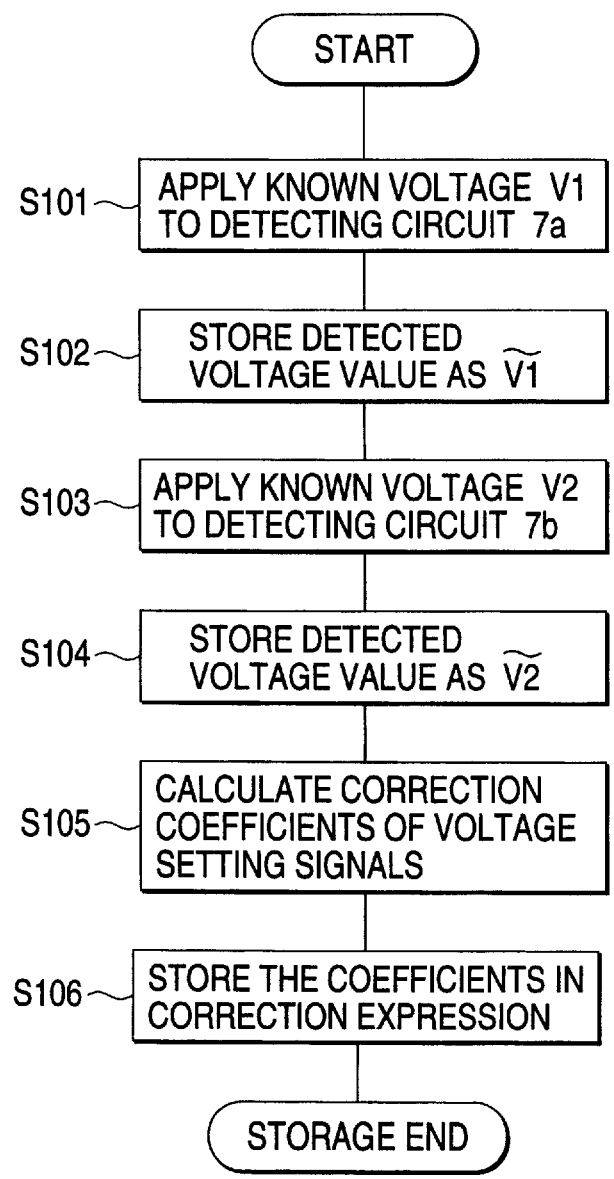
FIG. 11 is a flow chart showing an operation of the embodiment 4 shown in FIG. 9.

The operation of the embodiment 4 shown in FIGS. 9 and 10 will be described with reference to a flow chart shown in FIG. 11. As shown in the FIG. 11 flow chart, adjusting known voltage values and detecting values of the DC voltage detected by the voltage detecting circuit 7a are first stored in a corresponding fashion into the memory circuit 40.

More specifically, in a step S101 a known voltage V1 is applied to the voltage detecting circuit 7a, from an outside circuit. The known voltage may be applied to the voltage detecting circuit in a manner that the switching elements 201 to 206 of the PWM controlled converter 2 are turned off, and in this state an AC voltage of the 3-phase AC power source 1 is converted into a DC voltage by the circulating diodes 207 to 212 of the PWM controlled converter 2, and the DC voltage is applied to the voltage detecting circuit. Alternatively, the known voltage may be applied to the voltage detecting circuit 7a, from a DC power source that is provided outside the control device.

In a step S102, the known voltage V1 applied to the voltage detecting circuit 7a and a voltage value V1^ detected by the voltage detecting circuit 7a when it receives the known voltage V1 are stored into the memory circuit 40.

In a step S103, another known voltage V2 that is different from the known voltage V1 is applied to the voltage detecting circuit 7a. In a step S104, the second known voltage V2 that is applied to the voltage detecting circuit 7a and a voltage value V2^ detected by the voltage detecting circuit 7a when it receives the second known voltage V2 are stored into the memory circuit 40.

In a step S105, an offset error or a gain error of the voltage detecting circuit is corrected according to expressions (7) and (8) while using the applied known voltages V1 and V2 and the detected voltage values V1 and V2. Voltage setting values are corrected so that the DC voltage of the PWM controlled converter 2 has a desired voltage value, and correction coefficients A and B to be used for voltage setting signals are calculated.

$$A = (V2^\wedge - V1^\wedge)/(V2 - V1) \tag{7}$$

$$B = (V1^\wedge \times V2 - V2^\wedge \times V1)/(V2 - V1) \tag{8}$$

$$V\,DC^{**} = A \times V\,DC^* + B \tag{9}$$

In step S106, the correction coefficients A and B are stored into the memory circuit 40. In this way, a voltage instruction value V DC* set by the voltage setter 6 is corrected according to the expression (9) while using the correction coefficients A and B thus stored in the memory circuit 40, and a voltage set signal V DC is generated. Using the voltage set signal V DC, it is possible to correct the offset or gain error of the voltage detecting circuit.

A sequence of the correcting operation is performed when the PWM controlled converter is installed or before a normal operation of the converter starts, for example, when it is tested. The correcting operation may be performed according to a program stored in a memory of a microcomputer. Therefore, the volume that is attached to the voltage detecting circuit for adjusting the offset or gain error of the voltage detecting circuit 7a in the conventional device may be omitted. Further, the troublesome work for the offset or gain error correction is eliminated, and the operability of the control device is improved.

In the error correction method described above, the relationships between the known voltage values applied to the voltage detecting circuit 7a and the detecting values are approximated by the linear functions, and by calculating the linear functions, and the correction coefficients A and B are obtained and stored. In a further error correction method, the known voltage values and detecting values are increased in number, the relationships between them are polygonally approximated, and the correction coefficients A and B are obtained through a calculation and stored. This error correction method ensures a further precise correction of those errors. When the voltage detecting circuit 7a does not include a zero offset, the steps S103 and S104 may be omitted. In this case, the error correction calculations are performed with V2=0 and V2^=0. Conversely, when only the offset of the voltage detecting circuit 7a is problematic, the step S101 is executed under the condition that V1=0, and the steps S103 and S104 are omitted. In the error correction method described above, in calculating the correction coefficients A and B, the known voltage values and the voltage values detected by the voltage detecting circuit 7a are stored in the memory circuit 40. Alternatively, the voltage values are stored into a memory of a microcomputer for executing the sequence of the operations, the correction coefficients are calculated, and the calculated correction coefficients are stored into the memory circuit 40.

A control operation that the control device for a PWM controlled converter performs using the thus obtained correction coefficients A and B, will be described. A voltage instruction value V DC* set by the voltage setter 6 is input to the voltage-setting-signal correction circuit 41. At adjusting, the voltage instruction value V DC* is corrected using the correction coefficients A and B stored in advance in the memory circuit 40, and the expression (9), and a voltage set signal V DC formed after the correction of the voltage instruction value is output to the subtractor 8. Subsequently, the corrected voltage set signal V DC and the detecting value V DC^ output from the voltage detecting circuit 7a are input to the subtractor 8 which in turn eV (deviation)=V DC**–V DC^. The deviation eV is input to the voltage controller 9d which in turn performs a proportional integration on the deviation and outputs a peak value instruction signal I PEAK* of the input current. A control operation that the control device performs using the thus obtained peak value instruction signal I PEAK* is similar to that of the embodiment shown in FIGS. 1, 6 and 8. Hence, no further description of it is given here.

As described above, in the control device for a PWM controlled converter according to the embodiment 4, the relationships between the values of the known voltages applied to the DC voltage detecting circuit and the voltage values detected by the detecting circuit are stored in advance. The voltage instruction outputting means corrects the detection errors of the DC voltage by using the stored voltage relationships so that an actual DC voltage of the PWM controlled converter is settled down at a desired value. Therefore, there is eliminated the use of the variable resistor, for example, for compensating for the offset or gain error of the voltage detecting circuit. Hence, troublesome compensating work is eliminated and the operability of the control device is improved. Further, the operation for adjusting the offset and gain errors can easily be automated in the stage of manufacturing.

Figure 12:
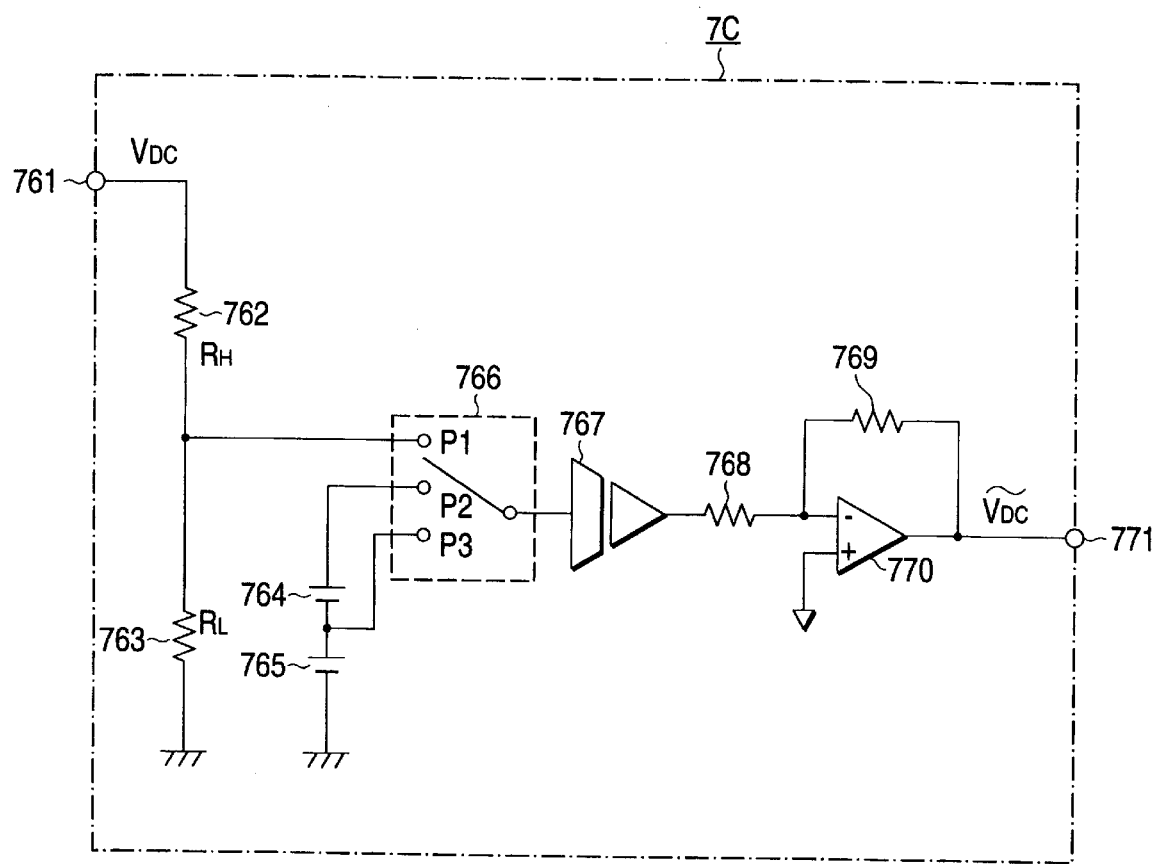
FIG. 12 is a circuit diagram showing another arrangement of the voltage detecting circuit shown in FIG. 9.

In the embodiment 4, known voltages are applied to the voltage detecting circuit, from an exterior circuit. The relationships between the known voltage values and the voltage values detected by the voltage detecting circuit are stored in advance. A voltage detecting circuit 7c as shown in FIG. 12 may be used instead of the above method. The voltage detecting circuit shown in FIG. 12 uses a reference voltage generator as a means for providing known voltages.

FIG. 12 is a circuit diagram showing a detailed arrangement of the voltage detecting circuit 7c for detecting a voltage V DC derived from the PWM controlled converter. In FIG. 12, reference numeral 761 designates an input terminal connected to the positive potential of the smoothing condenser 4; 762 and 763, fixed resistors for dividing the DC voltage V DC, and the fixed resistor 763 is connected to the negative potential of the smoothing condenser 4. Numerals 764 and 765 indicate reference voltage sources; 766, a signal selector for selecting an input signal to an insulating amplifier 767; 768 and 769, fixed resistors; 770, an operational amplifier; and 771, an output terminal of the voltage detecting circuit 7c.

In the voltage detecting circuit 7c shown in FIG. 12, at the time of adjusting, the signal selector 766 is set at positions P2 and P3 so that known voltages are applied to the insulating amplifier from the reference voltage sources 764 and 765. And the correction coefficients are calculated as in the above-mentioned manner. The voltages of the reference voltage sources 764 and 765 are directly applied to the insulating amplifier 767. The DC voltage V DC is dropped to a voltage defined by RL/(RH+RL) by means of the fixed resistors 762 and 763, and then applied to the insulating amplifier 767. Therefore, the correction coefficients may be calculated and stored on the assumption that the voltages obtained by multiplying the voltages of the reference voltage sources 764 and 765 by (RH+RL)/RL are the DC voltages V DC. In a normal operation, as in the embodiment 4, a DC voltage V DC is divided, by the fixed resistors 762 and 763, into a voltage within a range of voltage values that can be accepted by the insulating amplifier 767. The insulating amplifier 767 detects the divided voltage in an insulating manner. The operational amplifier 770 amplifies the detected voltage to a proper level of the voltage, and outputs it from the output terminal 771.

In the embodiment 4, it is necessary to apply a DC voltage at the same level as in a normal operation to the voltage detecting circuit. In the voltage detecting circuit 7c shown in FIG. 12, since the voltages obtained by multiplying the voltages of the reference voltage sources 764 and 765 by (RH+RL)/RL may be considered to be the DC voltages V DC, the voltage source at a lower voltage level than the DC voltage V DC in a normal operation may be used for the reference voltage sources.

The circuit arrangement of the voltage detecting circuit 7c shown in FIG. 12 has the following additional useful effects as well as those effects as of the embodiment 4. By constructing only the fixed resistors 762 and 763 for dividing the DC voltage V DC coming in through the input terminal 761 and the reference voltage sources 764 and 765 with highly accurate components and voltage sources, if the remaining circuit components of the voltage detecting circuit 7c, for example, the insulating amplifier 767 and the operational amplifier 770, are degraded in characteristics by aging, the characteristic degradation can be corrected without using other voltage sources.

Embodiment 5

Figure 13:
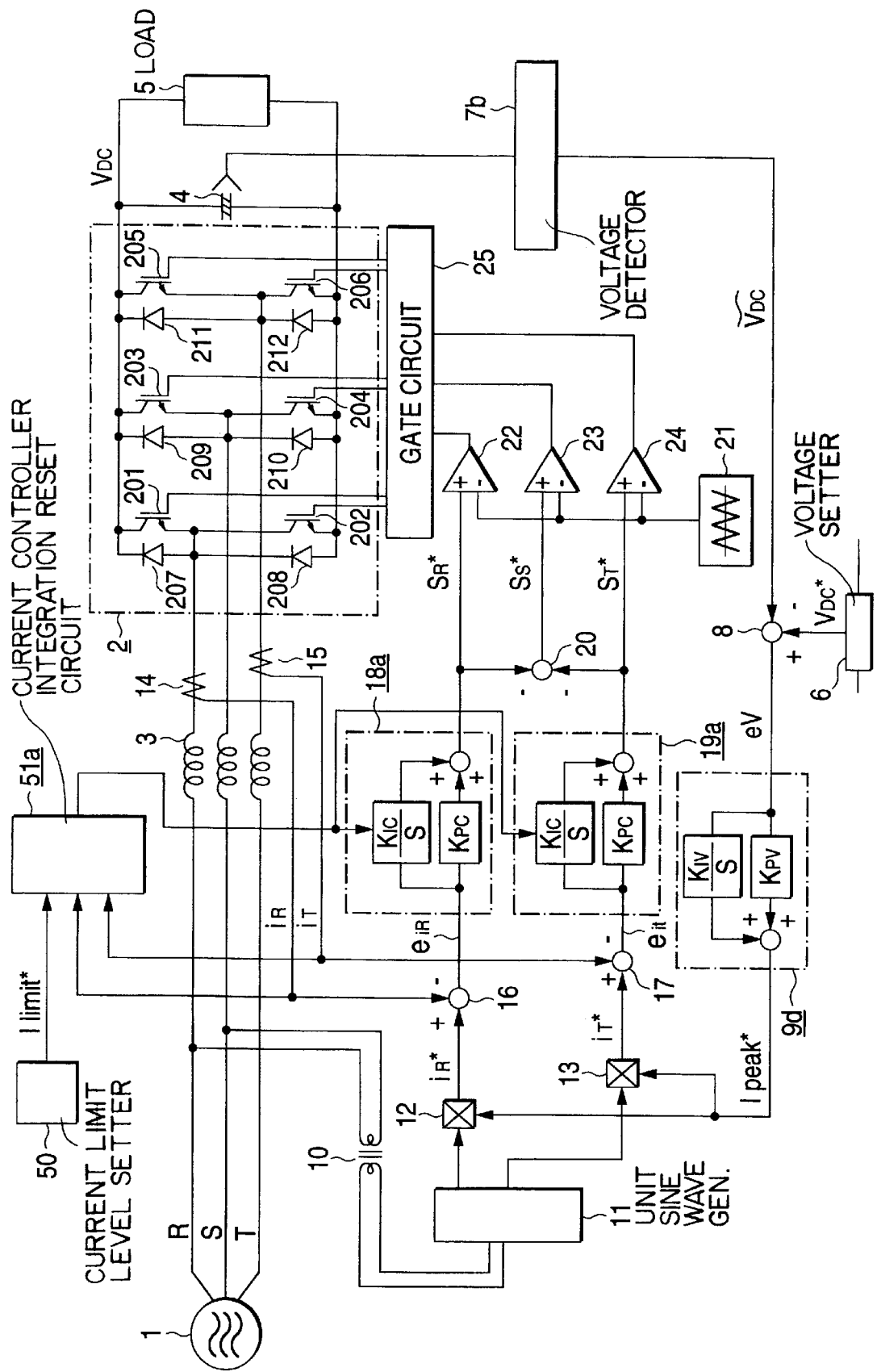
FIG. 13 is a diagram showing an arrangement of an embodiment 5 of a control device for a PWM controlled converter according to the present invention.

FIG. 13 is a diagram showing an arrangement of an additional embodiment of a control device for a PWM controlled converter according to the present invention. In the figure, reference numeral 50 designates a current limit level setter for setting a limit value of an AC input current; and 51a, a current controller integration reset circuit for resetting the integrating elements of the R- and T-phase current controllers 18a and 19a to zero (0). The current controller integration reset circuit 51a receives signals from the current limit level setter 50, and the current controllers 14 and 15, and outputs signals to the R-and T-phase current controllers 18a and 19a. In the remaining arrangement of the embodiment 5, like or equivalent portions are designated by like reference symbols in the embodiment 1 shown in FIG. 1.

An operation of the embodiment shown in FIG. 13 will be described. A DC voltage detecting value V DC^ detected through the voltage detecting circuit 7b and a set value V DC set by the voltage setter 6 are input to the subtractor 8 where a deviation eV therebetween is calculated; eV=V DC*–V DC^. The deviation is input to the voltage controller 9d. The controller PI controls the deviation so that it approaches zero (0), and produces a peak value instruction signal I PEAK* of the AC input current. The peak value instruction signal I PEAK* is input to the multipliers 12 and 13 which in turn multiply the peak value instruction signal I PEAK* by the R- and T-phase unit sine wave signals derived from the unit sine wave generator 11. The R- and T-phase unit sine wave signals are unit sine wave signals, i.e., reference AC signals, synchronized with the R- and T-phase voltages of the 3-phase AC power source 1, and are generated by a current reference signal generator constituting the unit sine wave generator 11, which receives an AC voltage of the 3-phase AC power source 1 detected by the AC voltage detector 10.

An R-phase input current instruction signal iR* as an output signal of the multiplier 12 and an R-phase input current detecting signal iR as an output signal of the current detector 14 are input to the subtractor 16. In turn, the subtractor calculates a deviation eiR by the formula eiR= iR*–iR, and outputs the result of the calculation. Similarly, a T-phase input current instruction signal iT* as an output signal of the multiplier 13 and a R-phase input current detecting signal iT as an output signal of the current detector 15 are input to the subtractor 17. The subtractor calculates a deviation eiT by the formula eiT=iT*–iT. The deviations eiR and eiT are input to the R- and T-phase current controllers 18a and 19a, respectively. The integrators, or the integrating elements as the constituent elements of the R- and T-phase current controllers 18a and 19a, are controlled by the current controller integration reset circuit 51a.

Figure 14:
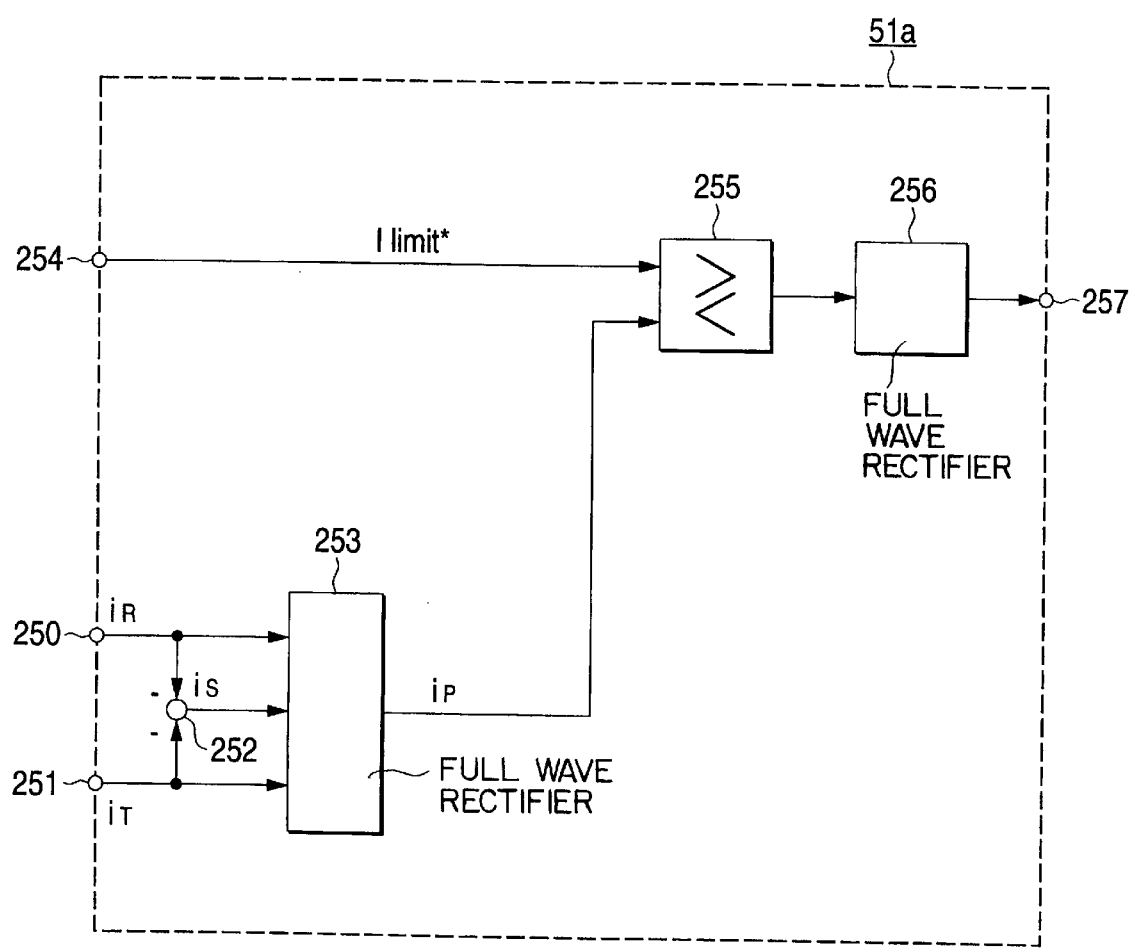
FIG. 14 is a diagram showing a detailed arrangement of a current controller integration reset circuit in the embodiment 5 shown in FIG. 13.

FIG. 14 is a diagram showing a detailed arrangement of the current controller integration reset circuit 51a. In the figure, reference numerals 250 and 251 designate input terminals for receiving R- and T-phase input current detecting signals iR and iT from the current detectors 14 and 15; numeral 252, a subtractor for subtracting from zero (0) the R- and T-phase input current detecting signals iR and iT coming in through the input terminals 250 and 251; 253, a full-wave rectifier for full-wave rectifying the R-, S- and T-phase input current detecting signals iR, iS and iT and outputting the rectified ones; and 254, a set value I limit* as a limit value of the AC input power source limit level that is set and output by the current limit level setter 50. Further, numeral 255 indicates a comparator for comparing an input current full-wave rectified signal as an output signal of the full-wave rectifier 253, viz., a maximum signal i P of the absolute values of the R-, S- and T-phase input current detecting signals iR, iS and iT, with the set value I limit* of a current limit level coming through the input terminal 254; numeral 256, a reset signal generator for generating a signal which resets to zero the integrating elements of the R- and T-phase current controllers 18a and 19a when the input current full-wave rectified signal i P becomes larger than the current limit level set value I limit*; and 257, an output terminal for outputting a reset signal derived from the reset signal generator 256.

Figure 15:
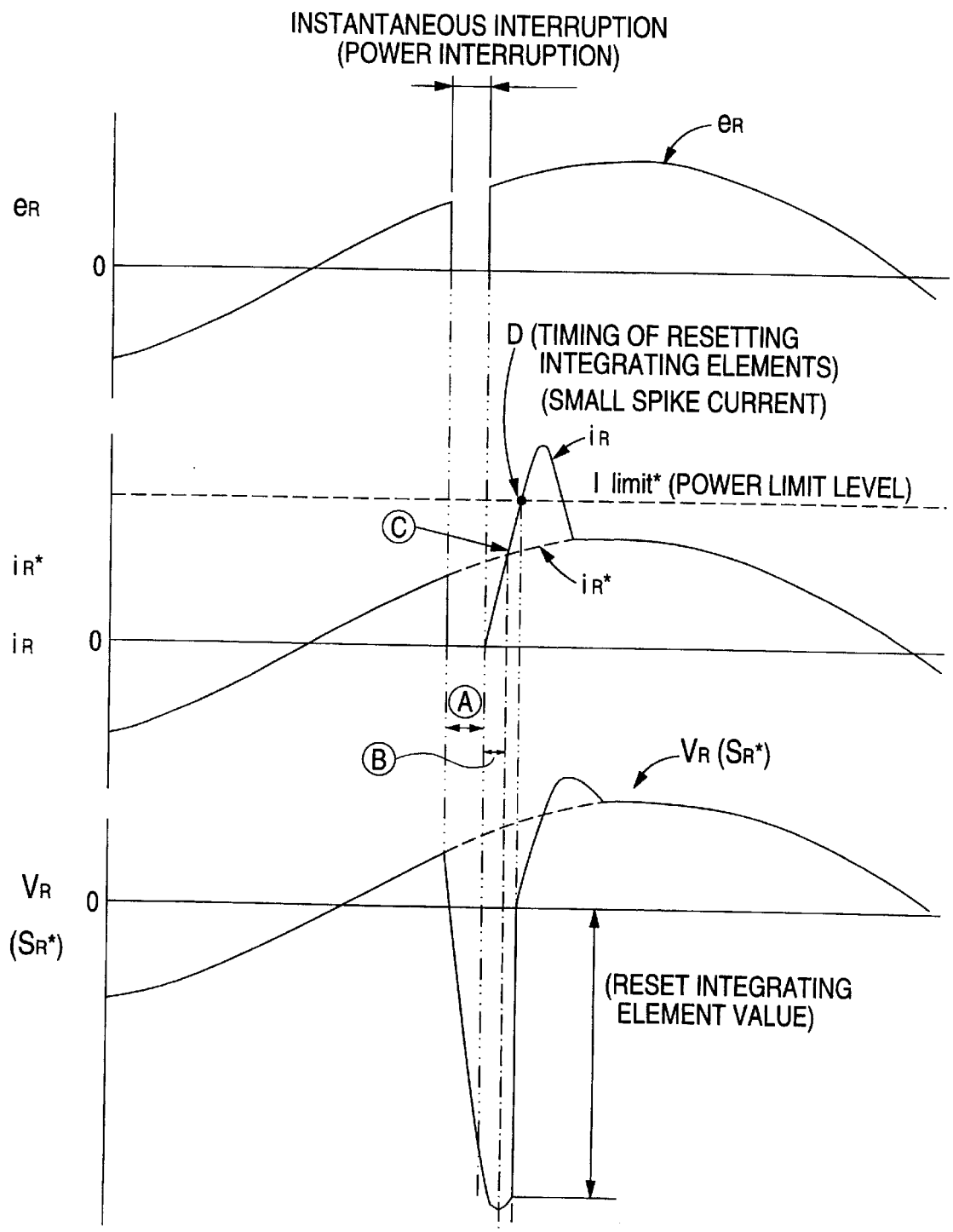
FIG. 15 is a diagram useful in explaining an operation of the embodiment 5 shown in FIG. 13.

When the R-, S- or T-phase input current, or the AC input current, is larger than the set value I limit* of the current limit level setter 50, the current controller integration reset circuit 51a resets the integrating elements of the R- and T-phase current controllers 18a and 19a to zero. As shown in FIG. 15, the R- and T-phase control signals SR* and ST* are caused to return quickly to a level which makes the AC input currents to flow as instructed, to suppress the occurrence of a spike current of the input current detecting signal. In FIG. 15, in a duration (A) where the power source is interrupted by an instantaneous power interruption and another duration (B) where the R-phase input current detecting signal iR is below the R-phase input current instruction signal iR , the R-phase control signal SR is progressively accumulated in the increasing direction of the R-phase input current detecting signal iR. Its accumulation stops at a time (C) where the R-phase input current detecting signal iR is equal to the R-phase input current instruction signal iR*. Thereafter, at a time (D) where it exceeds the set value I limit* of the current limit level setter 50, the integrating elements are reset to zero (0), and the return of the control device to a normal operating state is quickened.

In FIG. 15, graphical description is given about the R-phase AC input current. The description is correspondingly applied to the control of the T-phase AC input current. The S-phase control signal SS* is formed in a manner that the subtractor 20 subtracts the R- and T-phase control signals SR* and ST* from 0. Therefore, the control of the S-phase AC input current can be handled in a similar manner.

The control signals SR*, SS* and ST* as the output signals of the R-phase current controller 18a, the subtractor 20 and the T-phase current controller 19a are applied to the comparators 22, 23 and 24. By the comparators, those control signals are compared in amplitude with a carrier wave signal of a triangle wave that is output from the carrier wave oscillator 21, and the results of the comparisons are output in the form of pulse width modulation signals. These PWM signals are input to the gate circuit 25 which in turn outputs control signals to the PWM controlled converter 2. In the converter, under control of the control signals, the switching elements 201 to 206 are controlled so that the DC voltage detecting value V DC^ of the PWM controlled converter 2 is equal to the set value V DC*, and further the input currents iR, iS and iT of R-, S- and T-phase are equal to their instruction signals iR*, iS* and iT*.

In the embodiment 1, the R- and T-phase currents are detected for the converter control. Any other combinations of those three phase currents may be used for the same purposes. It is evident that the present invention is applicable to the AC input current control of a single phase.

In the above-mentioned embodiment, the integrating elements are reset to zero when the AC input current exceeds its limit value. Alternatively, when the AC input current exceeds its limit value, the absolute value of the integrating element may be abruptly reduced.

As described above, the control device for a PWM controlled converter according to the embodiment is constructed such that when an AC input current exceeds a limit value, the absolute values of the integrating elements of the current control means are abruptly reduced or reset to 0. With such a construction, when an instantaneous power interruption, for example, takes place and the voltage of an AC power source drops or is interrupted for a short time, no overcurrent problem arises when the power source returns to its normal state. Accordingly, the AC input current or currents can be satisfactorily controlled.

Embodiment 6

In the embodiment shown in FIG. 13, a set value I limit* of the current limit level is preset by the current limit level setter 50. In an embodiment of the invention shown in FIG. 16, a current limit offset setter 52 is used. An output signal I ost* of the current limit offset setter and an input current peak value instruction signal I PEAK* as the output signal are applied to an adder 53. The adder adds together those received signals and outputs the result in the form of a set value I limit* of the current limit level. The set value I limit* is compared with the input current full wave rectified signal by the current controller integration reset circuit 51a. In the control device thus arranged, the current limit level I limit* varies following the input current peak value instruction signal I PEAK*. Therefore, when the input current peak value instruction signal I PEAK* is small, the timing to reset to 0 the integrating elements of the R- and T-phase current controllers 18a and 19a by an output signal of the current controller integration reset circuit 51a may be set at an early point. Therefore, the R- and T-phase control signals SR* and ST* are more quickly returned to a level which makes the AC input currents flow as instructed, to more certainly suppress the occurrence of a spike current of the input current detecting signal.

Figure 17:
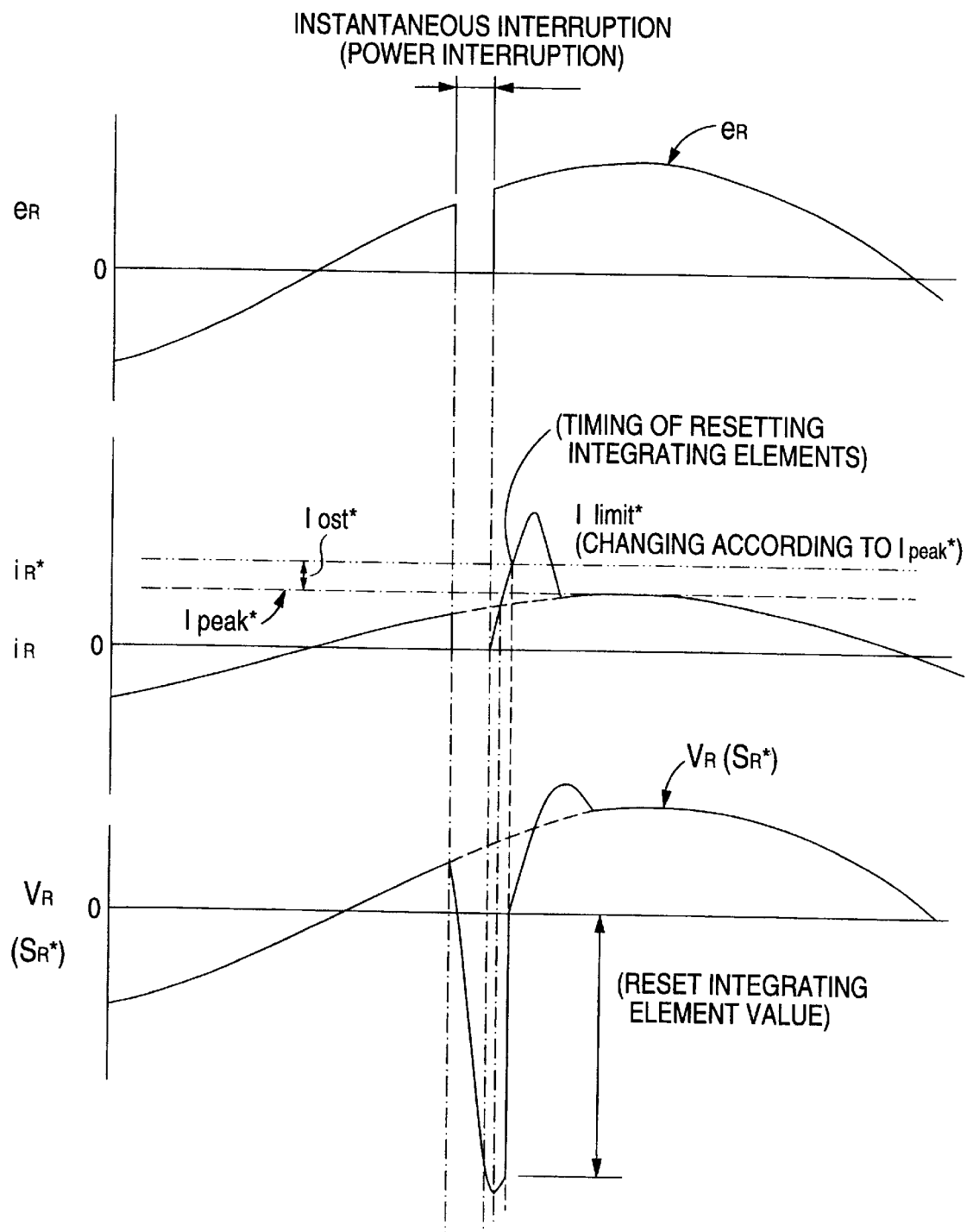
FIG. 17 is a diagram useful in explaining an operation of the embodiment 6 shown in FIG. 16.

In FIG. 17, graphical description is given about the R-phase AC input current. The description is correspondingly applied to the control of the T-phase AC input current. The S-phase control signal SS* is formed in a manner that the subtractor 20 subtracts the R- and T-phase control signals SR* and ST* are subtracted from 0. Therefore, the control of the S-phase AC input current can be handled in a similar manner.

In the above-mentioned embodiment, the integrating elements are reset to zero when the AC input current exceeds its limit value. Alternatively, when the AC input current exceeds its limit value, the absolute value of the integrating element may be abruptly reduced.

Embodiment 7

Figure 18:
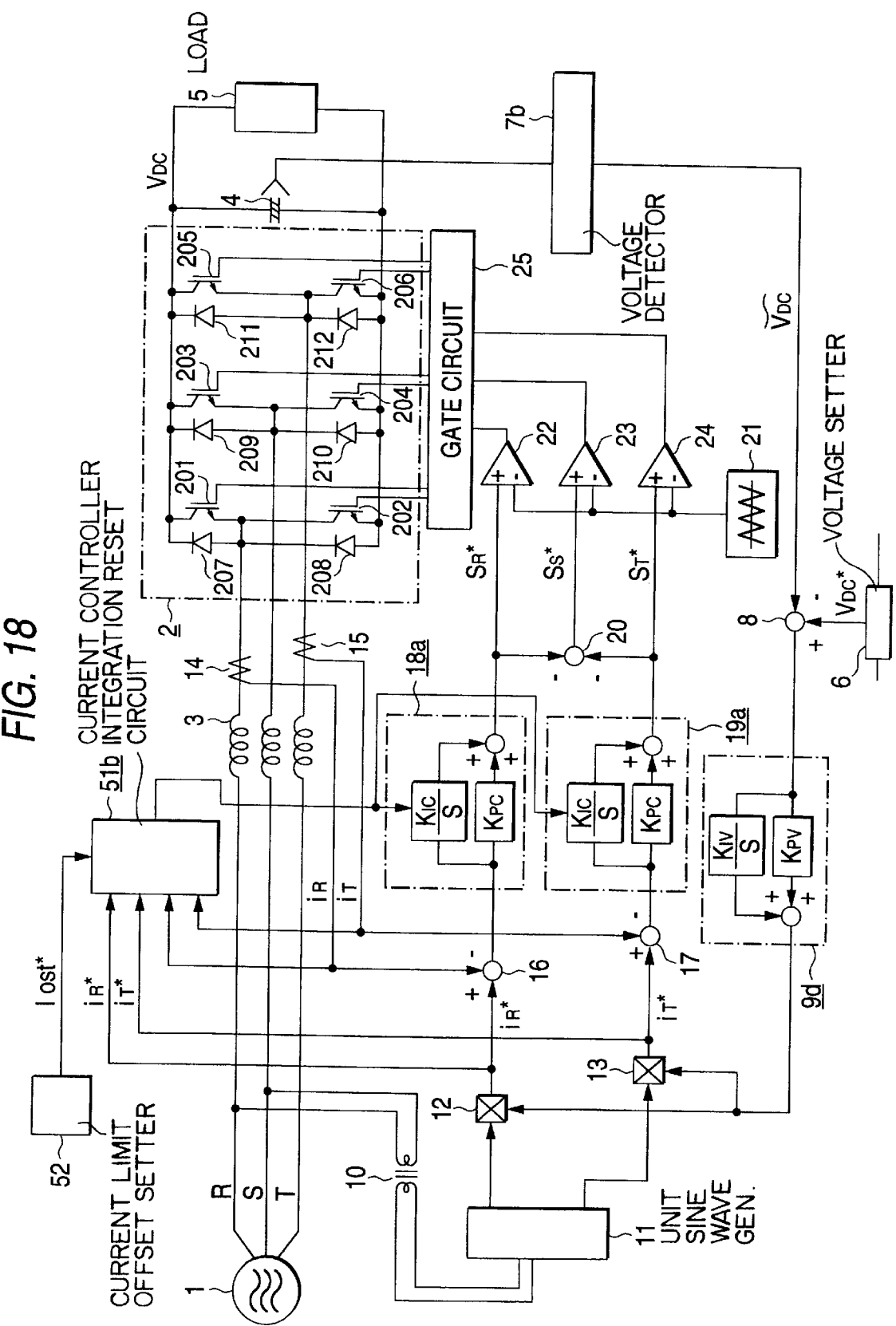
FIG. 18 is a diagram showing an arrangement of an embodiment 7 of a control device for a PWM controlled converter according to the-present invention.

A further embodiment of the present invention is shown in FIG. 18. In the embodiment, a current limit offset setter 52 and a current controller integration reset circuit 51b are combined as shown. The current controller integration reset circuit 51b adds together an output signal I ost* of the current limit offset setter 52 and a full-wave rectified signal i P* resulting from the full wave rectifying operation of the R- and T-phase input current instruction signals iR and iT, and outputs a current limit level set value I limit*. The set value is compared with the input current full-wave rectified signal. The remaining circuit arrangement of the control device is the same as that of the embodiment of FIG. 13.

Figure 19:
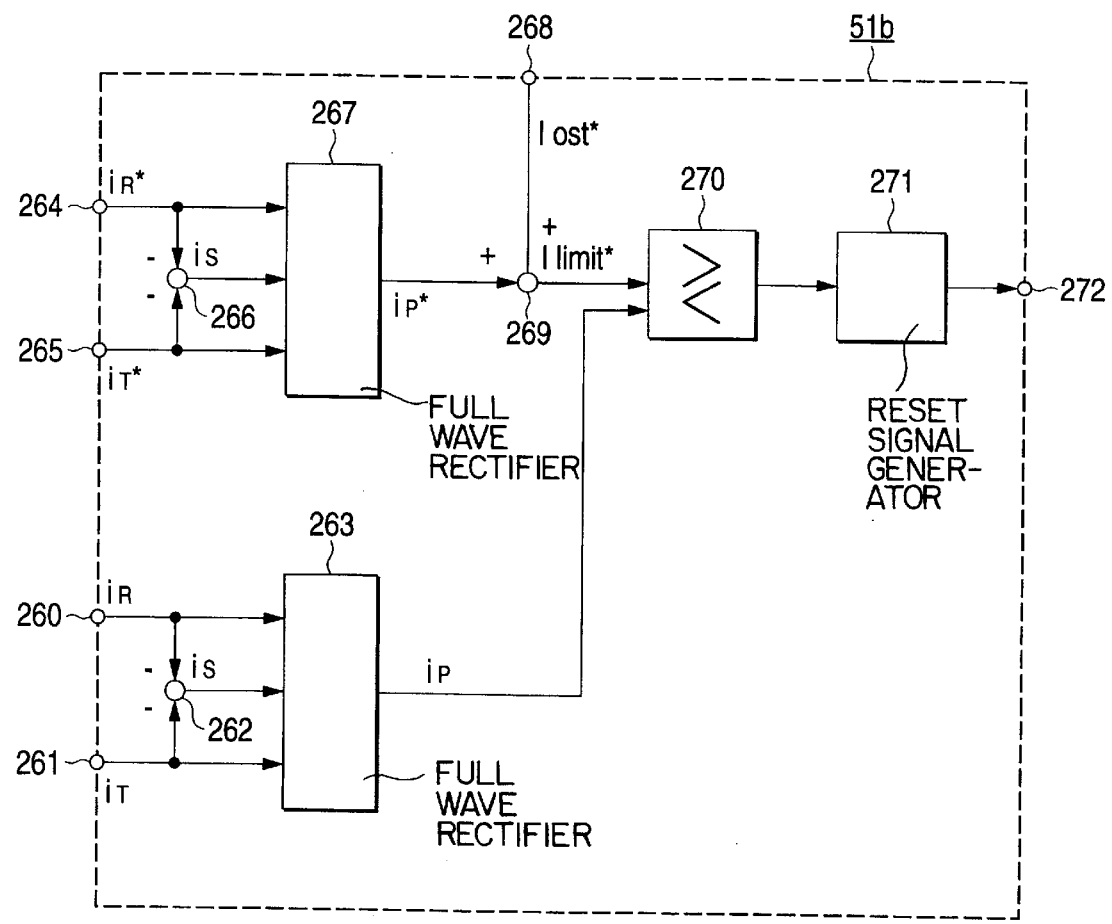
FIG. 19 is a diagram showing a detailed arrangement of a current controller integration reset circuit in the embodiment 7 shown in FIG. 18.

FIG. 19 is a diagram showing a detailed arrangement of the current controller integration reset circuit 51b in the embodiment 7 shown in FIG. 18. In the figure, reference numerals 260 and 261 designate input terminals for receiving R- and T-phase input current detecting signals iR and iT derived from the current detectors 14 and 15; 262, a subtractor for subtracting the R- and T-phase input current detecting signals iR and iT coming in through the input terminals 260 and 261 from zero and outputting the result of the subtraction in the form of an S-phase input current detecting signal iS; and 263, a full-wave rectifier for full-wave rectifying the R-, S- and T-phase input current detecting signals iR*, iS* and iT* and outputting the result. Numerals 264 and 265 indicate input terminals for receiving the R- and T-phase input current instruction signals iR* and iT* output from the multipliers 12 and 13; 266, a subtractor for subtracting the R- and T-phase input current instruction signals iR and iT from zero and outputs the result in the form of an S-phase input current instruction signal iS* and 267, a full wave rectifier for rectifying the R-, S- and T-phase input current instruction signals iR*, iS* and iT* and outputting the result. Numeral 268, an input terminal for receiving a current limit offset set value I ost* that is set by and output from the current limit offset setter 52; and 269, an adder for adding together the full-wave rectified signal i P* of the input current command signal as the output signal of the full wave rectifier 267 and the current limit offset set value I ost* coming in through the input terminal 268, and outputting a current limit level set value I limit*. Numeral 270 represents a comparator for comparing an input current full-wave rectified signal as an output signal of the full-wave rectifier 263, viz., a maximum signal i P of the absolute values of the R-, S- and T-phase input current detecting signals iR, iS and iT, with the current limit level set value I limit* as an output signal of the adder 269; 271, a reset signal generator for outputting a signal for resetting to zero the integrating elements of the R- and T-phase current controllers 18a and 19a when the input current full-wave rectified signal i P becomes larger than the current limit level set value I limit*; and 272, an output terminal for outputting a reset signal generated by the reset signal generator 271. In the thus constructed current controller integration reset circuit, the current limit level set value I limit* is optimally set in accordance with the input current instruction signal.

When the input current command signal is small, the current limit level set value I limit is also small. The timing to reset to 0 the integrating elements of the R- and T-phase current controllers 18a and 19a may be set at an early point, and it is possible to suppress the occurrence of a spike current of the input current detecting signal.

As described above, in the control device for a PWM controlled converter according to the embodiment, when an AC input current exceeds a limit value, the absolute value of the integrating element of the current control means is abruptly reduced or reset to 0. Further, the limit value is set in connection with a current reference signal or a current command signal output from the voltage control means. With such a construction, when an instantaneous power interruption, for example, takes place and the voltage of an AC power source drops or is interrupted for a short time, no overcurrent problem arises when the power source returns to its normal state. Accordingly, the AC input current or currents can be satisfactorily controlled. Particularly when the AC input current instruction signal is small, the suppression of the occurrence of a spike current of the input current detecting signal is further enhanced.

Embodiment 8

Figure 16:
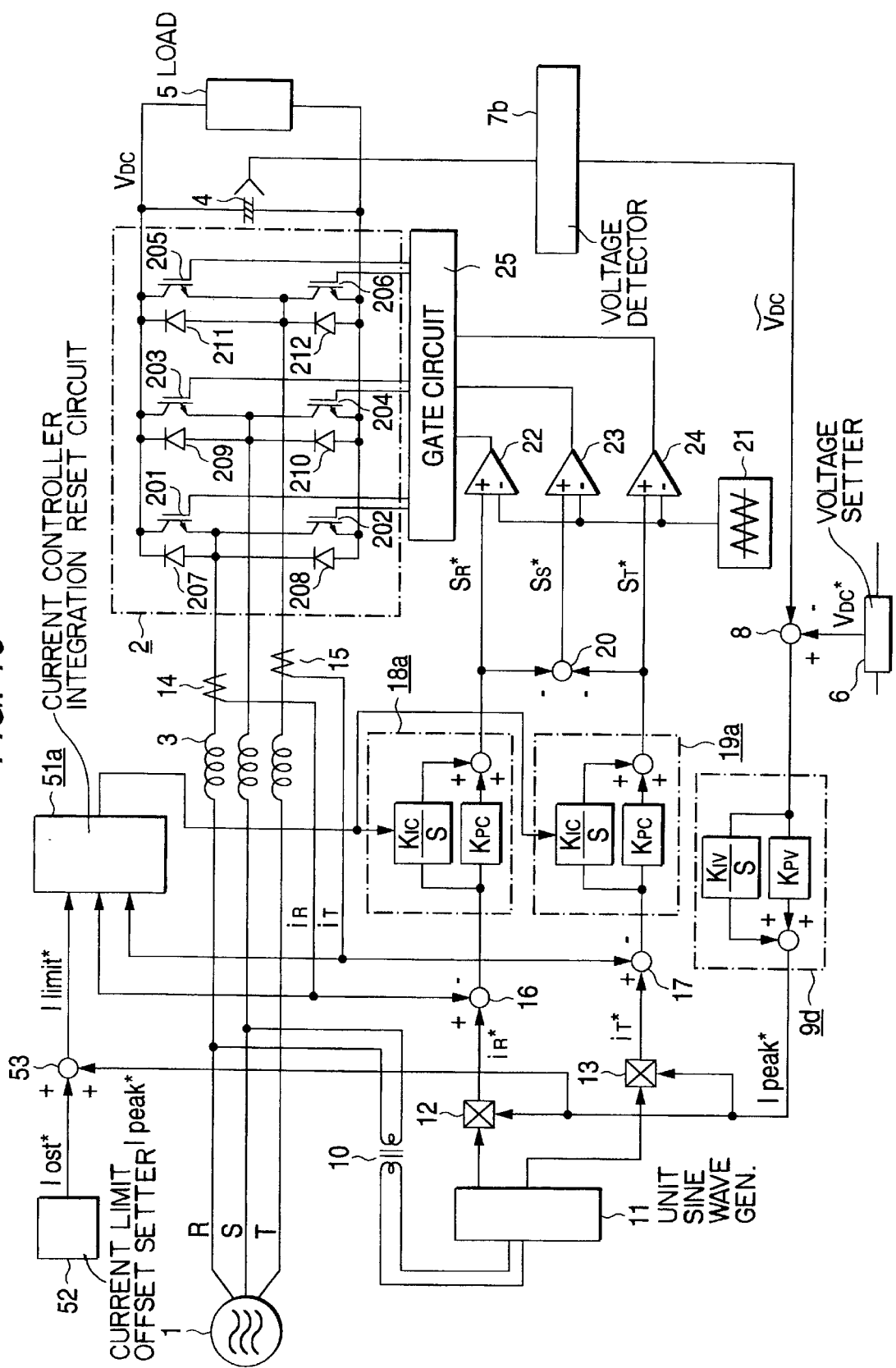
FIG. 16 is a diagram showing an arrangement of an embodiment 6 of a control device for a PWM controlled converter according to the present invention.
Figure 20:
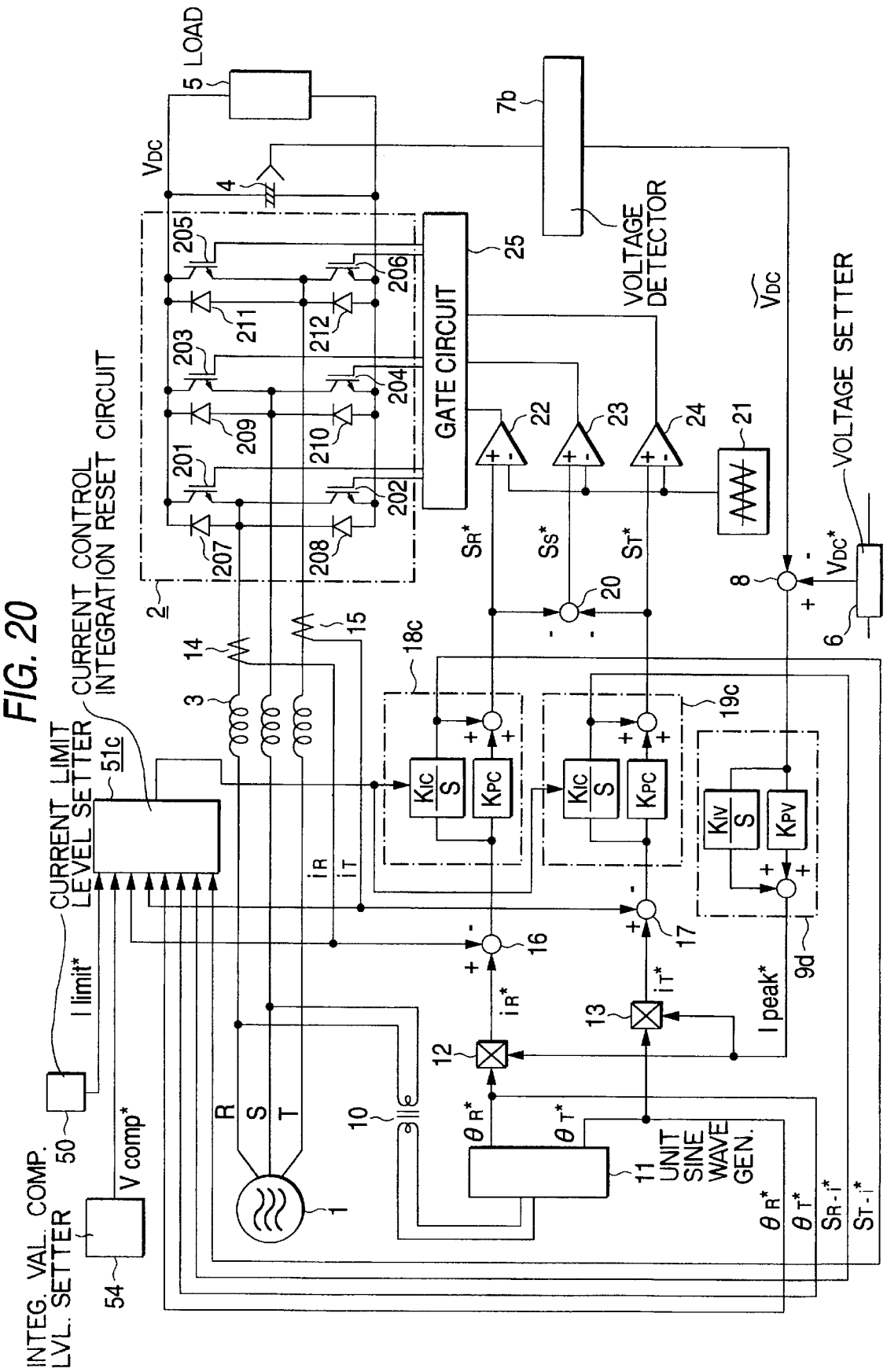
FIG. 20 is a diagram showing an arrangement of an embodiment 8 of a control device for a PWM controlled converter according to the present invention.

In the embodiments shown in FIGS. 13, 16 and 18, when an AC input current exceeds a limit value, the absolute value of the integrating element of the current control means is abruptly reduced or reset to 0. Instead of this, a combination of a current limit level setter 50, an integration value comparing level setter 54, and a current controller integration reset circuit 51c may be used, as shown in FIG. 20. In the control device using the combination, the absolute values of the integrating elements are abruptly reduced or reset only when an AC input current exceeds a limit value, and when the integrating elements of the current controllers are different in polarity from the AC reference signals whose phases correspond to those of the integrating elements and the electrical quantities of the input currents accumulated in the integrating elements are in excess of a predetermined value.

In FIG. 20, like or equivalent portions are designated by like reference symbols in FIGS. 13, 16, and 18.

Figure 21:
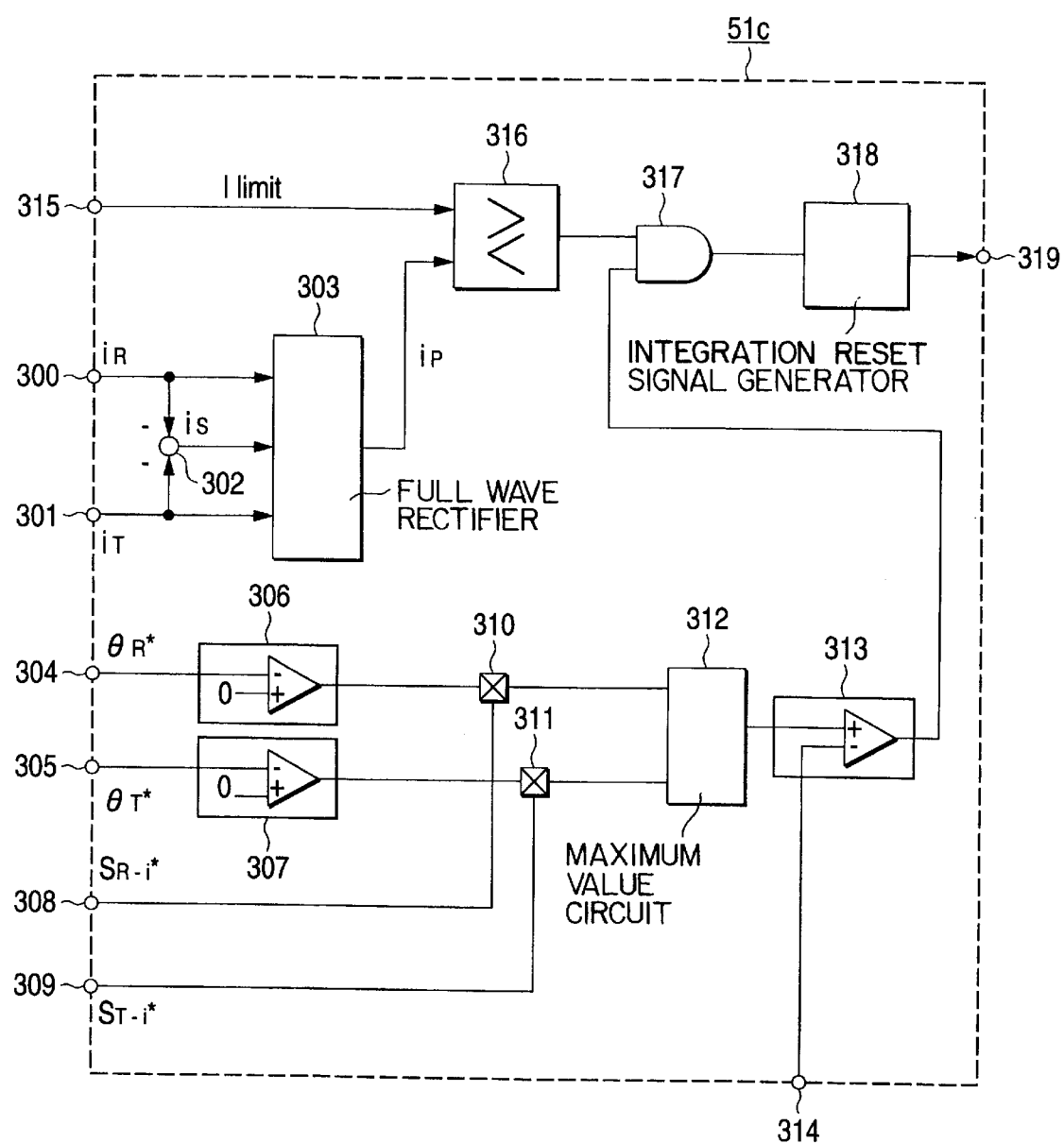
FIG. 21 is a diagram showing a detailed arrangement of a current controller integration reset circuit in the embodiment 8 shown in FIG. 20.

FIG. 21 is a diagram showing a detailed arrangement of the current controller integration reset circuit 51c. In the figure, reference numerals 300 and 301 designate input terminals for receiving R- and T-phase input current detecting signals iR and iT from the current detectors 14 and 15; 302, a subtractor for subtracting the R- and T-phase input current detecting signals iR and iT coming in through the input terminals 300 and 301 from zero and producing the result in the form of an S-phase input current detecting signal iS; and 303, a full-wave rectifier for rectifying those detecting signals iR, iS and iT and outputting the result of the rectification.

Numerals 304 and 305 represent input terminals R- and T-phase unit sine wave signals θR* and θT* synchronized with the R- and T-phase voltages output from the unit sine wave generator 11; 306 and 307, comparators for comparing the R-phase unit sine wave signal θR* with zero (0) and T-phase unit sine wave signal θT* with 0, and each producing "−1" when the input signal is positive and "+1" when it is negative; 308 and 309, input terminals for receiving the integration value signals SR-i* and ST-i* as the values of the R- and T-phase integrating elements output from the R- and T-phase current controllers 18c and 19c; 310 and 311, multipliers for multiplying the output signals of the comparators 306 and 307 by the integration value signals SR- i* and ST-i* as the values of the R- and T-phase integrating elements, respectively; 312, a maximum value circuit for receiving the signals output from the comparators 306 and 307 and outputting one signal that is the larger of the two signals; 314, an input terminal for receiving an integration value comparing level signal Vcomp* output from the integration value comparing level setter 54; and 313, a comparator for comparing the integration value comparing level signal coming in through the input terminal 314 with the output signal of the maximum value circuit 312, and outputting "+1" when the latter is larger than the former.

Reference numeral 315 indicates an input terminal for receiving a current limit level set value I limit* output from the current limit level setter 50; 316, a comparator for comparing an input current full-wave rectified signal i P as the output signal of the integrator 30 with a current limit level set value I limit* coming in through the input terminal 315 and producing "+1" when i P>I limit*; 317, an AND circuit for producing "1" when the output signals of the comparators 316 and 313 are both "1"; and 318, an integration reset signal generator for producing through an output terminal 319 a signal for resetting the integrating elements of the R- and T-phase current controllers 18c and 19c to zero (0) when an output signal received from the AND circuit 317 is "1".

The current controller integration reset circuit 51c thus constructed as shown in FIG. 21 discriminates a spike current caused in a state that the power source voltage is settled down into a steady state, for example, a current overshoot caused when an R-phase input current instruction signal iR* is abruptly increased. Using the current controller integration reset circuit thus constructed, the control device is operated only when the spike current can be suppressed.

Figure 22:
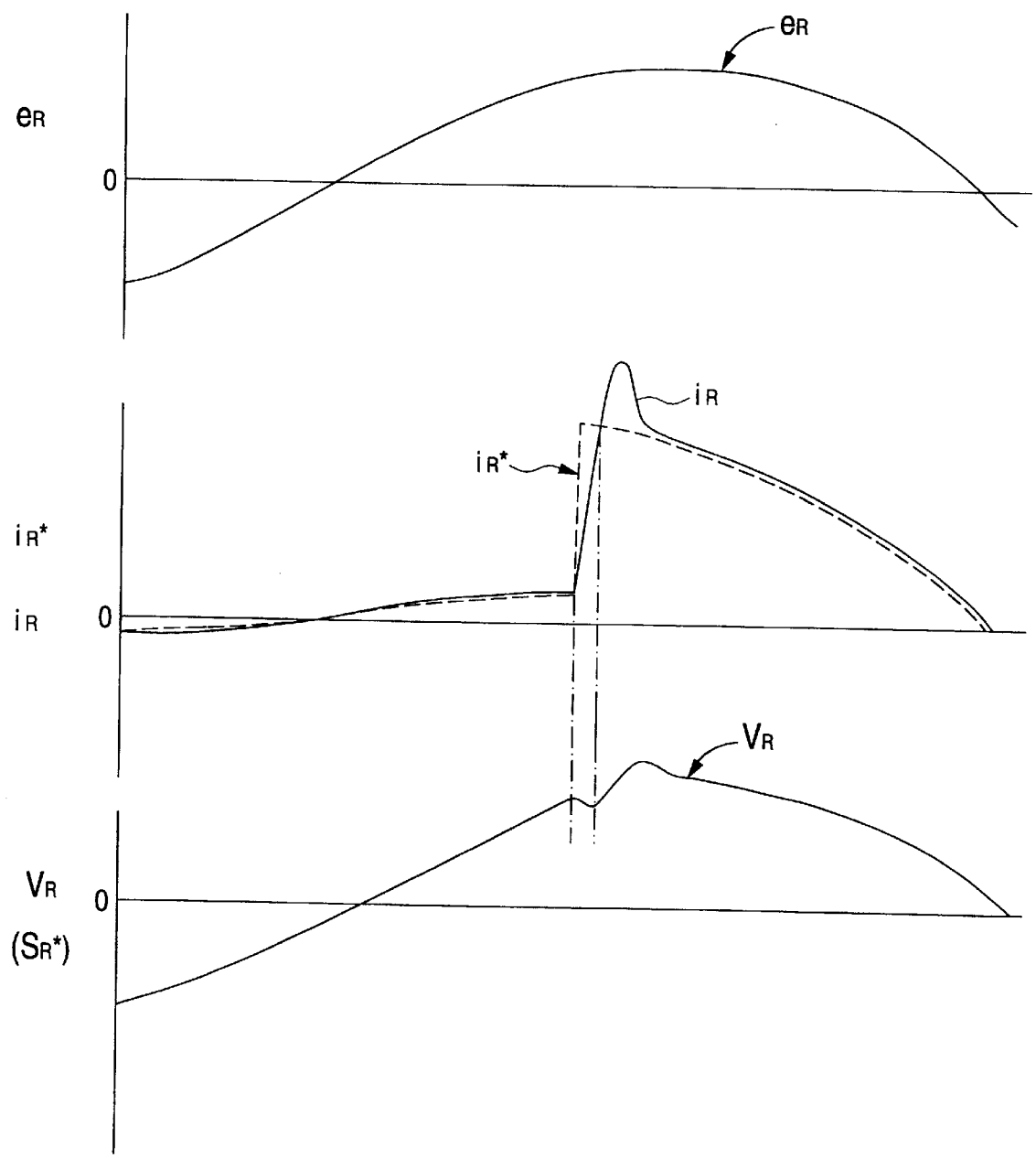
FIG. 22 is a diagram useful in explaining an operation of the embodiment 8 shown in FIG. 20.

When the R-phase input current instruction signal iR* is stepped or greatly changed as shown in FIG. 22, an actual input current sometimes overshoots although it depends on the selection of a control gain of the current control system. If it overshoots, the integrating term of the R- and T-phase current controllers 18c and 19c have stored signals whose phases are substantially equal to that of the power source voltage. In this state, if the absolute value of the integrating element is absolutely reduced or reset, the spike current is further increased. To cope with this, the current controller integration reset circuit 51c is designed so as to operate in the following manner. The comparators 306 and 307 comparatively process the R- and T-phase unit sine wave signals θR* and θT* that are synchronized in phase with the power source voltage and produce these signals in the form of signals of the inverted polarities. The multipliers 310 and 311, respectively, multiply those signals and the R- and T-phase integration value signals SR-i* and ST-i* as other input signals, to thereby produce signals whose polarities are positive when the unit sine wave signals of the respective phases are opposite in polarity to the integration value signal. Further, the maximum value circuit 312 receives those signals of the inverted polarity and works out a maximum value of them, and the comparator 313 compares the maximum value signal with the integration value comparing level signal Vcomp* output from the integration value comparing level setter 54. Only when the maximum value from the maximum value circuit is larger than the integration value comparing level signal, the output signal of the comparator 316 is valid.

As described above, the control device for a PWM controlled converter includes the current control means operating such that the absolute values of the integrating elements are abruptly reduced or reset only when an AC input current exceeds a limit value, and when the integrating elements of the current controllers are different in polarity from the AC reference signals whose phases correspond to those of the integrating elements. With such a unique construction, when an instantaneous power interruption, for example, takes place and the voltage of an AC power source drops or is interrupted for a short time, no overcurrent problem arises when the power source returns to its normal state. Accordingly, the AC input current or currents can be satisfactorily controlled. Particularly when the AC input current instruction signal is stepwise or greatly changed and the input current overshoots, the operation of abruptly reducing or resetting the absolute values of the integrating elements are inhibited. Therefore, the occurrence of the current spike can be more certainly suppressed independently of the set values of the control gain of the current control system.

In the embodiments 5 to 8 described above, the integrating elements of the current control means are controlled for the AC input current. In the embodiments of the invention to be described hereafter, a control device for a PWM controlled converter will be discussed which can satisfactorily control the AC input current also in such a state that the overcurrent protection trip will more easily happen, for example, when the voltage of the AC power source drops or the power supply is interrupted for a short time in a state that large input current instruction signals are produced, for example, large power is supplied to the load unit 5.

Embodiment 9

Figure 23:
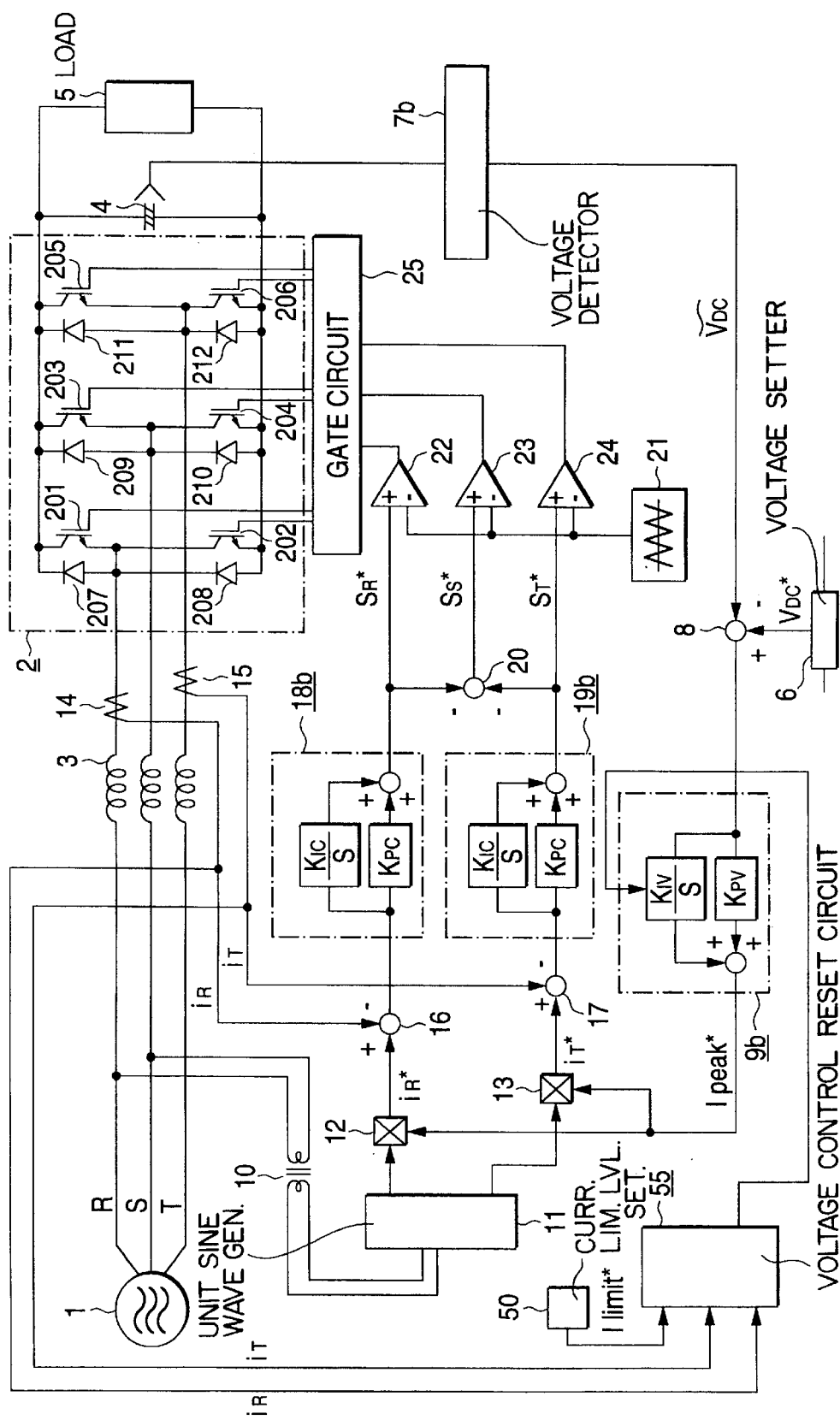
FIG. 23 is a diagram showing an arrangement of an embodiment 9 of a control device for a PWM controlled converter according to the present invention.

FIG. 23 is a diagram showing an arrangement of an embodiment 9 of a control device for a PWM controlled converter according to the present invention. In the figure, like or equivalent portions are designated by like reference numerals in the above-mentioned embodiments. A voltage controller reset circuit 55 as one of the constituent elements of the present embodiment has a construction similar to that of the current controller integration reset circuit 51a shown in FIG. 14. When the input current of R-, S- or T-phase is larger than the current limit level set value I limit*, the voltage controller reset circuit 55 operates to reset the integrating element of a voltage controller 9b to zero. Where it is reset, the R- and T-phase input current instruction signals iR* and iT* are also zero. As a result, the restoring of the integrating elements of the current controllers to their original states is quickened, so that an occurrence of the current spike is suppressed.

Figure 24:
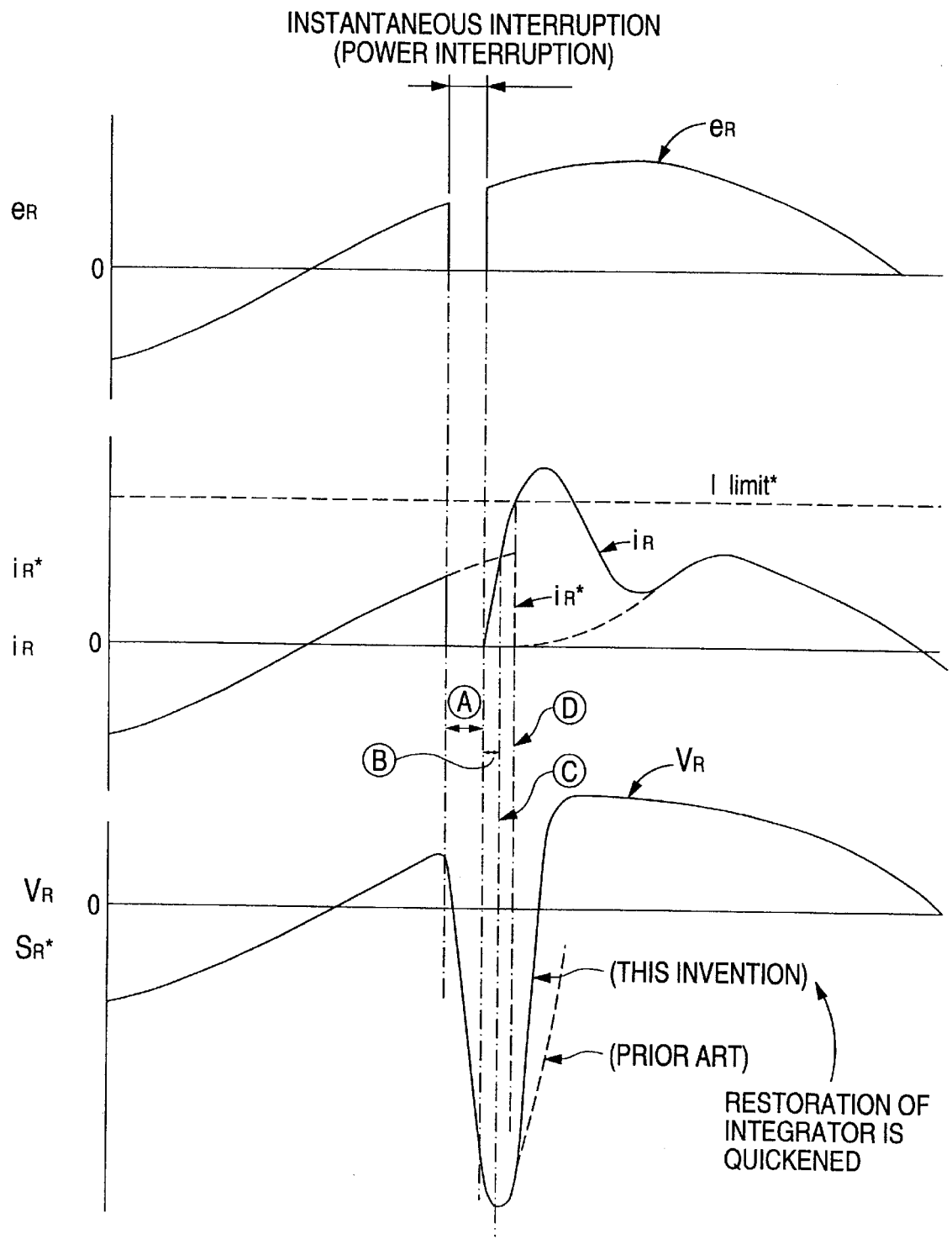
FIG. 24 is a diagram useful in explaining an operation of the embodiment 9 shown in FIG. 23.

FIG. 24 is a diagram useful in explaining an operation of the embodiment shown in FIG. 23. In the figure, only the waveforms of the voltages and currents of R-phase are typically illustrated for ease of explanation. In the figure, in a duration (A) where the power source is interrupted and another duration (B) where the R-phase input current detecting signal iR is below the R-phase input current instruction signal iR*, the R-phase control signal SR* is progressively accumulated in the increasing direction of the R-phase input current detecting signal iR. Its accumulation stops at a point in time (C) where the R-phase input current detecting signal iR is equal to the R-phase input current instruction signal iR*. Thereafter, at a point in time (D) where it exceeds the set value I limit* of the current limit level, the integrating element of the voltage controller 9b is reset to zero (0), and the R-phase input-current instruction signal iR also becomes zero. The input signal to the current controller sharply increases, and the returning of the control device to a normal operating state is quickened.

As seen from the foregoing description, the control device for a PWM controlled converter includes the voltage control means operating such that when the AC input current exceeds its limit value, the voltage control means abruptly reduces or resets the integrating element of the voltage controller. With such a unique construction, when an instantaneous power interruption, for example, takes place and the voltage of an AC power source drops or is interrupted for a short time, no overcurrent problem arises when the power source returns to its normal state. Therefore, a satisfactory control of the AC input current or currents is secured. Particularly when the AC input current instruction value is large, viz., the input current peak value instruction signal I PEAK* is large, a more effective suppression of the spike current occurrence is ensured.

Embodiment 10

Figure 25:
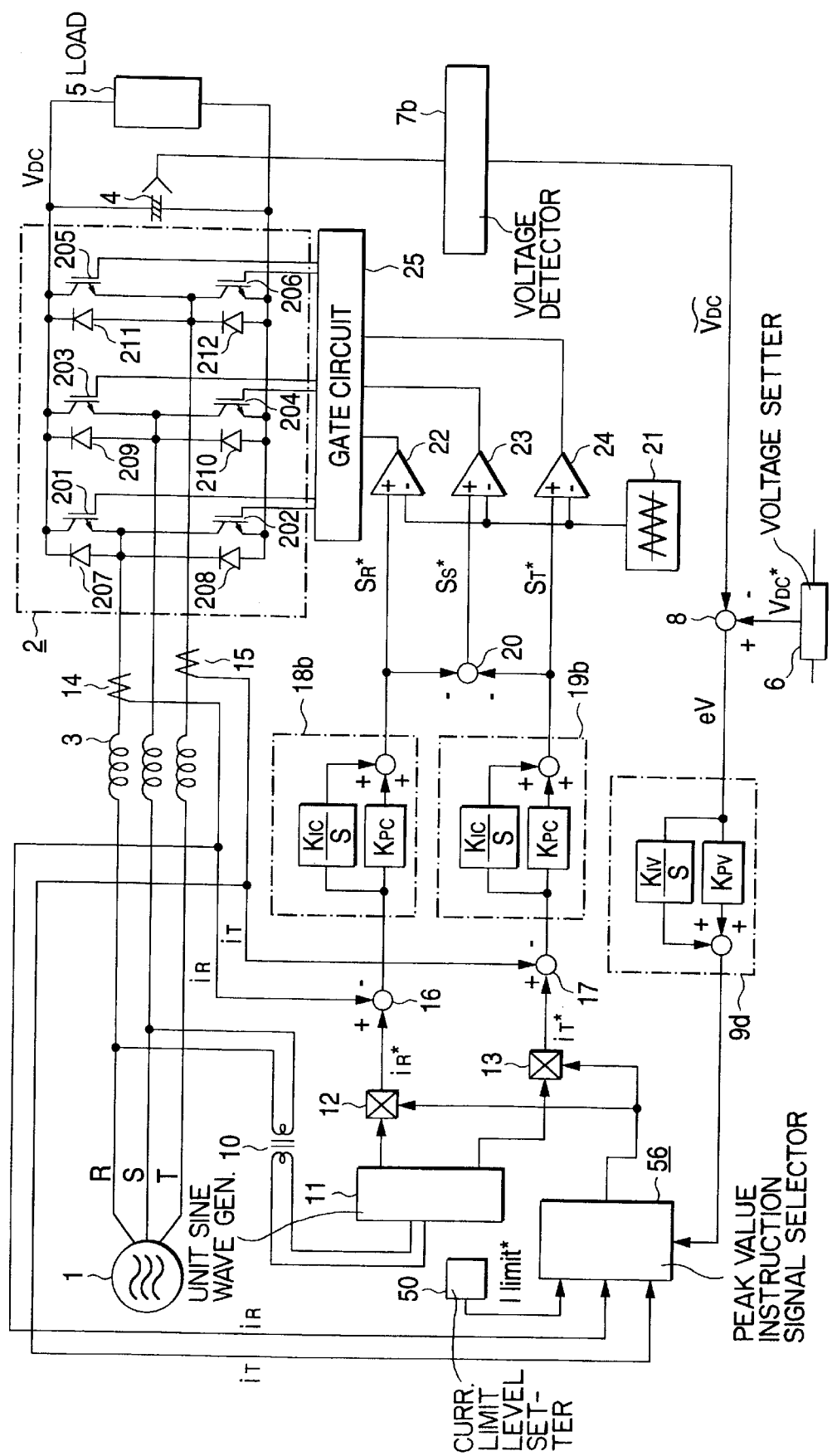
FIG. 25 is a diagram showing an arrangement of an embodiment 10 of a control device for a PWM controlled converter according to the present invention.

In the embodiment 9, when the input current of R-, S- or T-phase is larger than the current limit level set value I limit*, the voltage controller reset circuit 55 operates to reset the integrating element of a voltage controller 9b to zero. As shown in FIG. 25, an input current peak value instruction signal selector 56 may be used.

In FIG. 25, like or equivalent portions are designated by like reference symbols in FIG. 23.

Figure 26:
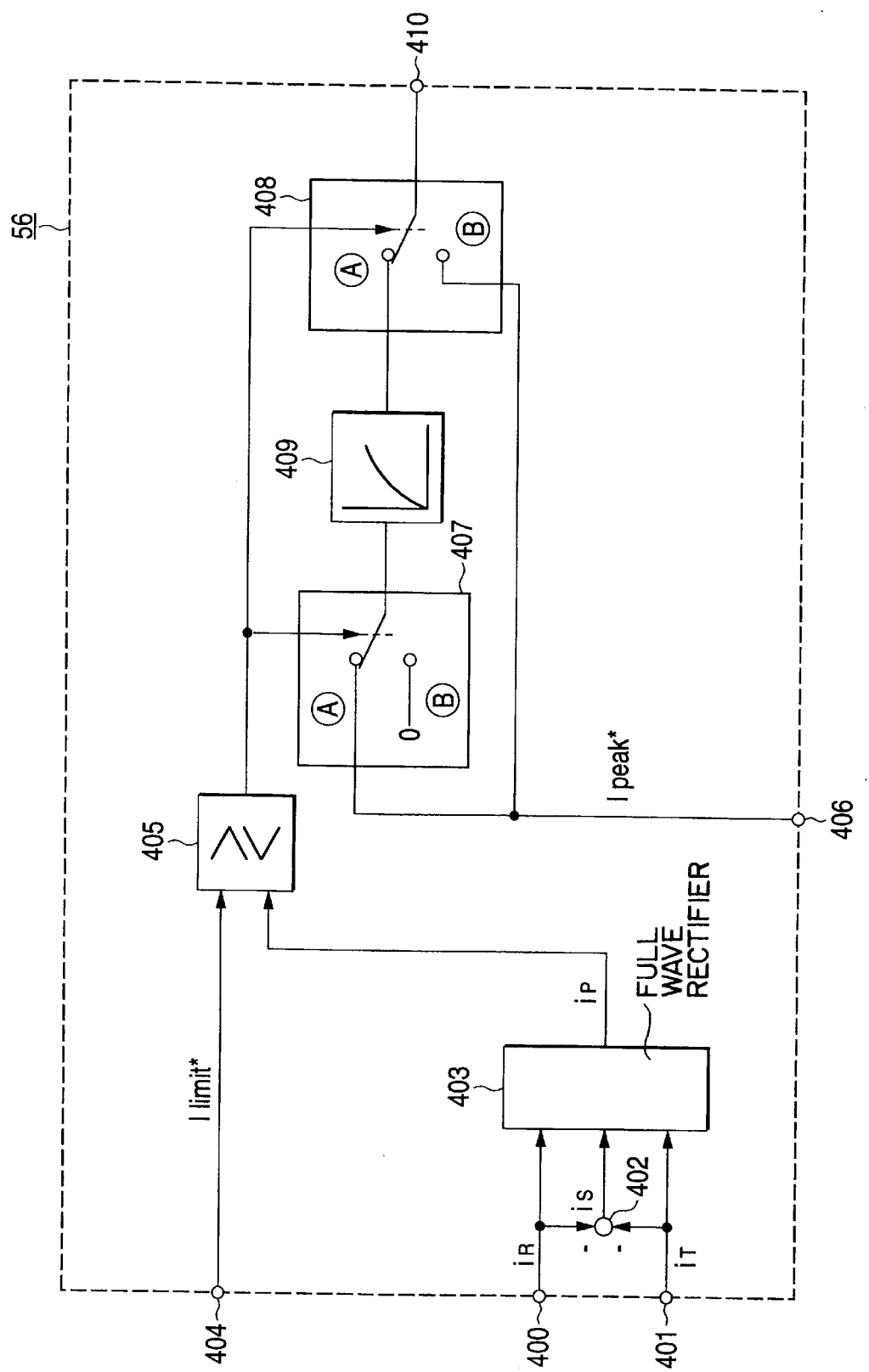
FIG. 26 is a diagram showing the detail of an arrangement of a peak value instruction signal switch device in the embodiment 10 shown in FIG. 24.

FIG. 26 is a diagram showing a detailed arrangement of the input current peak value instruction signal selector 56. In the figure, reference numerals 400 and 401 designate input terminals for receiving R- and T-phase input current detecting signals iR and iT from the current detectors 14 and 15; 402, a subtractor for subtracting from zero the R- and T-phase input current detecting signals iR and iT coming in through the input terminals 400 and 401 and outputting the result in the form of an S-phase input current detecting signal iS; 403, a full-wave rectifier for rectifying the R-, S- and T-phase input current detecting signals and outputting the rectified ones; and 404, an input terminal for receiving a current limit level set value I limit* output from the current limit level setter 50. Numeral 405 designates a comparator for comparing a full-wave rectified signal as an output signal of the full-wave rectifier 403, viz., a maximum signal i P of the absolute values of the R-, S- and T-phase input currents with the set value I limit* of the current limit level coming through the input terminal 254; 406, an input terminal for receiving a peak value instruction signal I PEAK* of the input current as an output signal of the voltage controller 9d; 407 and 408, switches for selecting a signal; 409, a first order lag circuit for outputting an input signal in the form of a time function; and 410, an output terminal for outputting the input current peak value instruction signal I PEAK* coming in through the input terminal 406 or an output signal of the first order lag circuit 409 to the multipliers 12 and 13.

An operation of the input current peak value instruction signal selector 56 will be described hereunder. When the input current full-wave rectified signal i P as an output signal of the full-wave rectifier 403 is smaller than the current limit level set value I limit* coming in through the input terminal 404, the switches 407 and 408 are turned to positions (B). In this state, the input current peak value instruction signal I PEAK* as an output signal of the voltage controller 9d, which comes in through the input terminal 406, is straightforwardly output through the output terminal 410. When the input current full-wave rectified signal i P as an output signal of the full-wave rectifier 403 is larger than the current limit level set value I limit* coming in through the input terminal 404, the switches 407 and 408 are turned to positions (A). In this state, the input current peak value instruction signal I PEAK* as an output signal of the voltage controller 9d, which comes in through the input terminal 406, is input to the first order lag circuit 409. In the first order lag circuit, it is transformed into a signal that increases from zero with time, and eventually reaches the peak value instruction signal I PEAK* of the original input current. This signal is output through the output terminal 410.

As described above, in the embodiment, the control device for a PWM controlled converter includes the voltage control means operating such that when an AC input current exceeds its limit value, the voltage control means varies a current reference signal as defined by a time function of which an initial value is the current reference signal smaller than the current reference signal at least at the time point where the input current exceeds the limit value. Therefore, when a deviation eV of a DC voltage detecting value V DC^ detected by the voltage detector 7 from a voltage instruction value V DC* output from the voltage setter 6 is large, viz., an input current peak value instruction signal I PEAK* is caused by the proportional element of the voltage controller 9d, the R- and T-phase input current instruction signals iR* and iT* can be reduced to zero. Accordingly, the input currents to the current controllers sharply increase to thereby quicken the returning of the control device to its normal state.

Embodiment 11

In the embodiments 9 and 10, a current limit level set value I limit* is set in advance by the current limit level setter 50. An embodiment shown in FIG. 27 uses a combination of a current limit level setter 50, an integration value comparing level setter 54, and a voltage controller integration reset circuit 57. With the use of the combination, an absolute value of the integrating element of the voltage controller 9b is abruptly reduced or reset when an AC input current exceeds a limit value, and when the integrating elements are different in polarity from the AC reference signals whose phases correspond to those of the integrating elements and the electrical quantities of the input currents accumulated in the integrating elements are in excess of a predetermined value.

Figure 27:
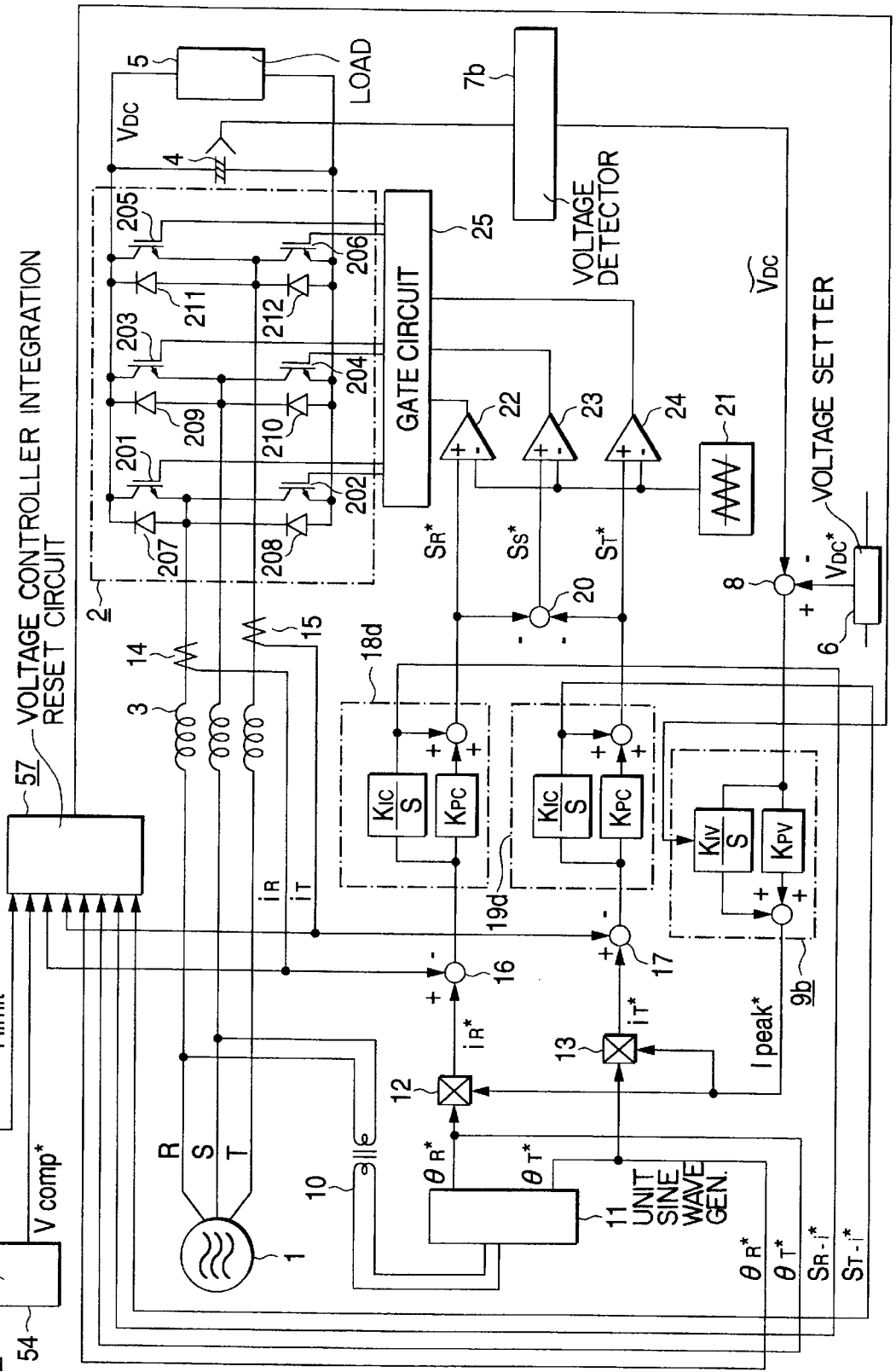
FIG. 27 is a diagram showing an arrangement of an embodiment 11 of a control device for a PWM controlled converter according to the present invention.

In FIG. 27, like or equivalent portions are designated by like reference symbols in the embodiments 8 and 10. The detailed construction of the voltage controller integration reset circuit 57 is the same as of the current controller integration reset circuit 51c. Hence, no further description of it will be given.

As described above, the control device for a PWM controlled converter of the present embodiment includes current control means operating such that an absolute value of the integrating element of the voltage controller is abruptly reduced or reset when an AC input current exceeds its limit value, and when the integrating elements of the current control means are different in polarity from the AC reference signals. With such a unique construction, when an instantaneous power interruption, for example, takes place and the voltage of an AC power source drops or is interrupted for a short time, no overcurrent problem arises when the power source returns to its normal state. Therefore, a satisfactory control of the AC input current or currents is secured. Particularly when the AC input current instruction value is large, viz., the input current peak value instruction signal is large, a more effective suppression of the spike current occurrence is ensured. Further, when the AC input current instruction signal is stepwise or greatly changed and the input current overshoots, the operation of abruptly reducing or resetting the absolute value of the integrating element are inhibited. Therefore, the occurrence of the current spike can be more certainly suppressed independently of the set values of the control gain of the current control system.

Suitable combinations of the above-mentioned embodiments can provide a further effective suppression of the current spike occurrence, as a matter of course. The reactors inserted between the 3-phase AC power source and the PWM controlled converter are not essential and may be substituted by reactance components of the transformer, for example, of the 3-phase AC power source 1.

As described above, there is provided a control device for a PWM controlled converter having voltage control means for comparing with a voltage set value a detecting value of a DC voltage output from the PWM controlled converter, connected through reactors to a 3-phase AC power source, for controlling AC input currents supplied from the 3-phase AC power source, to thereby produce current reference signals, AC reference signal generating means for generating AC reference signals synchronized with the 3-phase AC power source, current instruction means for producing current instruction signals formed by varying the amplitudes of the AC reference signals output from the AC reference signal generating means in accordance with the current reference signals, and current control means for producing control signals to the PWM controlled converter so that the AC input currents vary as instructed by the current instruction signals, the improvement characterized in that the current control means produces control signals based on a proportional control for a predetermined period after the control starts, and produces other control signals based on a proportional integration control after the predetermined period is terminated. In a specific case, at starting the proportional control basis control signals are used for controlling the PWM controlled converter for a predetermined period, and after the predetermined period terminates, the proportional-integration-control basis control signals are used for controlling the PWM controlled converter. Therefore, no overcurrent problem arises, and a good control of the input currents is secured.

In the control device for a PWM controlled converter according to the first embodiment, the current control means produces the control signals based on the proportional integration control at the instant that a detecting value of the DC voltage output from the PWM controlled converter exceeds a predetermined value. Therefore, a proportional control mode is switched to a proportional integration control mode and vice versa at an optimum switching timing. Particularly at starting, a good input current control can be carried out without causing the overcurrent problem, for example. Additionally, the proportional control period possibly causing a steady deviation may easily be minimized in consideration of the overall circuit arrangement.

The present invention also provides a control device for a PWM controlled converter having voltage control means for comparing with a voltage set value a detecting value of a DC voltage output from the PWM controlled converter, connected through reactors to a 3-phase AC power source, for controlling AC input currents supplied from the 3-phase AC power source, to thereby produce current reference signals, AC reference signal generating means for generating AC reference signals synchronized with the 3-phase AC power source, current instruction means for producing current instruction signals formed by varying the amplitudes of the AC reference signals output from the AC reference signal generating means in accordance with the current reference signals, and current control means for producing control signals to the PWM controlled converter so that the AC input currents vary as instructed by the current instruction signals, the improvement characterized in that the current control means multiplies the deviations of AC input currents from the current instruction signals of two of three phases output from the current instruction means by first coefficients, integrates the results of the multiplications, and outputs the results of the integrations in the form of first output signals of the two phases, adds together the sign inverse values of the first output signals of the two phases to form a first output signal of the remaining phase, multiplies the deviations of the AC input currents from the input current instruction signals by second coefficients to form second output signals of the respective phases, adds together the first and second output signals for each phase and outputs the sums in the form of control signals applied to the PWM controlled converter. Thus, the proportional control is performed on at least one phase. Therefore, at starting no overcurrent problem arises. Even when the DC side voltage V DC drops by a load variation, no overcurrent problem arises, and good current control is secured.

The invention further provides a control device for a PWM controlled converter having DC voltage detecting means for detecting a DC voltage output from the PWM controlled converter for controlling AC input currents supplied from a 3-phase AC power source, voltage instruction outputting means for outputting an instruction value of the DC voltage, voltage control means for comparing a voltage instruction value output from the voltage instruction outputting means with a voltage detecting value output from the DC voltage detecting means, to thereby produce current reference signals, and current control means for producing control signals to the PWM controlled converter so that the AC input currents vary as instructed by the current instruction signals obtained from the current reference signals, the improvement characterized in that the voltage instruction outputting means calculatingly corrects the detection errors to produce a voltage instruction value. Therefore, there is eliminated the use of a variable resistor, for example, for compensating for the offset or gain error of the voltage detecting circuit. Hence, troublesome compensating work is eliminated and the operability of the control device is improved. Further, the work for adjusting the offset and gain errors can efficiently be done in the stage of manufacturing.

In the control device for a PWM controlled converter the voltage instruction outputting means includes storing means for storing the relationships between the values of the known voltages applied to the DC voltage detecting means and the detecting voltage values, detected by the DC voltage detecting means, corresponding to the known voltages, and correcting means for calculatingly correcting a voltage instruction value by using the stored voltage relationships so that an actual DC voltage output from the PWM controlled converter is settled down at a desired value. Therefore, there is eliminated the use of a variable resistor, for example, for compensating for the offset or gain error of the voltage detecting circuit. Hence, the operability of the control device is improved. Further, the operation for adjusting the offset and gain errors can easily be automated in the stage of manufacturing.

In the control device for a PWM controlled converter, the known voltages applied to the DC voltage detecting means are DC voltages output from the PWM controlled converter. Therefore, the calculation for correcting a voltage instruction value using the known voltages can be realized by a simple circuit, not using a specially designed circuit.

In the control device for a PWM controlled converter, the voltage instruction outputting means includes storing means for storing the relationships between the voltages output from a reference voltage generating means included in the DC voltage detecting means and the detecting voltage values, detected by the DC voltage detecting means, corresponding to the voltages output from the reference voltage generating means, and correcting means for calculatingly correcting a voltage instruction value by using the stored voltage relationships so that an actual DC voltage output from the PWM controlled converter is settled down at a desired value. Therefore, the calculation for correcting a voltage instruction value using the known voltages can be realized by a simple circuit, not using a DC power source of a high voltage comparable with the DC side voltage V DC in a normal operating state.

The invention also provides a control device for a PWM controlled converter having voltage control means for comparing a voltage set value with a detecting value of a DC voltage output from the PWM controlled converter, connected to an AC power source, for controlling AC input currents supplied form the AC power source, to thereby produce a current reference signal, AC reference signal outputting means for outputting AC reference signals synchronized with the AC power source, current instruction means for producing current instruction signals formed by varying the amplitudes of the AC reference signals output from the AC reference signal outputting means in accordance with the current reference signal, and current control means, including at least integrating elements, for producing control signals to the PWM controlled converter so that the AC input currents vary as instructed by the current instruction signals, the improvement characterized in that when an AC input current exceeds a predetermined limit value, the current control means abruptly reduces the integrating elements thereof. With such a unique construction, when an instantaneous power interruption, for example, takes place and the voltage of an AC power source drops or is interrupted for a short time, no overcurrent problem arises when the power source returns to its normal state. Accordingly, the AC input current or currents can be satisfactorily controlled.

In the control device for a PWM controlled converter, when an AC input current exceeds a predetermined limit value, the current control means resets the integrating elements thereof to zero (0). Therefore, when an instantaneous power interruption, for example, takes place and the voltage of an AC power source drops or is interrupted for a short time, no overcurrent problem arises when the power source returns to its normal state. Accordingly, the AC input current or currents can be reliably controlled.

In the control device, the limit value is set on the basis of the current reference signal output from the voltage control means. Therefore, when an instantaneous power interruption, for example, takes place and the voltage of an AC power source drops or is interrupted for a short time, no overcurrent problem arises when the power source returns to its normal state. Accordingly, a good control of AC input current or currents is secured. Particularly when the instruction value of the AC input current is small, a current spike in the input current detecting signal is more certainly suppressed in its occurrence.

In the control device, the limit value is set on the basis of the current instruction signals output from the current instruction means. Accordingly, the limit value varies in accordance with the input current peak value instruction signal I PEAK*. Therefore, particularly when the peak value instruction signal I PEAK* is small, the timing to reset to 0 the integrating elements of the current controllers may be set at an early point. Therefore, the control signals are more quickly returned to such a level as to make the AC input currents flow as instructed to more certainly suppress the occurrence of a spike current of the input current detecting signal.

In the control device, the current control means includes a current limit Level setter for setting a limit value of an AC input current and a current controller integration reset circuit connected for reception to the limit value set by the current limit level setter and AC input currents, when the AC input current exceeds the limit value, the current controller integration reset circuit produces a signal. Therefore, when an instantaneous power interruption, for example, takes place and the voltage of an AC power source drops or is interrupted for a short time, the AC input current can be controlled free from the overcurrent problem which otherwise arises when the power source returns to its normal state.

In the control device, the current control means abruptly reduces the absolute values of the integrating elements when an AC input current exceeds a limit value, and when the integrating elements of the current control means are different in polarity from the AC reference signals whose phases correspond to those of the integrating elements and the electrical quantities of the input currents accumulated in the integrating elements are in excess of a predetermined value. With such a unique construction, when an instantaneous power interruption, for example, takes place and the voltage of an AC power source drops or is interrupted for a short time, no overcurrent problem arises when the power source returns to its normal state. Accordingly, the AC input current or currents can be satisfactorily controlled. Particularly when the AC input current instruction signal is stepwise or greatly changed and the input current overshoots, the operation of abruptly reducing or resetting the absolute values of the integrating elements is inhibited. Therefore, the occurrence of the current spike can be more certainly suppressed independently of the set values of the control gain of the current control system.

The invention additionally provides a control device for a PWM controlled converter having voltage control means for comparing a voltage set value with a detecting value of DC voltage output from the PWM controlled converter, connected to an AC power source, for controlling AC input currents supplied form the AC power source, to thereby produce a current reference signal, AC reference signal outputting means for outputting AC reference signals synchronized with the AC power source, current instruction means for producing current instruction signals formed by varying the amplitudes of the AC reference signals output from the AC reference signal outputting means in accordance with the current reference signal, and current control means for producing control signals to the PWM controlled converter so that the AC input currents vary as instructed by the current instruction signals, the improvement characterized in that when an AC input current exceeds a predetermined limit value, the current control means abruptly reduces the current reference signals. With such a unique construction, when an instantaneous power interruption, for example, takes place and the voltage of an AC power source drops or is interrupted for a short time, no overcurrent problem arises when the power source returns to its normal state. Therefore, a satisfactory control of the AC input current or currents is secured. Particularly when the AC input current instruction value is large, viz., the input current peak value instruction signal I PEAK* is large, a more effective suppression of the spike current occurrence is ensured.

In the control device, the current control means includes integrating elements, and when an AC input current exceeds a predetermined limit value, resets the integrating elements to zero (0). With such a unique construction, when an instantaneous power interruption, for example, takes place and the voltage of an AC power source drops or is interrupted for a short time, no overcurrent problem arises when the power source returns to its normal state, and hence the AC input current can reliably be controlled.

In the control device, when an AC input current exceeds a predetermined limit value, the voltage control means varies a current reference signal as defined by a time function of which an initial value is the current reference signal smaller than the current reference signal at least at the time when the input current exceeds the limit value. Accordingly, the input currents to the current controllers sharply increase to thereby quickly return the control device to its normal state.

In the control device, when an AC input current exceeds a predetermined limit value, and when the integrating elements of the current control means are different in polarity from the AC reference signals whose phases correspond to those of the integrating elements and the electrical quantities of the input currents accumulated in the integrating elements are in excess of a predetermined value, the current control means reduces the current reference signal. With such a unique construction, when an instantaneous power interruption, for example, takes place and the voltage of an AC power source drops or is interrupted for a short time, no overcurrent problem arises when the power source returns to its normal state. Therefore, a satisfactory control of the AC input current or currents is secured. Particularly, when the AC input current instruction value is large, viz., the input current peak value instruction signal is large, a more effective suppression of the spike current occurrence is ensured. Further, when the AC input current instruction signal is stepwise or greatly changed and the input current overshoots, the operation of abruptly reducing or resetting the absolute value of the integrating element is inhibited. Therefore, the occurrence of the current spike can be more certainly suppressed independently of the set values of the control gain of the current control system.

What is claimed is:

1. A control device for a PWM controlled converter having voltage control means for comparing with a voltage set value a detection value of a DC voltage output from said PWM controlled converter, connected through reactors to a 3-phase AC power source, for controlling AC input currents supplied from said 3-phase AC power source, to thereby produce current reference signals, AC reference signal generating means for generating AC reference signals synchronized with said 3-phase AC power source, current instruction means for producing current instruction signals formed by varying the amplitudes of said AC reference signals output from said AC reference signal generating means in accordance with said current reference signals, and current control means for producing control signals to said PWM controlled converter so that said AC input currents vary as instructed by said current instruction signals, the improvement characterized in that said current control means produces control signals based on a proportional control for a predetermined period after the control starts, and produces other control signals based on a proportional integration control after said predetermined period is terminated.

2. The control device for a PWM controlled converter according to claim 1, in which said current control means produces the control signals based on the proportional integration control when the detected value of the DC voltage output from said PWM controlled converter exceeds a predetermined value.

3. A control device for a PWM controlled converter having voltage control means for comparing with a voltage set value a detection value of a DC voltage output from said PWM controlled converter, connected through reactors to a 3-phase AC power source, for controlling AC input currents supplied from said 3-phase AC power source, to thereby produce current reference signals, AC reference signal generating means for generating AC reference signals synchronized with said 3-phase AC power source, current instruction means for producing current instruction signals formed by varying the amplitudes of said AC reference signals output from said AC reference signal generating means in accordance with said current reference signals, and current control means for producing control signals to said PWM controlled converter so that said AC input currents vary as instructed by said current instruction signals, the improvement characterized in that said current control means multiplies the deviations of AC input currents from the current instruction signals of two of three phases output from said current instruction means by first coefficients, integrates the results of the multiplications, and outputs the results of the integrations in the form of first output signals of the two phases, adds together the sign inverse values of said first output signals of the two phases to form a first output signal of the remaining phase, multiplies the deviations of the AC input currents from the input current instruction signals by second coefficients to form second output signals of the respective phases, adds together said first and second output signals for each phase and outputs the sums in the form of control signals applied to the PWM controlled converter.

4. A control device for a PWM controlled converter having DC voltage detecting means for detecting a DC voltage output from said PWM controlled converter for controlling AC input currents supplied from a 3-phase AC power source, voltage instruction outputting means for outputting a voltage instruction value of the DC voltage, voltage control means for comparing the voltage instruction value output from said voltage instruction outputting means with a voltage detection value output from said DC voltage detecting means, to thereby produce current reference signals, and current control means for producing control signals to said PWM controlled converter so that said AC input currents vary as instructed by said current instruction signals obtained from said current reference signals, the improvement characterized in that said voltage instruction outputting means performs calculations to correct detection errors of the voltage detection value to produce the voltage instruction value.

5. The control device for a PWM controlled converter according to claim 4, in which said voltage instruction outputting means includes storing means for storing relationships between values of known voltages applied to said DC voltage detecting means and values of the detected DC voltage output from said PWM controlled converter and detected by said DC voltage detecting means, corresponding to said known voltages, and correcting means for performing calculations to correct a voltage instruction value by using the stored voltage relationships so that an actual DC voltage output from said PWM controlled converter achieves and maintains a desired value.

6. The control device for a PWM controlled converter according to claim 5, in which said known voltages applied to said DC voltage detecting means are DC voltages output from said PWM controlled converter.

7. The control device for a PWM controlled converter according to claim 4, in which said voltage instruction outputting means includes storing means for storing relationships between voltages output from a reference voltage generating means included in said DC voltage detecting means and detected voltage values, detected by said DC voltage detecting means, corresponding to the voltages output from said reference voltage generating means, and correcting means for performing calculation to correct a voltage instruction value by using the stored voltage relationships so that an actual DC voltage output from said PWM controlled converter achieves and maintains a desired value.

8. A control device for a PWM controlled converter having voltage control means for comparing a voltage set value with a detecting value of a DC voltage output from said PWM controlled converter, connected to an AC power source, for controlling AC input currents supplied from said AC power source, to thereby produce a current reference signal, AC reference signal outputting means for outputting AC reference signals synchronized with said AC power source, current instruction means for producing current instruction signals formed by varying the amplitudes of said AC reference signals output from said AC reference signal outputting means in accordance with said current reference signal, and current control means, including at least integrating elements, for producing control signals to said PWM controlled converter so that said AC input currents vary as instructed by said current instruction signals, the improvement characterized in that when at least one of said AC input currents exceeds a limit value, said current control means abruptly reduces a value of the integrating elements thereof.

9. The control device for a PWM controlled converter according to claim 8, in which when at least one of said AC input currents exceeds the limit value, said current control means resets the integrating elements thereof to zero (0).

10. The control device for a PWM controlled converter according to claim 8, in which said limit value is set on the basis of said current reference signal output from said voltage control means.

11. The control device for a PWM controlled converter according to claim 8, in which said limit value is set on the basis of the current instruction signals output from said current instruction means.

12. The control device for a PWM controlled converter according to claim 8, in which said current control means includes a current limit level setter for setting the limit value of an AC input current and a current controller integration reset circuit connected to receive the limit value set by said current limit level setter and AC input currents, and when at least one of said AC input currents exceeds said limit value, said current controller integration reset circuit produces a signal.

13. The control device for a PWM controlled converter according to claim 8, in which said current control means abruptly reduces the absolute values of the integrating elements when at least one of said AC input currents exceeds the limit value, and when the integrating elements of said current control means are different in polarity from the AC reference signals whose phases correspond to those of the integrating elements and the electrical quantities of the input currents accumulated in the integrating elements are in excess of a predetermined value.

14. A control device for a PWM controlled converter having voltage control means for comparing a voltage set value with a detection value of a DC voltage output from said PWM controlled converter, connected to an AC power source, for controlling AC input currents supplied from said AC power source, to thereby produce a current reference signal, AC reference signal outputting means for outputting AC reference signals synchronized with said AC power source, current instruction means for producing current instruction signals formed by varying the amplitudes of said AC reference signals output from said AC reference signal outputting means in accordance with said current reference signal, and current control means for producing control signals to said PWM controlled converter so that said AC input currents vary as instructed by said current instruction signals, the improvement characterized in that when at least one of said AC input currents exceeds a limit value, said current control means abruptly reduces said current reference signal.

15. The control device for a PWM controlled converter according to claim 14, in which said current control means includes integrating elements, and when at least one of said AC input currents exceeds the limit value, resets said integrating elements to zero (0).

16. The control device for a PWM controlled converter according to claim 14, in which when at least one of said AC input currents exceeds the limit value, said voltage control means varies a current reference signal as defined by a time function of which an initial value is the current reference signal and has a value smaller than the current reference signal when the input current exceeds the limit value.

17. The control device for a PWM controlled converter according to claim 14, in which when at least one of said AC input currents exceeds the limit value, and when the integrating elements of said current control means are different in polarity from the AC reference signals whose phases correspond to those of the integrating elements and the electrical quantities of the input currents accumulated in the integrating elements are in excess of a predetermined value, said current control means reduces the current reference signal.

* * * * *